US012753063B1

(12) United States Patent

Bollen et al.

(10) Patent No.: US 12,753,063 B1

(45) Date of Patent: Oct. 6, 2026

(54) COUNTERTOP FILTERED WATER DISPENSER

(71) Applicant: SharkNinja Operating LLC, Needham, MA (US)

(72) Inventors: Nathan Louis Bollen, Brookline, MA (US); Carwyn Anzani, London (GB); Korkut Bekiroglu, Newtonville, MA (US); Emrullah Celik, Brighton, MA (US); Suheyla Tozan, Pompton Lakes, NJ (US); Daniel Gavin, Devon (GB); Colby Philip Jones, Millis, MA (US); Calvin Carswell, Cambridge, MA (US); Adam Udy, Sutton (GB); Nina Malmgren, London (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 19/572,839

(22) Filed: Mar. 19, 2026

Related U.S. Application Data

(63) Continuation-in-part of application No. 19/532,611, filed on Feb. 6, 2026.

(60) Provisional application No. 63/827,572, filed on Jun. 20, 2025.

(51) Int. Cl.

| | |
|---|---|
| ***B67D 1/12*** | (2006.01) |
| ***B67D 1/00*** | (2006.01) |
| ***B67D 1/07*** | (2006.01) |

(52) U.S. Cl.

CPC ......... *B67D 1/1202* (2013.01); *B67D 1/0014* (2013.01); *B67D 1/07* (2013.01); *B67D 2210/0001* (2013.01)

(58) Field of Classification Search

CPC ...... B67D 1/1202; B67D 1/0014; B67D 1/07; B67D 2210/0001

See application file for complete search history.

(56) References Cited

U.S. PATENT DOCUMENTS

| | | | | |
|---|---|---|---|---|
| 2006/0006107 | A1* | 1/2006 | Olson | B67D 1/0022 210/198.1 |
| 2016/0368753 | A1* | 12/2016 | Bethuy | A47J 31/4403 |
| 2017/0088410 | A1* | 3/2017 | Wing | B67D 1/0076 |
| 2018/0192813 | A1* | 7/2018 | Flick | A47J 31/3623 |
| 2020/0024122 | A1* | 1/2020 | Walton | B67D 1/0078 |
| 2021/0009400 | A1* | 1/2021 | Seymour | B67D 1/1206 |
| 2021/0387842 | A1* | 12/2021 | Savino | A23C 11/103 |

(Continued)

*Primary Examiner* — Donnell A Long

(74) *Attorney, Agent, or Firm* — Mintz, Levin, Cohn, Ferris, Glovsky and Popeo, P.C.

(57) ABSTRACT

Beverage systems are provided that include a filter unit, a dispensing outlet, a pump to pump the fluid from a fluid source, through the filter unit, to the dispensing outlet, a flow meter to measure a flowrate of the fluid being pumped through the system, and a controller including a processor and a memory storing instructions which, when executed by the processor cause the at least one processor to perform operations comprising: receiving a request to dispense a filtered beverage, operating the pump at a first duty to pump the fluid from the fluid source, through the filter unit, to the dispensing outlet, receiving, via the at least one flow meter, the flowrate of the fluid being pumped, comparing the flowrate to a predetermined flowrate, and operating the pump at a second duty, greater than the first duty, responsive to determining that the flowrate is less than the predetermined flowrate.

20 Claims, 46 Drawing Sheets

(56) References Cited

U.S. PATENT DOCUMENTS

| | | | | |
|---|---|---|---|---|
| 2022/0024748 | A1* | 1/2022 | Fantappie | B67D 1/04 |
| 2023/0189785 | A1* | 6/2023 | Harmon | B05B 12/006 700/1 |
| 2024/0059542 | A1* | 2/2024 | Cravalho | B67D 1/0014 |

* cited by examiner

COUNTERTOP FILTERED WATER DISPENSER

CROSS-REFERENCE TO RELATED APPLICATIONS

This application is a continuation-in-part application of U.S. patent application Ser. No. 19/532,611, filed Feb. 6, 2026, entitled "Filtered Water Dispenser," which claims the benefit of U.S. Provisional Application No. 63/827,572, filed Jun. 20, 2025, entitled "Filtered Water Dispenser," the entirety of which are hereby incorporated by referenced.

FIELD

The present disclosure relates generally to filtered water dispensers.

BACKGROUND

Filtered water dispensers provide access to cleaner, better-tasting drinking water by removing impurities such as chlorine, sediment, heavy metals, and microbial contaminants. These dispensers are available in a variety of formats, including pitchers, countertop units, under-sink systems, and refrigerator-integrated dispensers, and may incorporate filtration elements such as activated carbon filters, reverse osmosis membranes, or UV sterilization units.

SUMMARY

In one aspect, a beverage system for filtering fluid is provided that can include a filter unit, a dispensing outlet, a pump arranged to pump the fluid from a fluid source in fluid communication with the beverage system, through the filter unit, to the dispensing outlet, at least one flow meter arranged to measure a flowrate of the fluid being pumped through the beverage system, and a controller including at least one processor and a memory storing instructions which, when executed by the at least one processor cause the at least one processor to perform operations. The operations can include receiving a request to dispense a filtered beverage, operating the pump at a first duty to pump the fluid from the fluid source, through the filter unit, to the dispensing outlet, receiving, via the at least one flow meter, the flowrate of the fluid being pumped through the beverage system, comparing the flowrate to a predetermined flowrate, and operating the pump at a second duty, greater than the first duty, responsive to determining that the flowrate is less than the predetermined flowrate.

In some aspects, the memory can be arranged to store historical data characterizing previous dispensing operations, wherein the first duty can be determined based on a function of one or more duties of the pump during one or more of the previous dispensing operations.

In some aspects, the previous dispensing operations can include one or more filtered beverage dispensing operations or one or more rinse cycle dispensing operations. In some aspects, the first duty can be determined based on an average of one or more duties of the pump during one or more of the previous dispensing operations. In some aspects, the first duty can be determined based on a ratio of one or more duties of the pump during one or more of the previous dispensing operations. In some aspects, the first duty can be determined based on a duty of the pump during an immediately preceding dispensing operation.

In some aspects, the predetermined flowrate can be about 0.5 to 3 liters per minute.

In some aspects, the at least one processor can be arranged to perform operations further including repeating the steps of receiving the flowrate of the fluid and comparing the flowrate to the predetermined flowrate, and iteratively increasing or decreasing the duty of the pump until the flowrate is within a predetermined threshold of the predetermined flowrate. In some aspects, the predetermined threshold can be defined by a range of between about 75 milliliters per minute below the predetermined flowrate to about 75 milliliters per minute above the predetermined flowrate.

In some aspects, the at least one processor can be arranged to modify the duty of the pump such that the flowrate does not exceed the predetermined flowrate.

In some aspects, the filter unit can include a filter cartridge including a paper filter medium arranged to remove contaminants from the fluid flowing therethrough, and the predetermined flowrate can be a flowrate in which a contact time between the fluid and with the paper filter medium is between 2 and 15 seconds.

In some aspects, the beverage system can further include a user interface, wherein the at least one processor can be arranged to perform operations further including providing a clog warning to the user interface responsive to determining that the flowrate is below a second predetermined flowrate.

In some aspects, the beverage system can further include a first flow path defined between the fluid source, the filter unit, and the dispensing outlet, and a second flow path defined between the fluid source and the filter unit, the second flow path including a solenoid valve, wherein the at least one processor can be arranged to perform operations further including controlling the solenoid valve to move from a closed position to an open position after dispensing of the filtered beverage to relieve pressure within the first flow path.

In another aspect, a beverage system for filtering fluid is provided that can include a filter unit, a dispensing outlet, a pump arranged to pump the fluid from a fluid source, through the filter unit, to the dispensing outlet, at least one flow meter arranged to measure a flowrate of the fluid being pumped through the beverage system, and a controller including at least one processor and a memory storing instructions which, when executed by the at least one processor cause the at least one processor to perform operations. The operations can include receiving a request to dispense a filtered beverage, operating the pump at a feedforward duty to pump the fluid from the reservoir, through the filter unit, to the dispensing outlet, receiving, via the at least one flow meter, the flowrate of the fluid being pumped through the beverage system, calculating a flowrate error based on a difference between the flowrate and a target flowrate, adjusting the duty of the pump based on the flowrate error, and updating the feedforward duty responsive to determining that the flowrate error is below a threshold for a steady state time period.

In some aspects, the at least one processor can be arranged to perform operations further including maintaining operation of the pump at the adjusted duty responsive to determining that the flowrate error is within a dead band threshold. In some aspects, the dead band threshold can be defined by a range of between about 75 milliliters per minute below the target flowrate to about 75 milliliters per minute above the target flowrate.

In some aspects, the feedforward duty can be stored in non-volatile memory and persists across power cycles of the beverage system. In some aspects, the feedforward duty can be determined based on a ratio of one or more duties of the pump during one or more of the previous dispensing operations.

In some aspects, the at least one processor can be arranged to perform operations further including waiting for a predetermined time before calculating the flowrate error after initiating pump operation.

In some aspects, the at least one processor can be arranged to perform the steps of receiving the flowrate, calculating a flowrate error, adjusting the duty of the pump, and updating the feedforward duty at a predetermined execution frequency.

In another aspect, a beverage system for filtering fluid is provided that can include a reservoir arranged to hold a volume of fluid, a filter unit, a dispensing outlet, a user interface, a pump arranged to pump the fluid from the reservoir, through the filter unit, to the dispensing outlet, at least one flow meter arranged to measure a flowrate of the fluid being pumped through the beverage system, and a controller including at least one processor and a memory storing instructions which, when executed by the at least one processor cause the at least one processor to perform operations. The operations can include operating the pump to pump the volume of fluid from the reservoir, through the filter unit, to the dispensing outlet, responsive to a new filter being placed within the filter unit, comparing a total volume of fluid pumped from the reservoir to a predetermined volume, providing a first notification to the user interface requesting a user to refill the reservoir responsive to pumping the volume of fluid from the reservoir, and repeating the steps of operating the pump to pump the volume of fluid from the reservoir, comparing the total volume of fluid pumped from the reservoir to the predetermined volume, and providing the first notification to the user interface requesting the user to refill the reservoir, until the total volume of fluid pumped from the reservoir is greater than or equal to the predetermined volume.

In some aspects, the at least one processor can be arranged to perform operations further including determining that a filter has been placed within the filter unit, providing a third notification to the user interface prompting the user to confirm whether the filter is new, receiving, via the user interface, a user input characterizing a confirmation that the filter is new, and initiating one or more operations responsive to receipt of the user input.

In some aspects, the at least one processor can be arranged to perform operations further including receiving, via the user interface, a user input characterizing a request to pause operations, and pausing the operations responsive to receipt of the user input.

In some aspects, the at least one processor can be arranged to perform operations further including receiving, via the user interface, a second user input characterizing a request to resume operations, and resuming the operations responsive to receipt of the second user input.

In some aspects, the at least one processor can be arranged to perform operations further including automatically resuming the operations responsive to detection of the reservoir within the beverage system.

In some aspects, the at least one processor can be arranged to perform operations further including pausing operations responsive to determining removal of the reservoir.

In some aspects, the at least one processor can be arranged to perform operations further including receiving, via the user interface, a user input characterizing a request to resume operation, and resuming operations of the pump responsive to receipt of the user input.

In some aspects, the at least one processor can be arranged to perform operations further including automatically resuming operations of the pump responsive to determining that the user has placed the reservoir back within the beverage system.

In some aspects, the predetermined volume can be between 70 and 80 ounces of fluid. In some aspects, the reservoir can be arranged to hold a volume of between 70 and 80 ounces of fluid.

In some aspects, the at least one processor can be arranged to perform operations further including receiving, via the at least one flow meter, the flowrate of the fluid being pumped through the beverage system, comparing the flowrate to a predetermined flowrate, and iteratively increasing the duty of the pump until the flowrate is within a predetermined threshold of the predetermined flowrate.

In some aspects, the predetermined flowrate can be about 0.5 to 3 liters per minute. In some aspects, the predetermined threshold can be defined by a range of between about 75 milliliters per minute below the predetermined flowrate to about 75 milliliters per minute above the predetermined flowrate.

In some aspects, the at least one processor can be arranged to modify the duty of the pump such that the flowrate does not exceed the predetermined flowrate.

In another aspect, a beverage system for filtering fluid is provided that can include a filter unit, a dispensing outlet, a pump arranged to pump the fluid from a fluid source, through the filter unit, to the dispensing outlet, a recirculation solenoid arranged to selectively permit fluid to flow from the filter unit back to the fluid source, at least one flow meter arranged to measure a flowrate of the fluid being pumped through the beverage system, and a controller including at least one processor and a memory storing instructions which, when executed by the at least one processor cause the at least one processor to perform operations. The operations can include operating, in response to reception of a new filter within the filter unit, the pump at an initial pump duty to pump the fluid from the fluid source, through the filter unit, to the dispensing outlet, receiving, via the at least one flow meter, the flowrate of the fluid being pumped through the beverage system, ramping the pump duty by incrementing the pump duty by a predetermined increment until the flowrate reaches a target flowrate, and applying closed-loop control of the pump duty based on the received flowrate to maintain the flowrate at the target flowrate after ramping is complete.

In some aspects, the at least one processor can be arranged to perform operations further including calculating a total rinse volume based on the flowrate of the fluid being pumped through the beverage system, comparing the calculated total rinse volume to a flush cycle volume, incrementing a flush iterator when the calculated total rinse volume reaches the flush cycle volume, and terminating operation of the pump when the flush iterator exceeds a predetermined number.

In some aspects, the at least one processor can be arranged to perform operations further including saving the calculated total rinse volume to non-volatile memory, and reading the total rinse volume from non-volatile memory upon power-up to resume operation of the pump from a previous state.

In some aspects, the at least one processor can be arranged to perform operations further including subtracting the total rinse volume from a total volume count characterizing a cumulative volume of fluid that has flowed through the filter, and determining a remaining filter life by subtracting the total volume count from a predetermined filter capacity.

In some aspects, the at least one processor can be arranged to perform operations further including detecting an add water condition based on pump current and flowrate, pausing operations responsive to detecting the add water condition, and providing a notification indicating a pause in operations.

In some aspects, the at least one processor can be arranged to perform operations further including detecting a presence of the filter via a microswitch of the beverage system, receiving a confirmation input indicating that the filter is new, and initiating one or more rinse operations responsive to receipt of the confirmation input.

In another aspect, a beverage system for filtering fluid is provided that can include a filter unit, a dispensing outlet, a pump arranged to pump the fluid from a fluid supply, through the filter unit, to the dispensing outlet, and a controller including at least one processor and a memory storing instructions which, when executed by the at least one processor cause the at least one processor to perform operations. The operations can include receiving an input characterizing a request to remove a filter from the filter unit, and operating the pump for a predetermined amount of time to pump excess fluid from the filter unit to the dispensing outlet responsive to the input.

In some aspects, the beverage system can further include a reservoir arranged to hold a volume of fluid and a user interface, wherein the at least one processor can be arranged to perform operations further including detecting, via a reservoir microswitch, a presence of the reservoir, and providing a notification to the user interface requesting removal of the reservoir prior to operating the pump.

In some aspects, the at least one processor can be arranged to perform operations further including determining that a wait timer has expired without the reservoir being removed, and cancelling operation of the pump responsive to the wait timer expiring without the reservoir being removed.

In some aspects, the beverage system can further include at least one flow meter arranged to measure a flowrate of the fluid being pumped through the beverage system, wherein the at least one processor can be arranged to perform operations further including receiving, via the at least one flow meter, the flowrate of the fluid being pumped through the beverage system, wherein the predetermined amount of time can be based on the flowrate.

In some aspects, the beverage system can further include a user interface, wherein the at least one processor can be arranged to perform operations further including stopping operation of the pump upon passage of the predetermined amount of time, and providing a notification to the user interface indicating that the filter can be removed.

In some aspects, the at least one processor can be arranged to perform operations further including setting a filter prime flag to true upon passage of the predetermined amount of time.

In some aspects, the at least one processor can be arranged to perform operations further including operating, in response to reception of a new filter within the filter unit, the pump at an initial pump duty to pump the fluid from the fluid source, through the filter unit, to the dispensing outlet to prime the new filter.

In some aspects, the beverage system can further include a reservoir arranged to hold a volume of fluid, a fluid flow path from the reservoir, through the filter unit, to the dispensing outlet, and a solenoid valve provided along a recirculation flow path from the filter unit to the reservoir, wherein the at least one processor can be arranged to perform operations further including opening the solenoid valve upon passage of the predetermined amount of time to relieve pressure within the fluid flow path.

In some aspects, the beverage system can further include a dispense solenoid provided along a fluid flow path between the filter unit and the dispensing outlet, wherein the at least one processor can be arranged to perform operations further including opening the dispense solenoid prior to operating the pump.

In some aspects, the at least one processor can be arranged to perform operations further including receiving a second user input characterizing a request to pause operation of the pump, and setting a pump duty to zero responsive to receipt of the second user input.

In another aspect, a beverage system for filtering fluid is provided that can include a filter unit, a dispensing outlet, a pump arranged to pump the fluid from a fluid supply, through the filter unit, to the dispensing outlet, a dispense solenoid arranged to control fluid flow from the filter unit to the dispensing outlet, a recirculation solenoid arranged to control fluid flow from the filter unit back to the fluid supply along a recirculation path, and a controller including at least one processor and a memory storing instructions which, when executed by the at least one processor cause the at least one processor to perform operations. The operations can include receiving an input characterizing a request to remove a filter from the filter unit, opening the dispense solenoid and closing the recirculation solenoid, operating the pump for a predetermined period of time to pump excess fluid from the filter unit to the dispensing outlet, and stopping operation of the pump responsive to the predetermined period of time elapsing.

In some aspects, the beverage system can further include a reservoir arranged to hold a volume of fluid, wherein the at least one processor can be arranged to perform operations further including determining that the reservoir has been removed from the beverage system based on a reservoir microswitch signal, and starting operation of the pump after a second predetermined period of time elapses since determining that the reservoir has been removed.

In some aspects, the beverage system can further include a user interface, wherein the at least one processor can be arranged to perform operations further including calculating a progress value for a drain cycle based on a ratio of a time of operation of the pump to a sum of the predetermined period of time and the second predetermined period of time, and providing the progress value to the user interface for display.

In some aspects, the predetermined period of time can be approximately 8 seconds and the second predetermined period of time can be approximately 5 seconds.

In some aspects, the at least one processor can be arranged to perform operations further including receiving a second input characterizing a request to pause operation of the pump, and setting the pump duty to zero responsive to receiving the request to pause.

In some aspects, the at least one processor can be arranged to perform operations further including receiving a third input characterizing a request to resume operation of the pump, and resuming operation of the pump responsive to receipt of the third input.

In some aspects, the at least one processor can be arranged to perform operations further including closing the dispense solenoid responsive to the predetermined period of time elapsing, and setting a recirculation request flag to true.

In another aspect, a filter cartridge assembly for a beverage system is provided that can include a filter cartridge arranged to be removably positioned within an internal volume of a filter housing, the filter housing including a fluid inlet located at a lower portion thereof and arranged to receive raw fluid, and a fluid outlet located at an upper portion thereof arranged to dispense filtered fluid, and a cap body arranged to seal around a top opening of the filter housing, wherein the cap body can include a fluid port arranged to fluidically couple to the fluid outlet of the filter housing. The fluid port can include an angled face that can be arranged to engage a corresponding internal angled face of the fluid outlet of the filter housing when the cap body is placed within the filter housing, providing a hermetic seal between the fluid port of the cap body and the fluid outlet of the filter housing to establish a fluid pathway from the fluid inlet, through the filter cartridge and the fluid port, and out of the fluid outlet to the dispensing outlet.

In some aspects, the filter cartridge assembly can further include a locking cap arranged to lockingly seal around the top opening of the filter housing over top of the cap body to lock the cap body in place and further compress the sealed connection between the cap body and the top opening of the filter housing.

In some aspects, the locking cap can be arranged to lockingly seal around the top opening of the filter housing via a bayonet locking mechanism.

In some aspects, the locking cap can further include a locking tab arranged to engage a locking switch of the filter housing when the locking cap is lockingly sealed around the top opening to activate the locking switch to send a signal to a controller of the beverage system indicating that the filter cartridge is properly sealed within the filter housing.

In some aspects, the internal angled face of the fluid port can be set at an angle of between 30 and 60 degrees from a vertical plane.

In some aspects, the fluid port can be pivotable on the cap body such that the angled surface of the fluid port can be pivoted into sealing engagement with the corresponding internal angled surface of the filter housing after the cap body is sealed around the top opening of the filter housing.

In some aspects, the fluid port can be slidable on the cap body such that the angled surface of the fluid port can be slid into sealing engagement with the corresponding internal angled surface of the filter housing after the cap body is sealed around the top opening of the filter housing.

In some aspects, the fluid port can be rotatable on the cap body such that the angled surface of the fluid port can be rotated into sealing engagement with the corresponding internal angled surface of the filter housing after the cap body is sealed around the top opening of the filter housing.

In some aspects, the fluid port can be spring-biased toward the internal angled face of the fluid outlet such that the corresponding angled face of the fluid port is urged into sealing engagement with the internal angled face when the cap body is placed within the filter housing.

In some aspects, the cap body can be arranged to magnetically couple to the filter housing.

In some aspects, the angled face of the fluid port can include a magnetic component arranged to interact with a corresponding magnetic component provided in the internal angled face of the fluid outlet to magnetically secure the angled face of the fluid port to the internal angled face of the fluid outlet when engaged.

In some aspects, the fluid port can have an outlet with a shape that resembles a scoop or paddle configuration with a rounded upper portion and a narrower lower neck region.

In another aspect, a beverage filtration unit for a beverage system is provided that can include a filter housing including a fluid inlet located at a lower portion thereof and arranged to receive fluid to be filtered from a fluid supply of the beverage system, a fluid outlet located at an upper portion thereof and arranged to dispense filtered fluid from the filter housing to a dispensing outlet, a top opening provided at the upper portion of the filter housing, and a switch arranged to send a signal to a controller of the beverage system indicating that a filter assembly is properly sealed within an interior volume of the filter housing. The filter housing can be arranged to removably receive the filter assembly within the internal volume thereof via the top opening, the filter assembly including a filter cartridge having filter medium arranged to remove contaminants from fluid flowing therethrough, a cap body arranged to seal around the top opening of the filter housing, and a locking cap arranged to lockingly seal around the top opening of the filter housing over top of the cap body, wherein the locking cap includes at least one protrusion arranged to actuate the switch of the filter housing when the locking cap is rotated to a locked position.

In some aspects, the switch can include a spring-biased switch element and a microswitch, wherein the at least one protrusion of the locking cap can be arranged to depress the spring-biased switch element when the locking cap is rotated to the locked position, thereby actuating the microswitch to send a signal to a controller of the beverage system indicating that the filter cartridge is properly installed within the filter housing.

In some aspects, the filter housing can further include a bayonet locking mechanism including a plurality of cutout portions formed along an upper edge of the filter housing which can be arranged to engage and secure a corresponding plurality of radial protrusions provided on the locking cap.

In some aspects, the fluid outlet of the filter housing can be arranged to fluidically couple to a fluid port of the cap body to establish a fluid pathway from the fluid inlet, through the filter cartridge and the fluid port, and out of the fluid outlet to the dispensing outlet.

In some aspects, the fluid outlet can include an internal angled face arranged to engage a corresponding angled face of the fluid port to provide a hermetic seal therebetween.

In some aspects, the internal angled face of the fluid outlet can be set at an angle of between 30 and 60 degrees from a vertical plane.

In some aspects, the internal angled face of the fluid outlet can include a magnetic component arranged to interact with a corresponding magnetic component provided in the angled face of the fluid port to magnetically secure the angled face of the fluid port to the internal angled face of the fluid outlet when engaged.

In some aspects, the fluid outlet can have a shape that resembles a scoop or paddle configuration with a rounded upper portion and a narrower lower neck region.

In some aspects, the filter housing can further include a recirculation outlet arranged to be in fluid communication with a recirculation flow path defined between the filter housing and the fluid supply of the beverage system.

In some aspects, the recirculation outlet can be arranged to be in fluid communication with a recirculation valve of the beverage system, the recirculation valve arranged to selectively permit fluid retained in the filter housing to flow back toward the fluid supply.

BRIEF DESCRIPTION OF THE DRAWINGS

These and other features will be more readily understood from the following detailed description taken in conjunction with the accompanying drawings, in which.

DETAILED DESCRIPTION

Figure 1:
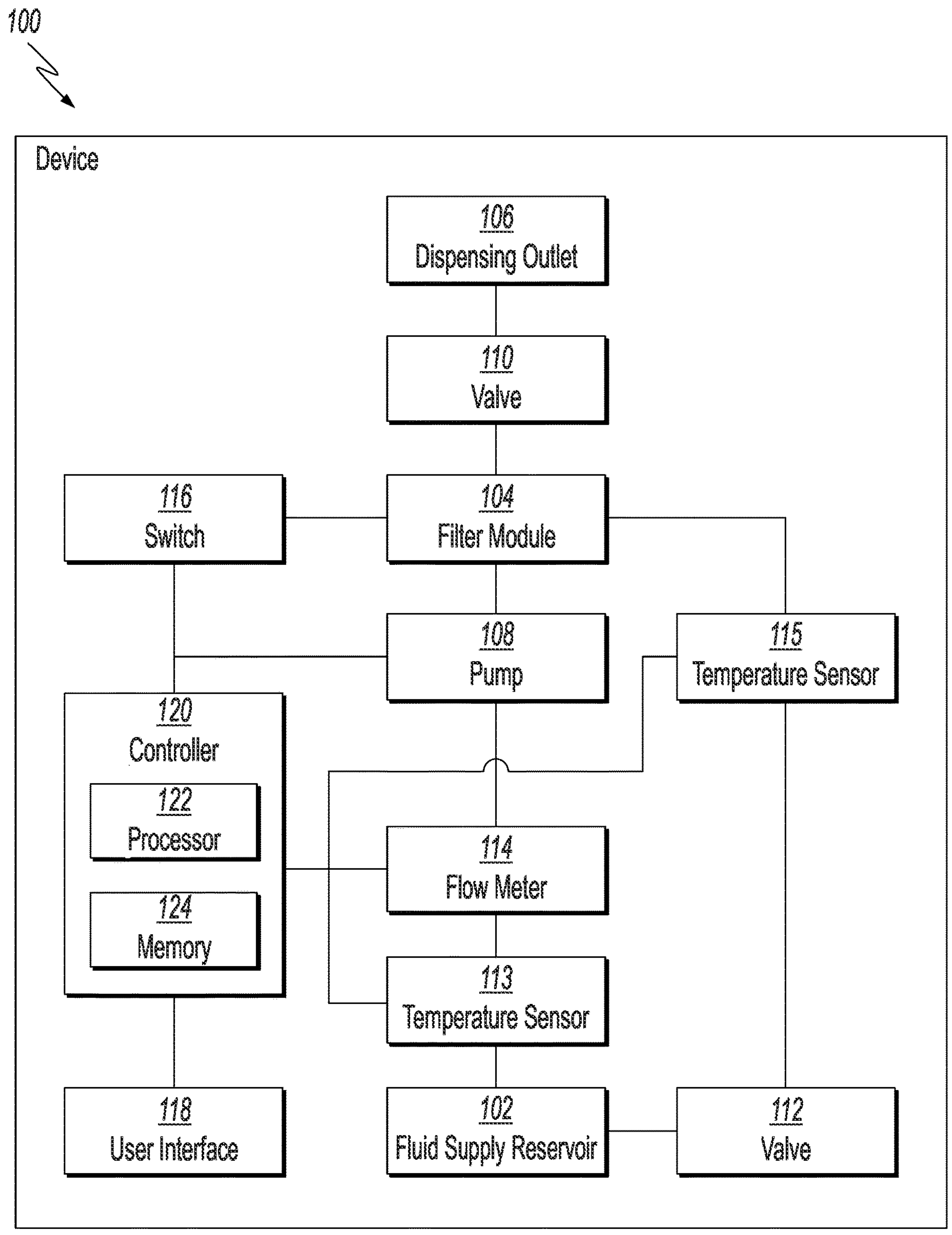
FIG. 1 is a block diagram of one embodiment of a beverage device.

Countertop filtered water dispensers provide a compelling middle ground between filtered water pitchers, which generally require frequent refilling, and refrigerator-integrated dispensers, which can require substantial financial investment. However, countertop dispensers generally retain water within their filter modules/units. During periods of non-use, this retained water can warm to ambient room temperature. As a result, when the dispenser is next used, the water that is initially dispensed may be undesirably warm, even if cold water is being supplied to the dispenser. This can be unpleasant for users expecting chilled or cool water and frequently reduces user confidence in a dispenser's performance. Additionally, the process of replacing the filter medium in existing countertop dispensers is often cumbersome. Existing dispensers may not clearly indicate when the filter medium requires replacement. Ordering replacement filter medium can also be time consuming, as the dispensers generally do not provide an indication of proper filter medium type, which places a burden on users to refer to other sources (e.g., an instruction manual, which they may have discarded or lost) to determine the exact type of filter medium used in their dispenser. These issues can frustrate users and discourage proper maintenance.

Described are beverage devices which, in various implementations, incorporate a combination of a removable fluid supply reservoir, a specialized filter module/unit, and an automatic pumping and filter monitoring system. The devices can provide enhanced user convenience, improved filtration performance, and precise temperature control, while also simplifying maintenance and filter replacement.

In some aspects, the device can include a pump that can drive unfiltered fluid from the reservoir through the filter module to a dispensing outlet along a first flow path and can selectively drive fluid back from the filter module to the reservoir along a recirculation flow path. This fluid recirculation capability can enable the device to precisely manage the temperature of the fluid retained in the reservoir, thereby allowing the device to provide chilled beverages even following prolonged idle periods.

The filter module can include a filter medium defining a central cavity. The filter medium can be coupled to a filter seat that defines a chamber in fluid communication with the unfiltered fluid reservoir. A filter cap can be coupled to the filter medium. A body of the cap can define a fluid outlet that connects to the device's dispensing outlet. During operation, unfiltered fluid can enter the filter module through the filter seat, and the filter medium can draw the fluid through its exterior into the central cavity. From the central cavity, the filtered fluid can flow to the fluid outlet defined by the cap body.

In some aspects, the filter cap includes a locking mechanism that is rotatably coupled to the cap body. When rotated relative to the cap body and filter medium, the locking mechanism can engage microswitches that confirm proper installation of the filter module. This enables the device to detect and alert users to improper filter installation, thereby reducing the risk of leaks and ensuring reliable operation.

To further enhance usability, the device can automatically monitor the health status of the filter module using a flow meter positioned upstream of the filter module. Based on data characterizing the volume of fluid passing through the filter module, the device can provide notifications regarding the remaining lifespan of the filter medium. These notifications may include a scannable code, such as a QR code, that links users directly to a digital storefront for ordering replacement filters, streamlining the maintenance process and encouraging timely filter replacement.

Certain aspects will now be described to provide an overall understanding of the principles of the structure, function, manufacture, and use of the devices, systems, and methods disclosed herein. One or more examples of these aspects are illustrated in the accompanying drawings. Those skilled in the art will understand that the devices, systems, and methods specifically described herein and illustrated in the accompanying drawings are non-limiting aspects. The features illustrated or described in connection with one exemplary embodiment can be combined with the features of other aspects. Such modifications and variations are intended to be included within the scope of the present subject matter.

Further, in the present disclosure, like-named components of the aspects generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

A diagram of a beverage device 100 according to some aspects is provided in FIG. 1. The diagram depicts components of the beverage device 100 that can be used to filter and dispense fluid for user consumption according to user inputs received by the beverage device 100. In the illustrated diagram, the device 100 includes a fluid supply reservoir 102 (also referred to herein as fluid reservoir, or reservoir, or raw water tank), a filter module 104, a dispensing outlet 106, a pump 108, an outlet valve 110, a recirculation valve 112, a switch 116, a user interface 118, and a controller 120. Each of these components is described in turn.

The fluid supply reservoir 102 provides a source of unfiltered water from which the beverage device 100 can draw. This unfiltered water can then be filtered by the beverage device 100 and dispensed to a user as described herein. The fluid supply reservoir can be a container defining an interior volume suitable for storing unfiltered fluid (e.g., unfiltered water). The fluid supply reservoir 102 can be refillable by a user. To facilitate refilling, the reservoir 102 itself can be removable from the beverage device 100. The reservoir 102 can include a removable or openable cap or lid that allows fluid to be added directly into the reservoir from some other source, such as a faucet or the like. When refilled, a user can reattach or otherwise close off the reservoir 102 via the cap or lid and, if necessary, reattach the reservoir 102 to the beverage device. The reservoir 102 can be formed from food-safe plastic, stainless steel, or other suitable materials, and can be manufactured in various forms and volume capacities, such as 1 liter, 1.5 liters, 2 liters, 3 liters, or more, depending on the intended use case. The reservoir 102 can also be available in smaller or greater capacities as required. For example, if used in an office setting or in a setting in which many persons rely on the beverage device 100, a much larger reservoir 102 may be useful.

As explained above, the reservoir 102 can be removable from a main body of the beverage device 100, enabling users to transport and store it independently of the rest of the beverage device 100. In variations of the beverage device 100 lacking temperature control, the reservoir 102 can be placed in a low-temperature environment, such as a refrigerator, to chill the unfiltered fluid contained therein prior to filtration and dispensing. This can allow users to draw upon a supply of chilled water without relying on active cooling mechanisms within the beverage device 100 itself. In some aspects, the device 100 can be provided with more than one reservoir 102 to enable on-demand swapping of a depleted reservoir or to otherwise expand the volumetric capacity of unfiltered fluid from which the beverage device 100 can draw, i.e., the beverage device includes one dock to receive different reservoirs 102 and/or several docks each capable of receiving different reservoirs 102. This can be useful in the variations lacking temperature control because a user can keep one pre-filled reservoir 102 in a low-temperature environment to use on-demand.

To support temperature management, the reservoir 102 can include features to maintain a desired temperature of fluid stored therein. For example, the reservoir 102 can be formed from an insulating material configured to mitigate temperature change of the fluid contained therein. Alternatively or additionally, the reservoir 102 can include a detachable insulating sleeve that can be removed when the reservoir is placed in the refrigerator and reattached when the reservoir is returned to the dispenser. A modular insulation approach can enable efficient chilling while preserving thermal performance during use. Other features for temperature management usable alone or in combination with the features described above can include chilling sleeves placed around the reservoir 102 that absorb heat (e.g., an ice pack sleeve), chilling cores placed directly into the reservoir 102 that absorb heat, and vacuum insulation. In addition, the beverage device 100 can include an onboard chilling system to pull heat from fluid stored in the reservoir 102.

The reservoir 102 can include an outlet valve to selectively permit fluid to flow from the reservoir 102. In some aspects, the outlet valve can be a mechanical valve that automatically opens when the reservoir is properly seated in the main body of the dispenser. In other aspects, the outlet valve can be an electronically actuated valve controlled by the controller 120.

In some aspects, the reservoir 102 can include a fluid inlet, with an optional inlet valve, through which fluid can be supplied to the reservoir 102 from the device 100 while the reservoir 102 is connected to the device 100. As described in further detail herein, the inlet to the reservoir 102 can enable fluid that has been recirculated from other components of the device 100 (e.g., the filter module 104) to be added back to the reservoir 102 for mixing with the fluid contained in the reservoir 102.

Unfiltered fluid sourced from the reservoir 102 can be filtered by the beverage device 100 using an onboard filter module/unit 104 to provide a user with filtered fluid. The filter module 104 can be configured to receive unfiltered fluid from the reservoir 102 and to remove impurities from the fluid before the fluid is dispensed for consumption. The filter module 104 can be housed within the main body of the device 100 and fluidically coupled downstream of the reservoir 102 and upstream of the dispensing outlet 106 via one or more internal flow paths.

The filter module 104 can include one or more filter media that perform the filtration function of removing contaminants from the unfiltered fluid. In certain variations, the filter module 104 can be fixed within the beverage device and includes a filter housing to provide the filter module with structure, and filter media located within the filter housing to perform the filtration function. In other variations, the filter module 104 can include a removable component to facilitate replacement. In these variations, the beverage device 100 can include a filter seat and a filter cartridge receivable by the filter seat. The filter cartridge can include filter media and components (e.g., caps, rigid cores, and the like) for retaining the filter media, similar to that described above. As desired, such as at the end of a life cycle of the filter media, a user may remove the filter cartridge from the filter seat and replace with a fresh filter cartridge.

Depending upon the contaminants to be removed from the unfiltered fluid, the exact nature of the one or more filter media can vary. In some aspects, the filter media can include a paper-based filter material, which can provide a cost-effective and environmentally friendly solution for removing particulate matter and certain chemical contaminants. Alternative filter media options usable in place of or in conjunction with the paper-based filter material include activated carbon, ceramic, ion-exchange resins, composite multi-stage filters, and the like.

Introduced above, the beverage device 100 can include a filter module 104 with a removable component in the form of a filter cartridge, which includes a filter housing and filter media. This removability allows users to replace the filtration element when needed, such as when the filter media has reached its filtration capacity.

In those removable variations, the beverage device 100 can include one or more components to detect the presence or installation status of the filter cartridge within the filter seat. For example, the beverage device can include a switch 116 located proximate to or within the filter module 104, such as within the filter seat itself. The filter cartridge can be configured to engage the switch 116 when properly installed and sealed within the device 100. The switch 116 can be a microswitch such as a lever-actuated, push-button, or snap-action microswitch. The switch 116 can be in electronic communication with the controller 120, enabling the system to detect whether the filter cartridge is correctly installed. If the switch 116 is not engaged, the controller 120 can alert the user to improper installation, thereby reducing the risk of leaks or malfunction due to incomplete sealing or misalignment of the filter cartridge or inability to filter fluid.

In some aspects, the controller 120 can be configured to implement interrupt-based detection for filter presence. The controller 120 can monitor the state of the switch 116 via an interrupt routine that executes at a predetermined polling rate. When the switch 116 transitions from a disengaged state to an engaged state, the interrupt routine can detect this transition and set a flag indicating that a filter cartridge has been placed within the filter module 104. The interrupt-based detection approach can allow the controller 120 to respond promptly to filter installation events without requiring continuous polling of the switch 116 state within a main control loop of the controller 120. As used herein, the term 'flag' refers to a binary variable stored in the memory of the controller that indicates whether a particular condition or state is active within the beverage system. A flag can have a value of true (e.g., 1) or false (e.g., 0). Setting a flag to true can signal to other portions of the controller's logic that an associated condition has been detected or that a particular action should be taken. For example, setting a flag to true within an interrupt routine can cause the main control loop to initiate a corresponding operation during its next iteration. Flags can serve as signaling mechanisms that allow the controller to coordinate actions across various operational states and interrupt routines.

The controller 120 can also be configured to implement interrupt-based detection for other conditions including pump stall conditions and add water conditions. The interrupt routine can monitor multiple input signals and set corresponding flags when transitions are detected. This consolidated interrupt-based approach can provide efficient monitoring of multiple system conditions while reducing processing overhead in the main control loop.

In some aspects, the controller 120 can be configured to implement debounce logic for inputs from the switch 116 to prevent false detections. Mechanical microswitches can exhibit contact bounce when transitioning between states, producing multiple rapid transitions that may be incorrectly interpreted as multiple installation or removal events. The debounce logic can require the switch 116 to remain in a consistent state for a predetermined number of consecutive polling cycles before the controller 120 registers a valid state change. The debounce logic can filter out transient fluctuations caused by contact bounce, vibration, or electrical noise, ensuring that the controller 120 responds only to genuine filter installation or removal events.

Filtered fluid can flow from the filter module 104 downstream to the dispensing outlet 106 for user consumption. In some aspects, the outlet 106 can be positioned on the front or side of the device 100 and can output filtered fluid downward to be received in a drinking vessel, such as a drinking glass, bottle, or the like.

The device 100 can also include an outlet valve 110, introduced above, to selectively permit fluid to flow from the outlet 106. The outlet valve 110 can be arranged within or upstream of the outlet 106, and can be configured to regulate when and how fluid is dispensed. The outlet valve 110 can be actuated manually, electronically, or automatically, for example, in response to user input, in response to the occurrence of some trigger event, such as the presence of fluid, etc. The outlet valve 110 can be implemented using any suitable type of valve, for example, a solenoid valve (which can be electronically actuated by the controller 120 to open or close based on user commands or programmed logic), a pinch valve (which can mechanically constrict a flexible tube to control flow and can be operated manually or via motorized mechanisms), or a ball valve or gate valve (which may be used in more robust designs where precise flow control is required).

Fluid can be drawn from the fluid supply reservoir 102, filtered through the filter module 104, and dispensed through the dispensing outlet 106, all via the pump 108. This flow path from reservoir 102 to dispensing outlet 106 via the filter module 104 can be dubbed the first flow path. This first flow path is a main flow path for the sourcing and filtration of fluid ultimately dispensed to a user.

The pump 108 can be electronically controlled by the controller 120, described in additional detail below. The type of pump used to implement the pump 108 can be selected based on variables such as desired flowrate, noise level, and energy efficiency. Examples of suitable pump types include (but are not limited to) peristaltic pumps, diaphragm pumps, centrifugal pumps, and gear pumps. The pumping rate of the pump 108, in some aspects, is between approximately 0.2 liters per minute (LPM) and approximately 5 LPM at any incremental step. In some aspects, the pumping rate of the pump 108 is approximately 4 LPM.

Communications from the controller 120 to a user can occur in a number of ways, including through wired or wireless transmission, and via a user interface 118. The controller 120 can be coupled to the user interface 118, which can facilitate interaction between users and the device 100. The user interface 118 can include control elements such as buttons, touch-sensitive panels, rotary dials, or capacitive sensors for receiving user input. The user interface 118 can also include a display screen, such as an LCD, OLED, or e-ink display, for presenting information regarding, for example, device status, alerts, and instructions. Through the user interface 118, the controller 120 can provide visual alerts, audio alerts, or other notifications regarding various device conditions, such as filter health, improper filter installation, or low fluid levels.

The alerts made by the controller 120 can be designed to prompt the user to perform specific actions, such as replacing the filter cartridge of the filter module 104 or refilling the fluid reservoir 102. Notifications regarding filter health can include a scannable code, such as a QR code, that links the user to a digital storefront or splash page for ordering replacement filter cartridges or replacement filter media. In some aspects, the controller 120 can track an amount of time that has passed since the reservoir 102 was connected to the device, and use this data, along with flow meter readings from the flow meter 114, to determine whether the fluid in the reservoir has likely reached ambient room temperature or has been depleted, and can prompt the user, via the user interface 118, to chill or refill the reservoir as needed.

As introduced above, communications from the controller 120 can take place in ways other than via the user interface 118, such as over a wireless network. Wireless communication functionality can enable the controller 120 to interface with other devices, for example, a user's phone, personal computer, tablet, or the like via communications components including a transmitter, receiver, and an antenna, or other similarly-capable components. In these aspects, the controller 120 may transmit notifications (e.g., notifications regarding filter health) to one or more connected devices. Such wireless notifications can be, for example, Bluetooth push notifications, Wi-Fi push notifications, email notifications, SMS notifications, and/or the like. In some aspects, the user interface 118 can enable (e.g., via a dedicated control such as a clickable button or an icon on the display) users to order replacement filter modules or filter media from a digital storefront directly from the device 100.

To obtain feedback from the device 100 to inform its operations, the controller 120 can rely on data measured by sensors in addition to the flow meter 114 for monitoring various properties or conditions of the device 100. These sensors can enhance system performance, enable intelligent control, and improve user experience. One particularly useful category of sensors is temperature sensors, which can be used to facilitate fluid temperature management throughout the system. For example, in some variations, the device 100 can include a first temperature sensor 113 located downstream of the fluid supply reservoir 102, and a second temperature sensor 115 located along the recirculation flow path downstream of the filter module 104. Suitable temperature sensors include negative temperature coefficient (NTC) thermistors, optical temperature sensors, and the like. The temperature sensors 113, 115 can be in electronic communication with the controller 120. During a recirculation cycle, the controller 120 can use data from both sensors to monitor the temperature differential between the fluid being drawn from the reservoir 102 and the fluid being returned to the reservoir 102 from the filter module 104. The controller 102 can be configured to maintain the recirculation cycle until the temperature differential drops below a threshold amount (e.g., 5° C. or another amount) that is indicative of the fluid in the filter module 104 reaching a temperature close to that of the fluid in the reservoir 102.

Additionally, or alternatively, the controller 120 can be configured to use data from the first temperature sensor 113 to determine when the fluid in the reservoir has warmed to ambient room temperature. The controller 102 can be configured to alert the user via the user interface 118 to re-chill the reservoir 102 or replace the fluid in the reservoir 102 with pre-chilled fluid. These alerts may be visual, audible, or presented on a display screen, and may be accompanied by actionable prompts to guide the user through maintenance steps.

For proper filtration to occur, the health of the filter module 104 must be maintained. Filters have natural usage limits because over time, the filter media may become saturated with contaminants, may degrade, or may otherwise lose its ability to properly filter out contaminants. It is desirable to monitor and measure the quality of the filter media and to communicate that measured quality out to a user for maintenance or replacement to ensure proper filtration continues to take place. This monitoring and measurement can occur in a number of ways, for example via flow meter 114. Filters can be rated, according to their construction, to properly filter some expected total volume of fluid. By monitoring the volume of fluid flowing through a filter, such as the filter media of filter module 104, the health of the filter can be measured and reported out. Specifically, the flow meter 114 can be configured to measure a volume of fluid flowing through the filter module 104. The flow meter 114 provides data to the controller 120, which can determine when the filter media should be replaced. The controller 120 can then supply a user with a notification indicating that the filter media has reached a point where it should be swapped out for a fresh filter. This process is described in greater detail below.

In addition to driving fluid along the first flow path, the pump 108 can also be configured to reverse or redirect fluid flow along a recirculation flow path, different than the first flow path, enabling fluid retained in the filter module 104 to be returned to the reservoir 102. This recirculation capability can allow retained fluid that has warmed during idle periods to be cycled back into the reservoir 102, where it can be mixed with the chilled fluid contained in the reservoir 102 to reduce its temperature. This can enable the device 100 to consistently deliver beverages at a desirable temperature, even after extended periods of non-use. Without recirculation, the idle fluid in the device 100 would dispense first via the outlet 106, and a user, though desiring chilled fluid, would instead be provided with lukewarm fluid.

This recirculation flow path can be defined between the filter module 104 and the reservoir 102. The recirculation flow path can be configured to transport fluid from the first flow path to the fluid supply reservoir 102 via a recirculation valve 112 arranged between the filter module 104 and the reservoir 102. In some aspects, the recirculation valve 112 is arranged within or upstream of an inlet of the fluid supply reservoir 102. In some aspects, the recirculation valve 112 is arranged within or downstream of an outlet of the filter module 104. The recirculation valve 112 can be implemented using any suitable type of valve, for example, a solenoid valve, a pinch valve, a ball valve, or a gate valve. A recirculation process is described in further detail below.

The controller 120 can be configured to manage various operational aspects of the device 100. The controller 120 can include at least one processor 122 and memory 124 and can be implemented using a variety of hardware platforms, for example, microcontrollers, application-specific integrated circuits (ASICs), or field-programmable gate arrays (FPGAs). The memory 124 can store instructions that, when executed by the processor 122, enable the controller 120 to operate components including the pump 108, and, in some aspects, the outlet valve 110 and/or the recirculation valve 112.

In some aspects, the controller 120 can be configured to store historical data associated with the device 100 in the memory 124. For example, the controller 120 can be configured to store historical dispense volume data provided by the flow meter 114 in the memory 124 for tracking usage of the filter module 104 over time. In variations of the device 100 relying on a removable filter cartridge, the controller 120 can rely on historical dispense volume data as a means by which filter health can be monitored and communicated to a user.

In some aspects, the controller 120 can be configured to control components such as the pump 108, the outlet valve 110, and the recirculation valve 112 to prevent pressure buildups within the beverage device 100 (e.g., pressure buildups within the filter module 104). For example, during a filtering and dispensing operation, the controller 120 can be configured to operate the pump 108 and the outlet valve 110 such that there is a deliberate delay between (i) the pump 108 turning on or off and (ii) the outlet valve 110 opening or closing. In some aspects, when initiating dispensing, the controller 120 first opens the outlet valve 110 after a predefined delay following pump start to avoid pressure spikes and entrained air release at the outlet. Conversely, when terminating dispensing, the controller 120 may close the outlet valve 110 and, after a controlled delay, stops the pump 108 to prevent sudden pressure collapse and reverse flow through the filter module 104.

To further mitigate pressure buildup across the filter module 104 during outlet valve closure, the controller 120 can be configured to selectively open the recirculation valve 112 to establish a bypass path that relieves pressure away from the dispensing outlet 106. In some aspects, the controller 120 can monitor an attach/detach condition (e.g., via a mechanical switch, magnetic sensor, or pressure transducer signal) of the fluid supply reservoir 102 and, upon detecting reservoir detachment during a pressure relief event—such as at the end of a dispensing cycle—can automatically close the recirculation valve 112 to pause pressure relief and prevent spraying of recirculated fluid from the valve 112 or open ports at the interface between the fluid supply reservoir 102 and the device 100. When the reservoir 102 is reattached, the controller 120 can reinitiate the pressure relief process by reopening the recirculation valve 112.

It should be understood that the combination of beverage device components shown in FIG. 1 is provided by way of example only and should not be construed as limiting. Different aspects of the beverage device may include alternative configurations, additional components, or omissions of certain elements depending on the intended use case, manufacturing constraints, or design preferences. For instance, some aspects may omit the recirculation flow path, use a different type of valve or pump, or implement filter monitoring through time-based tracking rather than flow measurement. Similarly, the arrangement and type of sensors, user interface elements, and controller hardware may vary across implementations.

Various views and components of an example beverage device 200 are provided in FIGS. 2-12. In general, components of the beverage device 200 share features and functionality with like-named and like-numbered components of the beverage device 100, as described with respect to FIG. 1. References to specific components of the beverage device 200 should therefore be understood to encompass the corresponding components of the beverage device 100 unless otherwise noted. For brevity, certain details of the components of beverage device 100 are not repeated, but those details are applicable to corresponding and similar components of beverage device 200.

Figure 2:
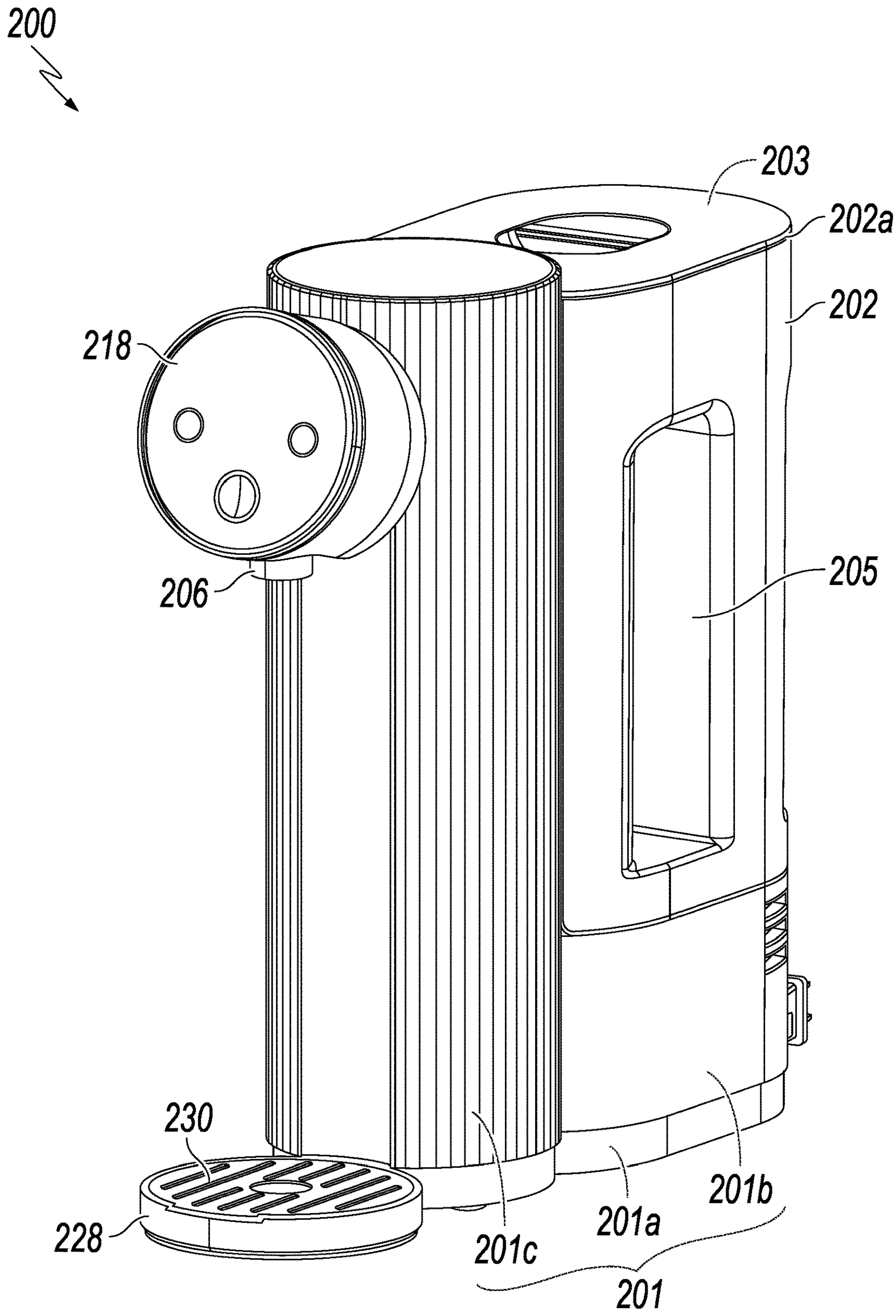
FIG. 2 is a perspective view of another embodiment of a beverage device.

As shown in FIG. 2, the device 200 can include a housing 201, a fluid supply reservoir 202, a dispensing outlet 206, a user interface 218, a drip tray 228 and a slotted support surface 230. Each of these components is described in further detail below.

The housing 201 can enclose and support various components of the device 200. The housing 201 can be formed from a variety of materials, including injection-molded plastics (e.g., ABS, polycarbonate), stainless steel, aluminum, or composite materials, selected based on factors such as durability, thermal performance, cost, aesthetic appeal, etc.

The housing 201 can define the overall footprint of the device 200. In the illustrated embodiment, the footprint defined by the housing 201 is a generally narrow, oblong shape with rounded edges. This form factor can contribute to a pleasing ornamental and aesthetic appearance and can enable the device 200 to be positioned in areas with limited available space, such as small kitchen countertops, office break rooms, or dormitories. As a result, the device 200 may be well-suited for users with compact living environments or minimal counter space, offering both functional and visual integration into modern home and workspace settings.

In some aspects, a length of a first dimension of the device 200 (e.g., a length between the front of the device 200 and the rear of the device 200) can be between 300 and 500 mm, for example, approximately 325 mm, approximately 340 mm, approximately 350 mm, approximately 365 mm, or approximately 375 mm in length. In some aspects, a length of a second dimension of the device 200 (e.g., a width of the device 200) can be between 100 and 300 mm, for example, approximately 125 mm, approximately 127 mm, approximately 129 mm, or approximately 131 mm. In some aspects, a length of a third dimension of the device 200 (e.g., a height of the device 200) can be between 325 and 525 mm, for example, approximately 350 mm, approximately 352 mm, approximately 354 mm, approximately 358 mm, or approximately 360 mm.

As shown in FIG. 2, the housing 201 can include a base portion 201*a*, a rear portion 201*b*, and an elongate front portion 201*c*. The base portion 201*a* can be arranged at lower ends of the rear portion 201*b* and the front portion 201*c* and can be configured to support the device 200 on a support surface such as a countertop or a tabletop. The rear portion 201*b* can be configured to support the fluid supply reservoir 202. The front portion 201*c* can be generally cylindrical in shape and can extend from the base portion 201*a* to a height above the rear portion 201*b*.

The fluid supply reservoir 202 can be removably coupled to the rear portion 201*b*. As with the reservoir 102 of the beverage device 100 described with respect to FIG. 1, the reservoir 202 is generally capable of storing unfiltered fluid that the device 200 can draw upon. The reservoir 202 can have an elongate shape with a rounded outer surface. When connected to the rear portion 201*b*, as shown in FIG. 2, the outer surface of the water reservoir can be flush with the outer surface of the rear portion 201*b*. This can ensure that the footprint of the device 200 does not change when the water reservoir is connected to the housing 201.

The reservoir 202 can have an open upper end through which fluid can be added to the interior volume of the reservoir 202. The open upper end 202*a* can be covered by a lid 203, which can be connected to the reservoir 202 through any suitable means (e.g., by a hinge, by a snap-fit mechanism, by a press-fit mechanism, etc.). In some aspects, the lid 203 and/or the reservoir 202 can include sealing features to prevent fluid leaks out of the open upper end and to mitigate heat transfer into the interior volume of the reservoir 202.

To facilitate handling (for example, during removal for refilling and/or chilling), the outer side surface of the reservoir 202, or any other portion of the reservoir 202, can include one or more features to ease handling by a user, such as the depicted indents 205. The indents 205 can be grasped by a user and can reduce the risk of the water reservoir 202 being dropped. Other such features to ease handling can include various handles, grips, textured surfaces, etc.

An upper end of a front side of the front portion 201*c* can support the dispensing outlet 206. In general, the dispensing outlet 206 can share features and functionality with the dispensing outlet 106 of the beverage device 100 described with respect to FIG. 1. The device 200 can be configured to dispense fluid through the dispensing outlet 206 for user consumption. A user of the device 200 can collect fluid that is dispensed by the device 200 through the dispensing outlet 206 in a vessel such as a cup or a bottle by placing the vessel below the dispensing outlet 206.

The user interface 218 can be supported on the upper end of the front side of the front portion 201*c* in front of the dispensing outlet 206. In general, the user interface 218 can share features and functionality with the user interface 118 of the beverage device 100 described with respect to FIG. 1. That is, the user interface 218 can be coupled to a controller of the beverage machine 200 and can facilitate interaction between users and the device 200. In some aspects, the user interface 218 can include a display screen, such as an LCD, OLED, or e-ink display, for presenting information regarding, for example, device status, alerts, and instructions.

A lower end of the front side of the front portion 201*c* can support the drip tray 228 and the slotted support surface 230. This arrangement of the drip tray 228 relative to the dispensing outlet 206 can enable the drip tray 228 to collect excess fluid that may drip or spill during or after dispensing, helping to maintain cleanliness around the device 200 and protecting surrounding surfaces from moisture damage.

In some aspects, the drip tray 228 can be detachable from the housing 201, allowing users to easily empty and clean it as needed. For example, the drip tray 228 may be magnetically attached or snap-fit into a base 226*c* of the housing 201, or otherwise connect to the rest of the device 200 in a manner that facilitates simple removal. In some aspects, the drip tray 228 can include fill level indicators to inform a user when fluid collected by the drip tray 228 has reached a level warranting emptying, or overflow protection features to guard against excess fluid entering the drip tray 228 beyond its capacity. The drip tray 228 can be formed from materials such as plastic, stainless steel, or composite polymers, selected for durability, ease of cleaning, and/or aesthetic compatibility with the device housing.

The slotted support surface 230 can overlay the drip tray 228 and can be configured to support cups or containers beneath the dispensing outlet 206 while also allowing fluid to drain into a lower catch basin thereof. The slotted support surface 230 can be removable from the drip tray 228 to facilitate cleaning of the support surface 230 as well as emptying and cleaning of the drip tray 228. The slotted support surface 230 can be formed from materials such as plastic, stainless steel, composite polymers, and/or the like.

Figure 3:
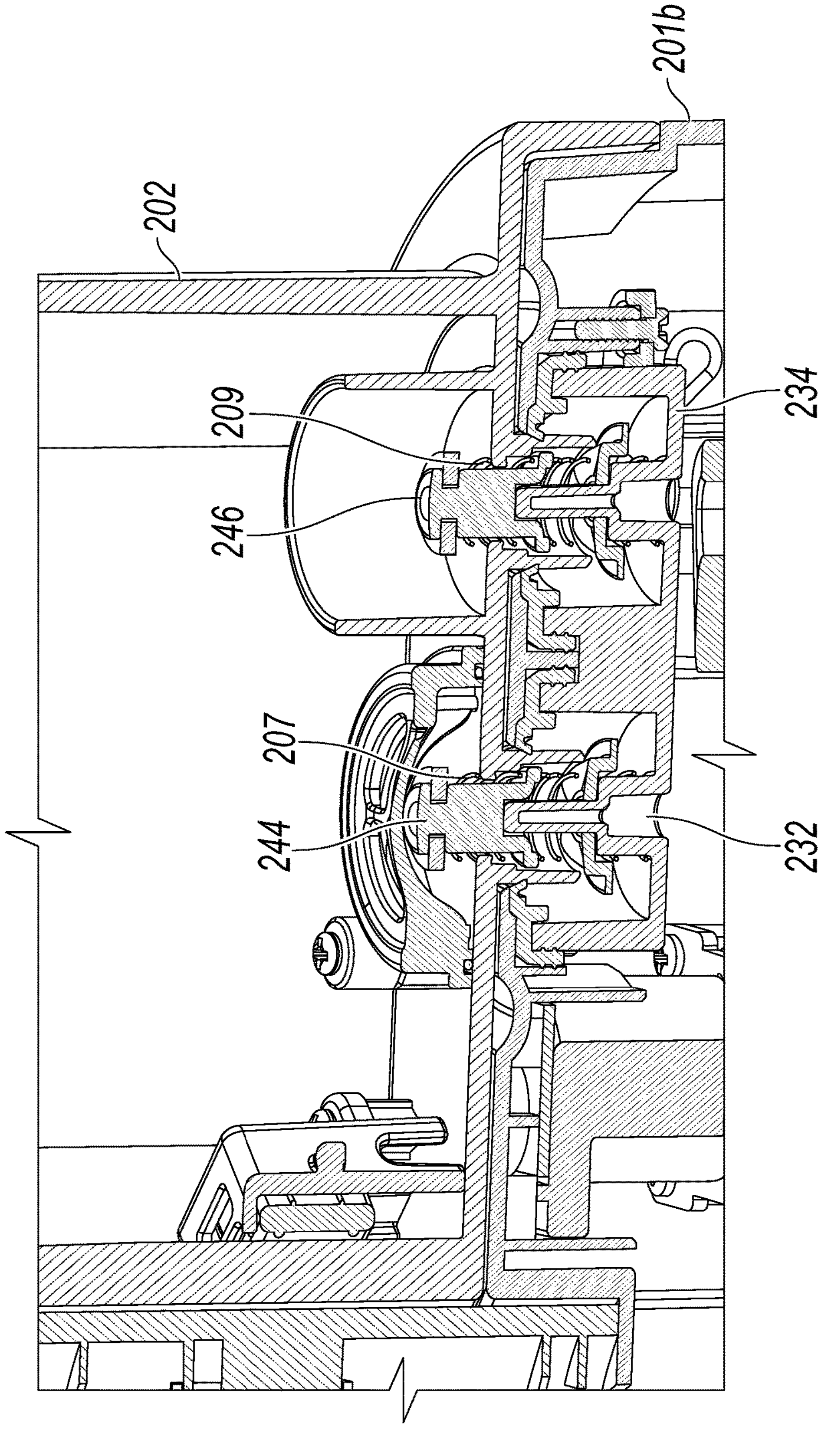
FIG. 3 is a cross-sectional side view of a pair of valves of a fluid supply reservoir of the beverage device of FIG. 2.

To fluidly couple the reservoir 202 with the rest of the device, the reservoir 202 can include features to selectively permit and prevent fluid transfer to and from the reservoir 202, such as when the reservoir 202 is removed and handled by a user versus when water is drawn from the reservoir 202 during operation of the device. As shown in FIG. 3 the bottom surface of the reservoir 202 can include a pair of openings 207, 209 extending therethrough. A first check valve 244 can be arranged in the opening 207 and a second check valve 246 can be arranged in the opening 209. The check valves 244, 246 can be spring-biased to a closed configuration. The rear portion 201*b* of the housing 201 can support a corresponding pair of valve seats 232, 234. When the reservoir 202 is connected to the housing 201, the valve seat 232 can interface with the first check valve 244 to force the valve 244 into an open configuration. Likewise, when the reservoir is connected to the housing 201, the valve seat 234 can interface with the second check valve 246 to force the valve 246 into an open configuration. When the reservoir 202 is decoupled from the housing 201, the valves 244, 246 can be configured to automatically return to their closed configurations as they disengage from their respective valve seats 232, 234. Though described as check valves, the valves 244, 246 can be any valve or similar structure capable of selectively closing the openings 207, 209.

Similar to the beverage device 100 described with respect to FIG. 1, the beverage device 200 can filter unfiltered fluid sourced from the fluid reservoir 202 and to provide said filtered fluid to users of the device 200 via the dispensing outlet 206. Additionally, like the beverage device 100, the beverage device 200 can recirculate fluid received from the fluid reservoir and that is retained in other (non-reservoir) components of the beverage device 200 back into the reservoir 202 to manage the temperature of the fluid being filtered and dispensed. As described in further detail below, the housing 201 can contain components of the device 200 that enable unfiltered fluid to be pulled from the reservoir 202, filtered, and dispensed via the outlet 206, as well as components that enable fluid to be recirculated back into the reservoir 202.

Figure 4:
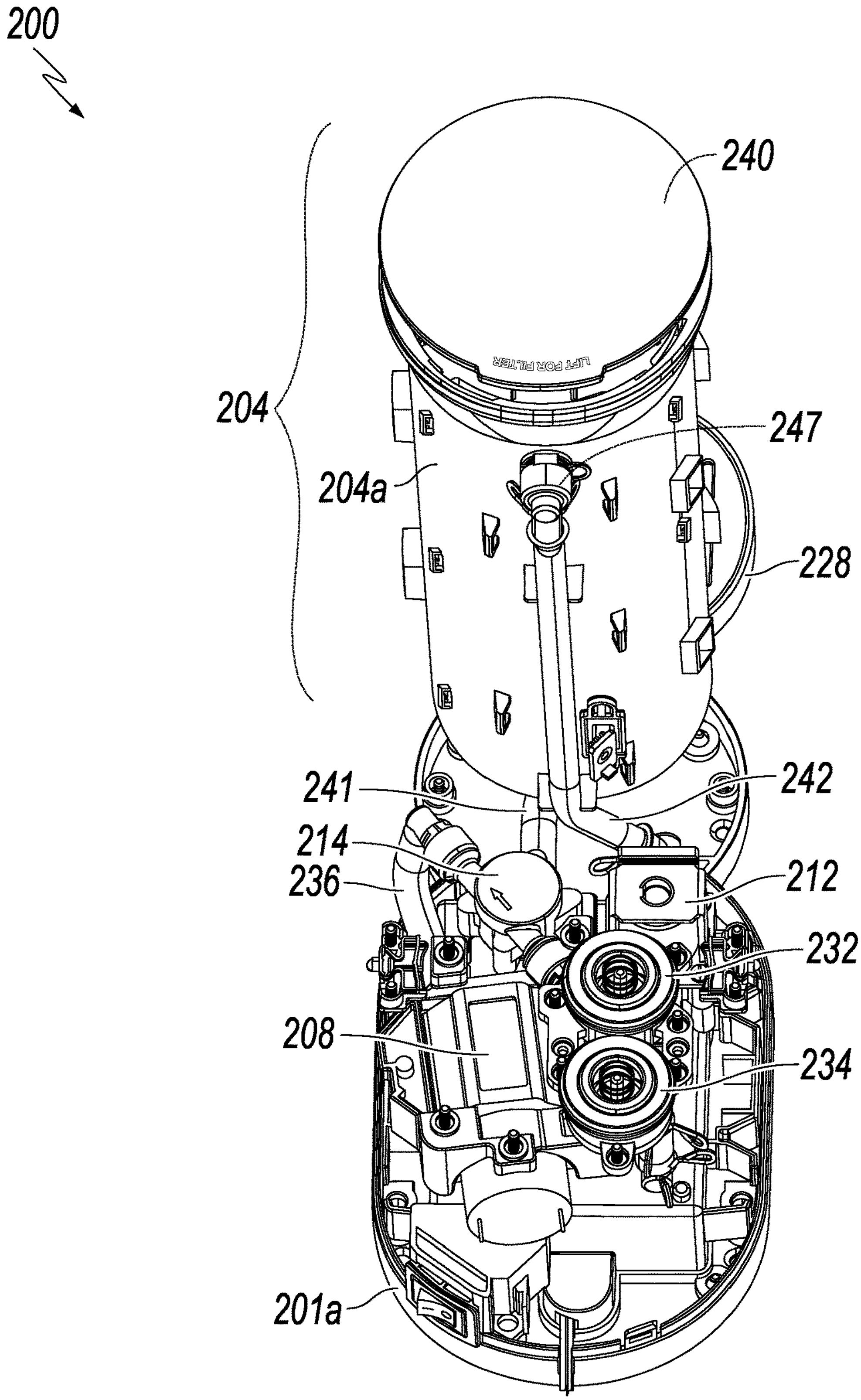
FIG. 4 is a top perspective view of the beverage device of FIG. 2, with a hidden housing and fluid supply reservoir of the beverage device.
Figure 5:
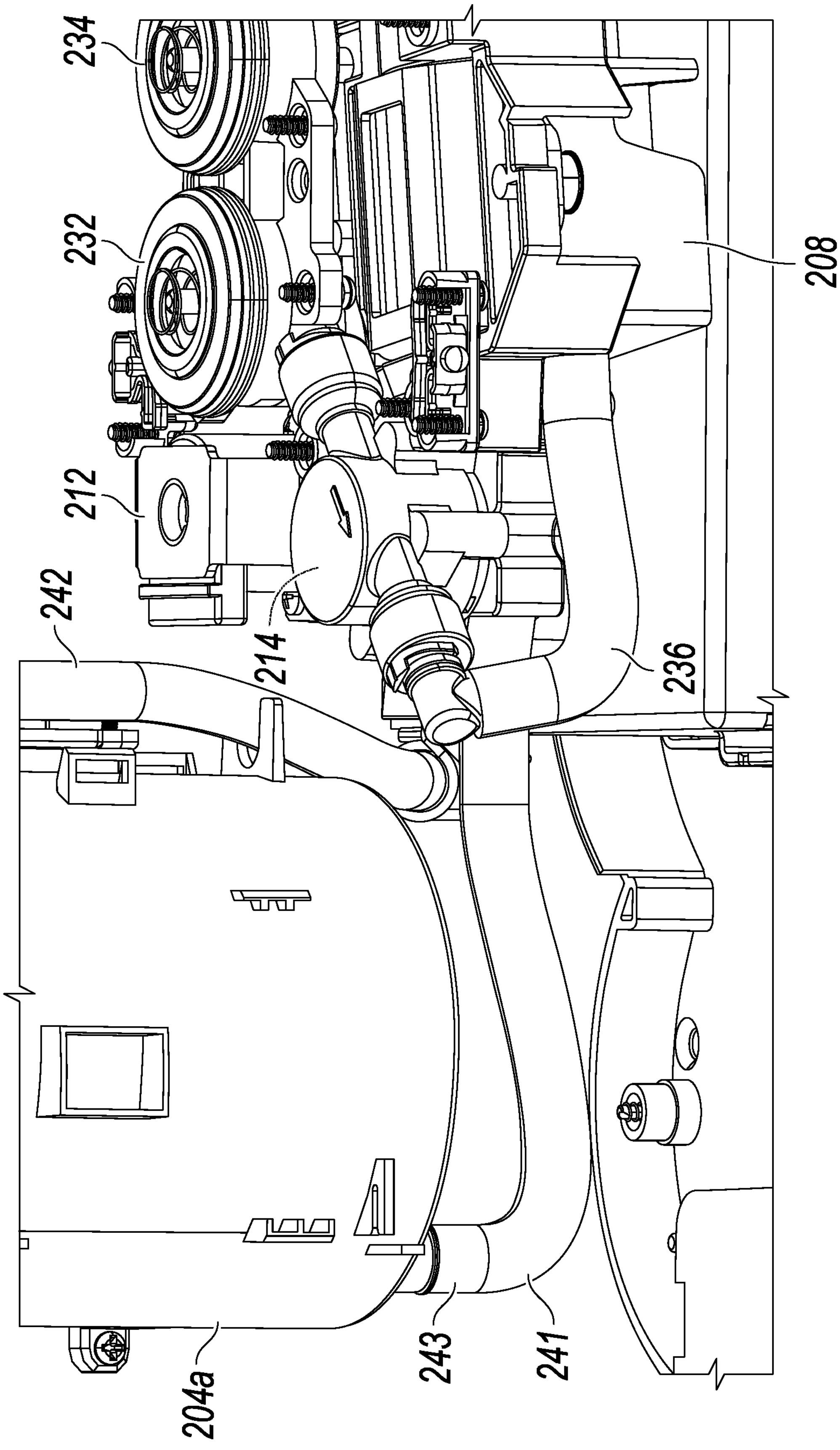
FIG. 5 is a partial perspective view a flow path defined by the beverage device of FIG. 2.

Referring now to FIGS. 4-5, the housing 201 can contain a pump 208, a flow meter 214, a first flow tube 236, a filter module 204, a second flow tube 241, a recirculation valve 212 and a third flow tube 242. Each of these components is described in further detail below.

The pump 208 can be configured to drive fluid through various components of the beverage device 200. In general, the pump 208 can share features and functionality with the pump 108 of the beverage device 100 described with respect to FIG. 1. As described herein, the controller of the beverage device 200 can be configured to operate the pump to, for example, draw unfiltered fluid from the reservoir 202 for filtering and dispensing through the dispensing outlet 206, or to recirculate fluid that was previously removed from the reservoir 202 back to the reservoir 202 to facilitate fluid temperature management.

The flow meter 214 can be configured to measure a rate at which fluid is drawn out of the fluid reservoir 202 by the pump 208. In general, the flow meter 214 can share features and functionality with the flow meter 114 of the beverage device 100 described with respect to FIG. 1. The flow meter 214 can be coupled to the controller of the beverage device 200, which can be configured to use data provided by the flow meter 214 to, for example, determine a health status of consumable components (e.g., filtering components) of the beverage device 200, as described herein.

The first flow tube 236 can provide a flow path between the flow meter 214 and the pump 208. The first flow tube 236 can include a fluid inlet, a fluid outlet, and a channel defined therebetween. Fluid can enter the flow tube 236 through the fluid inlet, flow along the channel, and exit the flow tube 236 through the fluid outlet. The flow tube 236 can be implemented using a rigid pipe (e.g., a plastic or a metal pipe), flexible tubing (e.g., rubber tubing), or a combination thereof. In some aspects, one or more valves can be arranged within the flow tube 236 to provide additional control over the flow of fluid through the flow tube 236.

The filter module 204 can be configured to receive unfiltered fluid from the reservoir 202 and to remove impurities from the fluid before the fluid is dispensed for consumption. In general, the filter module 204 can share features and functionality with the filter module 104 of the beverage device 100 described with respect to FIG. 1. In the illustrated embodiment, the filter module 204 includes a filter seat 204*a*. As shown in FIG. 4, the filter seat 204*a* can be an elongate cylindrical container configured to receive removable filtering components of the filter module 204, as described herein. A removable cover 240 can cover an upper end of the filter seat 204*a* to contain the removable filtering components of the filter module 204 therein.

The second flow tube 241 can provide a flow path between the pump 208 and the filter module 204. Specifically, as shown in FIG. 5, the second flow tube 241 can provide a flow path between the pump 208 and an inlet 243 of the filter seat 204*a*. Like the first flow tube 236, the second flow tube 241 can include a fluid inlet, a fluid outlet, and a channel defined therebetween. Fluid can enter the flow tube 241 through the fluid inlet, flow along the channel, and exit the flow tube 241 through the fluid outlet. The flow tube 241 can be implemented using a rigid pipe (e.g., a plastic or a metal pipe), flexible tubing (e.g., rubber tubing), or a combination thereof. In some aspects, one or more valves can be arranged within the flow tube 241 to provide additional control over the flow of fluid through the flow tube 241.

During a filtering operation, unfiltered fluid can be drawn from the fluid reservoir 202 by the pump 208 via the valve seat 232. This unfiltered fluid can be pulled from the valve seat 232, through the flow meter 214, and into the pump 208 via the first flow tube 236. The pump 208 can then drive the unfiltered fluid into the filter module 204 through the inlet 243 to the filter seat 204*a*, via the second flow tube 241.

In addition to driving fluid from the reservoir 202 to the filter module 204 for filtering, the pump 208 can also be configured to recirculate fluid contained in the filter module 204 back into the reservoir 202, enabling fluid retained in the filter module 204 to be returned to the reservoir 202. This recirculation capability can allow retained fluid that has warmed during idle periods to be cycled back into the reservoir 202, where it can be mixed with the chilled fluid contained in the reservoir 202 to reduce its temperature. This can enable the device 200 to consistently deliver beverages at a desirable temperature, even after extended periods of non-use.

The recirculation valve 212 can be configured to facilitate recirculation of fluid by controlling the flow of fluid back into the fluid reservoir 202 via the valve seat 234. In general, the recirculation valve 212 can share features and functionality with the recirculation valve 112 of the beverage device 100 described with respect to FIG. 1. In the illustrated embodiment, the recirculation valve 212 is a solenoid valve. The recirculation valve 212 can be coupled to the controller of the beverage device 200, which can be configured to selectively open and close the valve 212 to control recirculation of fluid back into the fluid reservoir 202, as described herein.

The third flow tube 242 can provide a flow path between the filter module 204 and the recirculation valve 212. Specifically, as shown in FIG. 4, the third flow tube 242 can provide a flow path between an outlet 247 of the filter seat 204*a* and the recirculation valve 212. Like the first flow tube 236 and the second flow tube 241, the third flow tube 242 can include a fluid inlet, a fluid outlet, and a channel defined therebetween. Fluid can enter the flow tube 242 through the fluid inlet, flow along the channel, and exit the flow tube 242 through the fluid outlet. The flow tube 242 can be implemented using a rigid pipe (e.g., a plastic or a metal pipe), flexible tubing (e.g., rubber tubing), or a combination thereof. In some aspects, one or more valves can be arranged within the flow tube 242 to provide additional control over the flow of fluid through the flow tube 242.

During a recirculation operation, fluid contained by the filter module 204 can be driven out of the fluid module 204 through the outlet 247 of the filter seat 204*a* by the pump 208. The pump 208 can then drive the fluid through the third flow tube 242 to the recirculation valve 212. The controller of the beverage device 200 can open the recirculation valve 212 to allow the fluid to pass through the recirculation valve to the valve seat 234, where it can then be received by the fluid reservoir 202.

Figure 6:
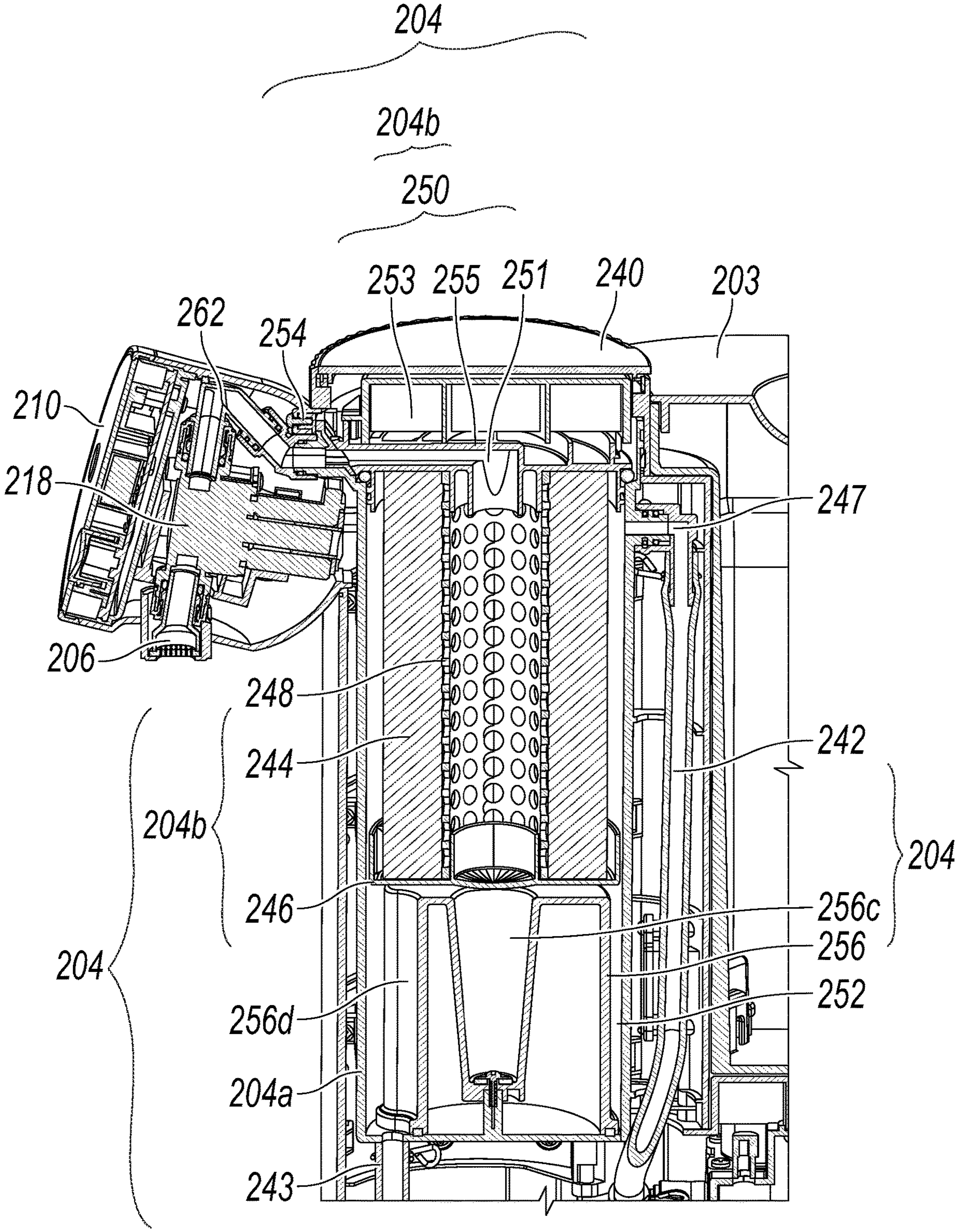
FIG. 6 is a cross-sectional side view of a filter module, and a dispensing outlet of the beverage device of FIG. 2.

As described, the filter module 204 can be configured to remove impurities from unfiltered fluid received from the fluid reservoir 202. The components of the filter module 204 are described in further detail below with respect to FIGS. 6-12. FIG. 6 illustrates a cross-sectional view of the filter module 204; FIGS. 7-12 depict various components of the filter module 204 in isolation.

As previously noted, and as shown in FIG. 6, the filter seat 204*a* can define a chamber 252 therein. The inlet 243 can be an opening formed in a bottom surface of the filter seat 204*a*. Unfiltered fluid can enter the chamber 252 through the inlet 243.

Figure 7:
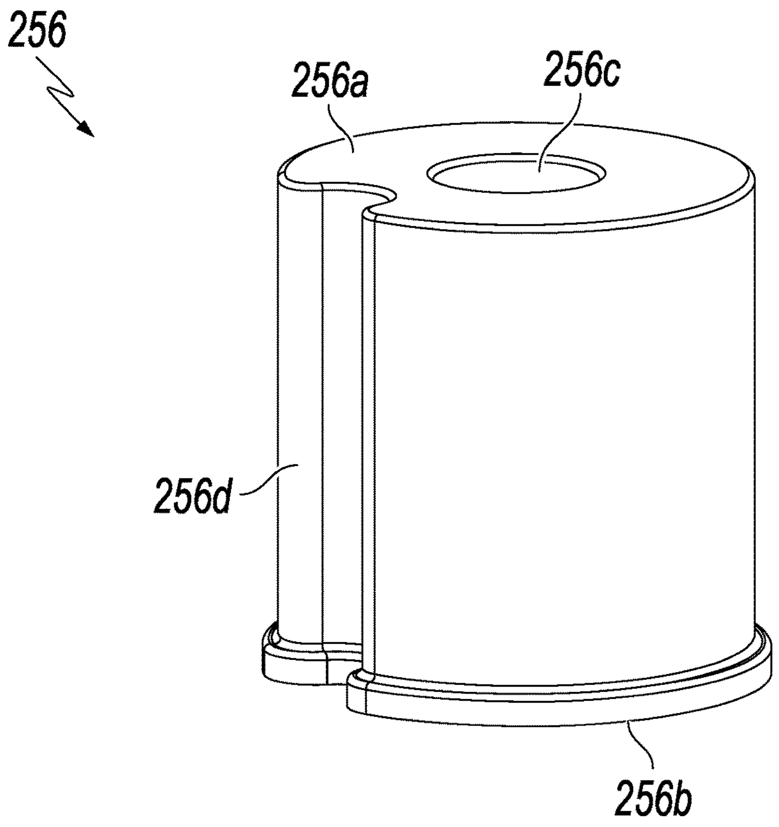
FIG. 7 is an isolated perspective view of a base volume reducer of the beverage device of FIG. 2.

A lower portion of the chamber 252 adjacent to the inlet 243 can contain a base volume reducer 256. As shown in FIGS. 6 and 7, the base volume reducer 256 can be substantially cylindrical with a closed upper surface 256*a* and an open lower end 256*b*. A cavity 256*c* can be formed in the upper surface 256*a*. The cavity 256*c* can have a frustoconical shape (FIG. 6). An indent 256*d* that extends along an entire length of the base volume reducer 256 can be formed in one side of the base volume reducer 256. The base volume reducer 256 can be arranged in the chamber 252 such that the indent 256*d* is adjacent to the inlet 243. Fluid that enters the chamber 252 via the inlet 243 can first fill a portion of the chamber 252 that surrounds the base volume reducer 256. When the fluid reaches the upper surface 256*a* of the base volume reducer 256, it can begin to fil the cavity 256*c*. The bottom edge of the element 256 that defines the open lower end 256*b* can be sealed to the bottom surface of the chamber 252 such that no fluid enters the portion of the chamber 252 beneath the element 256. This empty portion of the chamber 252 can insulate the fluid contained in the chamber 252 to mitigate heat transfer into the fluid.

The base volume reducer embodiment illustrated in FIGS. 6 and 7 is provided as an example. Other base volume reducer aspects can omit features of the base volume reducer 256 or include features in addition to, or that differ from, the features of the base volume reducer 256. For example, in some aspects, a base volume reducer may not include a cavity such as the cavity 256*c*. In some aspects, a base volume reducer can be secured by crush ribs. In some aspects, a base volume reducer can be configured to be removable from the filter seat by a user, and can include a grip feature to facilitate user removal. In some aspects, a base volume reducer can have a base welded to a bottom portion thereof that defines a sealed volume within the base volume reducer.

The chamber 252 can be configured to receive a removable filter cartridge 204*b*. The filter cartridge 204*b* can be configured to remove impurities from unfiltered fluid that is pumped into the chamber 252 via the inlet 243 to the filter seat 204*a*. The filter cartridge 204*b* can be configured to be decoupled from the filter seat 204*a* and replaced with another, unused filter cartridge to as desired, such as at the end of a life cycle of the filter cartridge 204*b* or a component thereof.

As shown in FIG. 6, the filter cartridge 204*b* can include a filter medium 249, a lower end cap 246, a central core 248, and an upper end cap 250U. Each of these components is described in further detail below.

Figure 8:
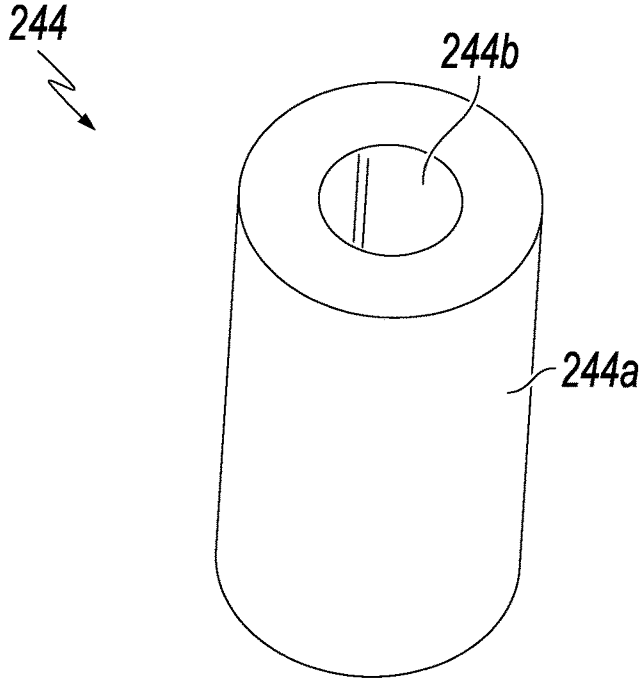
FIG. 8 is an isolated perspective view of a filter medium of the filter module of the beverage device of FIG. 2.

The filter medium 249 can be configured to remove contaminants such as particulates from unfiltered fluid received in the filter seat 204*a*. As shown in FIGS. 6 and 8, the filter medium 249 can have a hollow cylindrical structure defining a central channel 244*b* therethrough. The filter medium 249 can be configured to receive unfiltered fluid at an exterior surface 244*a* thereof. Fluid received at the exterior surface 244*a* can be drawn into the filter medium 249 toward the central channel 244*b*.

Figure 9:
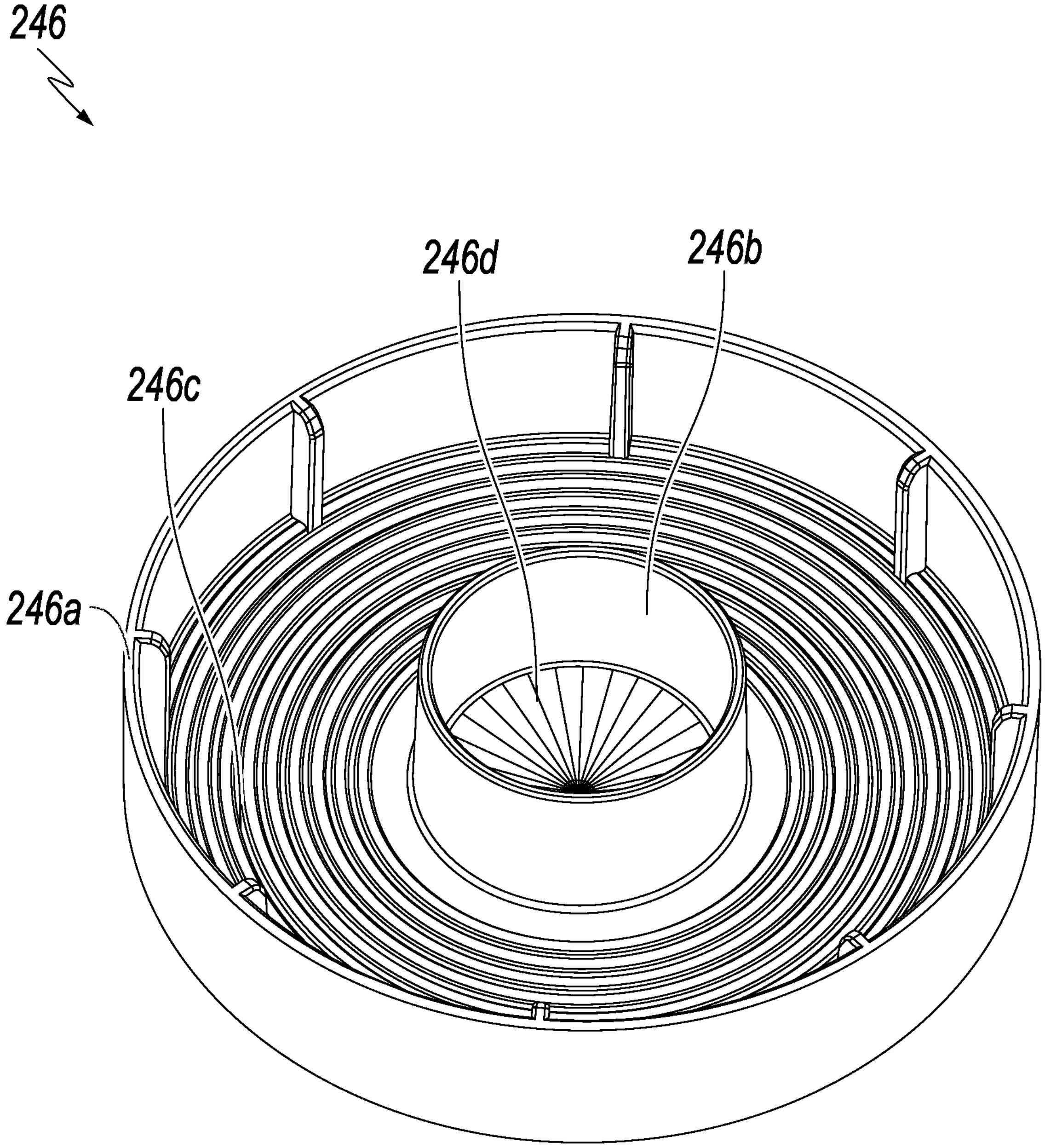
FIG. 9 is an isolated perspective view of a lower end cap of the filter module of the beverage device of FIG. 2.

A lower end of the filter medium 249 can be connected to the lower end cap 246. The lower end cap 246 can be configured to retain the filter medium 249 thereon. As shown in FIGS. 6 and 9, the lower end cap 246 can include an outer wall 246*a* and an central inner wall 246*b*. An annular region 246*c* defined between the outer wall 246*a* and the inner wall 246*b* can provide a seat for the filter medium 249. The inner wall 246*b* can be configured to extend through a lower end of the central channel 244*b*. When the filter medium 249 is connected to the cap 246, a central region 246*d* of the cap 246 encircled by the inner wall 246*b* can cover the open lower end of the central channel 244*b*.

The filter medium 249 can be connected to the lower end cap 246 using an adhesive (e.g., glue). As shown in FIG. 9, the surface of the lower end cap 246 can have a ribbed texture. This ribbed texture can increase a contact surface of the adhesive to facilitate and strengthen adhesion between the filter medium and the lower end cap 246.

Figure 10:
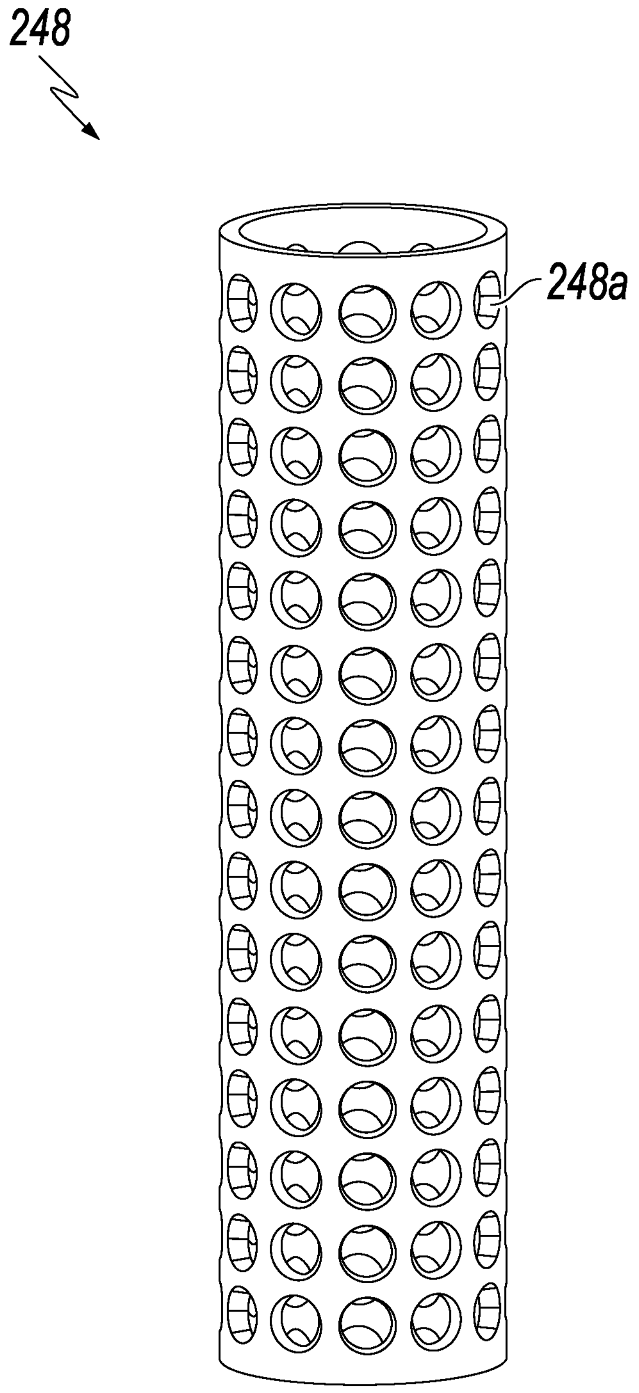
FIG. 10 is an isolated perspective view of a central core of the filter module of the beverage device of FIG. 2.

The central core 248 can be arranged in the central channel 244*b* of the filter medium 249 and can be configured to prevent the filter medium 249 (which can be formed from a non-rigid material) from collapsing inward or otherwise deforming. The central core 248 can have a hollow cylindrical structure, as shown in FIGS. 6 and 10. The side surface of the central core 248 can be perforated with numerous through-holes 248*a*. A lower edge portion of the central core 248 can encircle the inner wall 246*b* of the lower end cap 246

The filter medium 249, the inner wall 246*b* and central region 246*d* of the lower end cap 246, and the central core 248 can together define a central cavity of the filter cartridge 204*b*. During a filtering operation, unfiltered fluid can be driven through the inlet 243 of the filter seat 204*a* and into the chamber 252. As previously described, the fluid can first fill the lower portion of the chamber 252 adjacent to the element 256. When the cavity 256*c* of the element 256 fills completely, the fluid level in the chamber 252 can continue to rise until it passes around the outer wall 246*a* of the lower end cap 246 of the filter cartridge 204*b*. At this point, the unfiltered fluid can be received by the filter medium 249 at its exterior surface 244*a* and drawn therethrough to produce filtered fluid. The filtered fluid can then flow into the central cavity defined by the central channel 244*b* of the filter medium 249, the inner wall 246*b* and central region 246*d* of the lower end cap 246, and the central core 248, via the through-holes 248*a* in the central core 248.

Figure 11A:
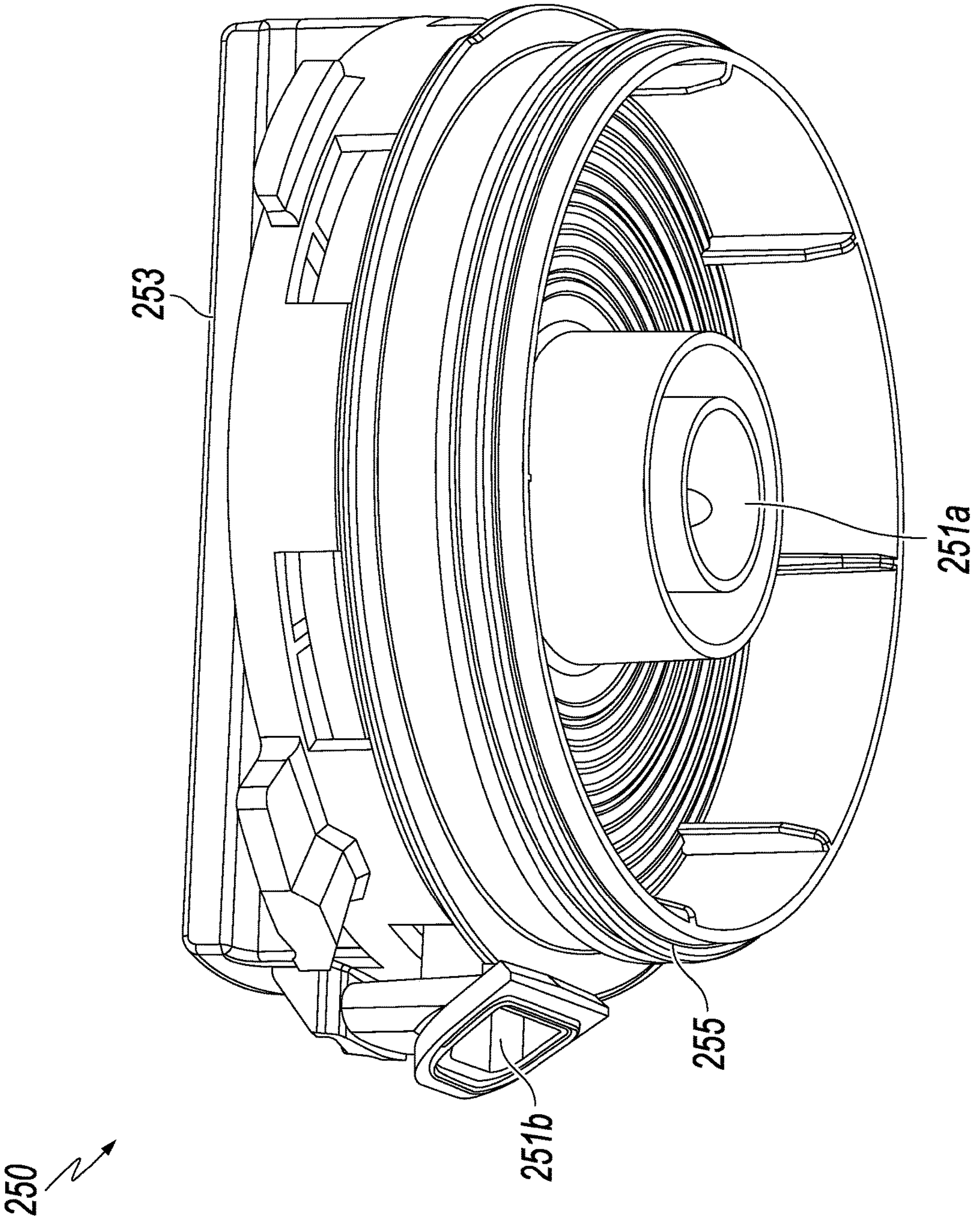
FIG. 11A is an isolated perspective view of an upper end cap of the filter module of the beverage device of FIG. 2.

The upper end cap 250U can be coupled to an upper end of the filter medium 249. As described in further detail below, the upper end cap 250U can be configured to fluidically couple the filter cartridge 204*b* to the dispensing outlet 206 of the beverage device 200. The upper end cap 250U can include a locking mechanism 253 and a cap body 255. The cap body 255 can define a fluid pathway 251. As shown in FIGS. 6 and 11A, and inlet 251*a* to the fluid pathway 251 can extend into the central chamber of the filter module 204. FIG. 11A, for example, depicts the cap body 255 with a filter medium removed to highlight the structure of the cap body 255 more easily.

An outlet 251*b* of the fluid pathway 251 can be configured to fluidically couple to an inlet 245 formed at an upper end of the filter seat 204*a*. The inlet 245 can, in turn, be in fluid communication with a fluid pathway 262 that leads to the dispensing outlet 206. To prevent leaks, the outlet 251*b* on the cap 250 and/or the inlet 245 can include sealing features (e.g., gaskets, O-rings, etc.) configured to provide a face seal at the interface between the outlet 251*b* and the inlet 245.

During a dispensing cycle, filtered fluid that collects in the central chamber of the filter cartridge 204*b* can be driven into the fluid pathway 251 through the inlet 251*a*. The filtered fluid can flow along the fluid pathway 251 until it exits the cap body 255 through the outlet 251*b*, passes through the outlet 245, and enters the fluid pathway 262. In the embodiment illustrated in FIG. 11A, the outlet 251*b* of the fluid pathway 251 has a generally rounded-trapezoidal geometry. In other aspects, other outlet geometries can be implemented.

Figure 11B:
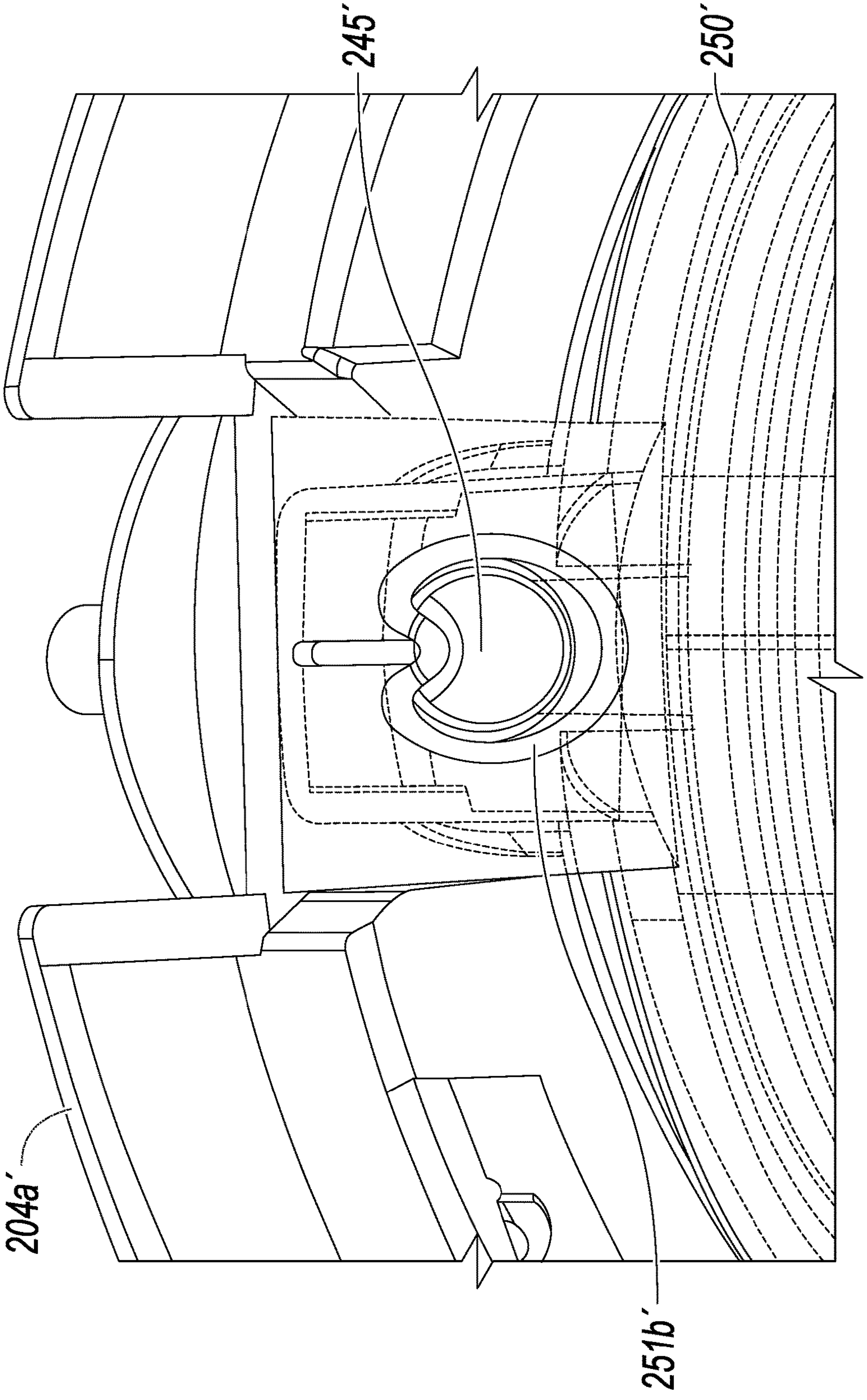
FIG. 11B is a perspective view of another embodiment of an upper end cap and filter seat of a filter module of a beverage device.

FIG. 11B depicts another embodiment of an upper end cap 250U' connected to another embodiment of a filter seat 204*a*'. In general, the upper end cap 250U' and the filter seat 204*a*' can share features and functionality with the upper end cap 250U and the filter seat 204*a*. As shown, the upper end cap 250U' can include an outlet 251*b*' that is configured to connect to an inlet 245' of the filter seat 204*a*'. In the illustrated embodiment, the outlet 251*b*' and the inlet 245' each have a dented circular (e.g., bean-shaped or apple-shaped) geometry.

Figure 11D:
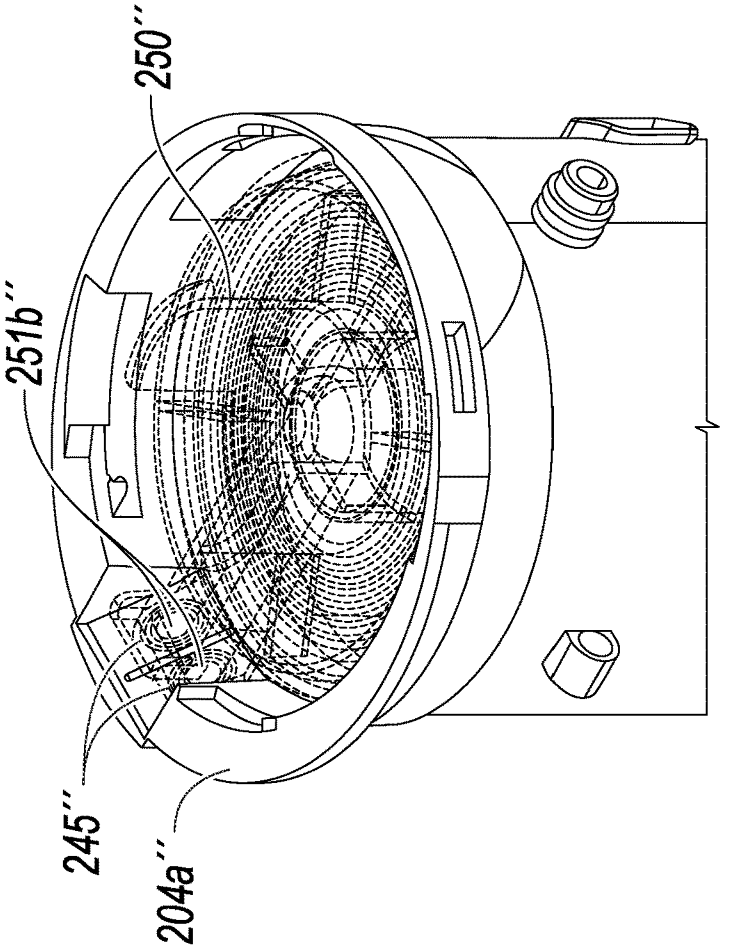
FIG. 11D is a perspective view of the upper end cap of FIG. 11C connected to another embodiment of a filter seat of a filter module of a beverage device.
Figure 11C:
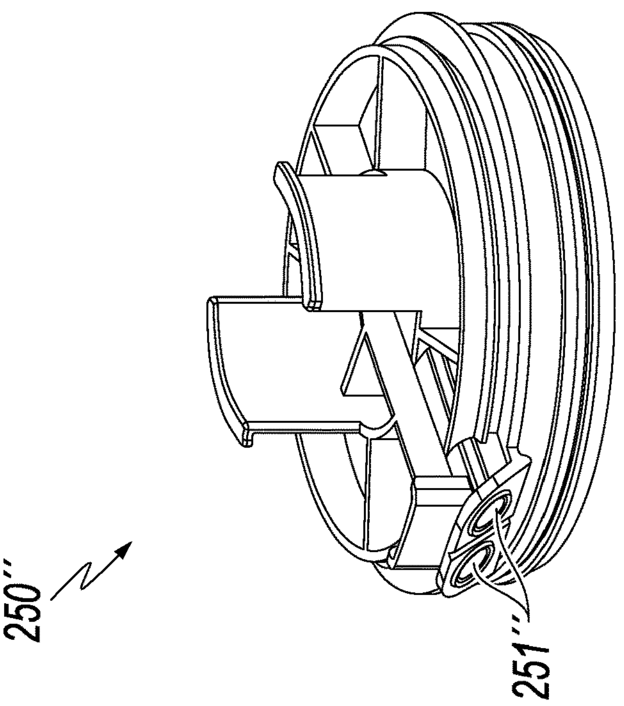
FIG. 11C is a perspective view of yet another embodiment of an upper end cap of a filter module of a beverage device.

FIGS. 11C-11D show another embodiment of an upper end cap 250U" and another embodiment of a filter seat 204*a*". In general, the upper end cap 250U" and the filter seat 204*a*" can share features and functionality with the upper end cap 250U and the filter seat 204*a*. In the illustrated embodiment, the upper end cap 250U" includes a pair of outlets 251*b*" that are configured to connect to a corresponding pair of outlets 245" of the filter seat 204*a"*.

It should be understood that the illustrated shapes of the outlet 251*b*, 251*b*', and 251*b*" in FIGS. 11A, 11B, 11C, and 11D are exemplary that the shape of the outlet can be modified based on factors such as durability, flow performance, cost, ornamentality, aesthetic appeal, and the like.

As shown in FIG. 6, the device 200 can include an outlet valve 210 arranged in the fluid pathway 262 upstream of the dispensing outlet 206. In general, the outlet valve 210 can share features and functionality with the outlet valve 110 of the device 100 described with respect to FIG. 1. In the illustrated embodiment, the outlet valve 210 is a solenoid valve. The outlet valve 210 can coupled to the controller of the device 200, which can be configured to selectively open and close the valve 210 (e.g., in response to user input provided via the user interface 218) to control dispensing of filtered fluid through the dispensing outlet 206.

Figure 12A:
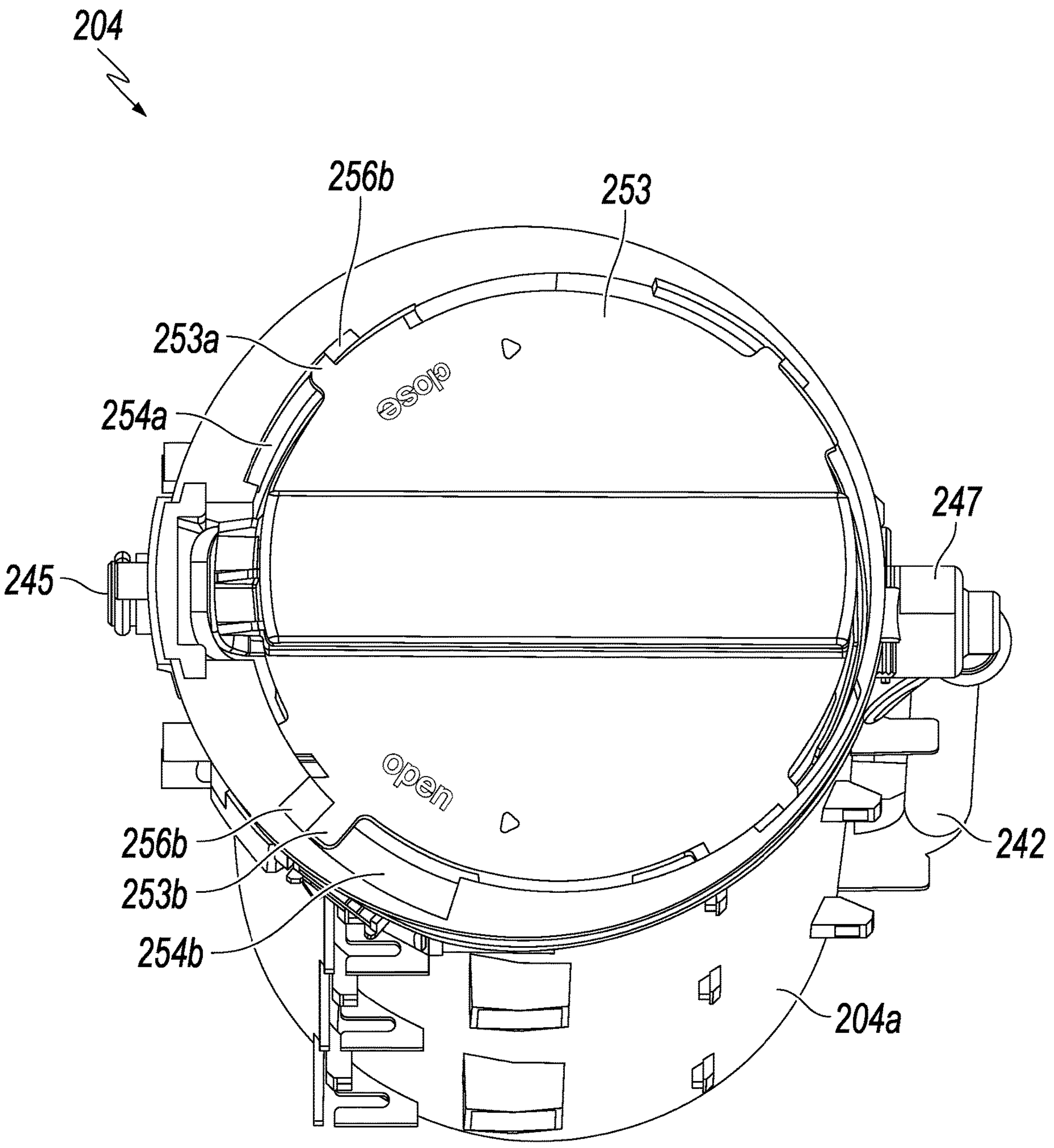
FIG. 12A is a top-down perspective view of the upper end cap and the filter seat of the beverage device of FIG. 2.

The locking mechanism 253 of the upper end cap 250U can be configured to selectively lock the filter cartridge 204*b* to the filter seat 204*a* within the chamber 252. The locking mechanism 253 can include a bayonet mechanism constituted by one or more radial protrusions. In the illustrated embodiment, as shown in FIG. 12A, the locking mechanism 253 includes a first radial protrusion 253*a* and a second radial protrusion 253*b*. The first radial protrusion 253*a* can be configured to engage with a complementary cutout portion 254*a* formed along an upper edge of the filter seat 204*a*. Likewise, the second radial protrusion 253*b* can be configured to engage with a complementary cutout portion 254*b* formed along an upper edge of the filter seat 204*a*. A first stop element 256*a* can be formed at one end of the cutout portion 254*a* and a second stop element 256*b* can be formed at one end of the cutout portion 254*b*.

The locking mechanism 253 can be rotatable relative to the filter medium 249 and the cap body 255 between a first position and a second position. When the locking mechanism 253 is rotated to the first position, the radial protrusions 253*a*, 253*b* can slide along the cutout portions 254*a*, 254*b*, respectively, away from the stop elements 256*a*, 256*b*, respectively, and the filter cartridge 204*b* can unlock from the filter seat 204*a*. Unlocking the filter cartridge 204*b* can enable the filter cartridge to be separated from the filter module 204 and removed from the device 200, for example, for replacing or cleaning. When the locking mechanism 253 is rotated to the second position, the radial protrusions 253*a*, 253*b* can slide along the cutout portions 254*a*, 254*b*, respectively, toward the stop elements 256*a*, 256*b*, respectively, and the filter cartridge 204*b* can lock to the filter seat 204*a*.

In some aspects, one or both of the stop elements 256*a*, 256*b* can include a microswitch. The microswitch(es) can be triggered when the locking mechanism 253 is properly rotated to the second position to lock the filter cartridge 204*b* to the filter seat 204*a*. If the filter cartridge 204*b* is improperly installed, the locking mechanism 253 may not trigger the microswitch(es). In some aspects, if the controller of the device 200 determines that the microswitch(es) are disengaged, the device 200 can provide an alert indicating improper locking of the filter cartridge 204*b* to the filter seat 204*a*.

Figure 12B:
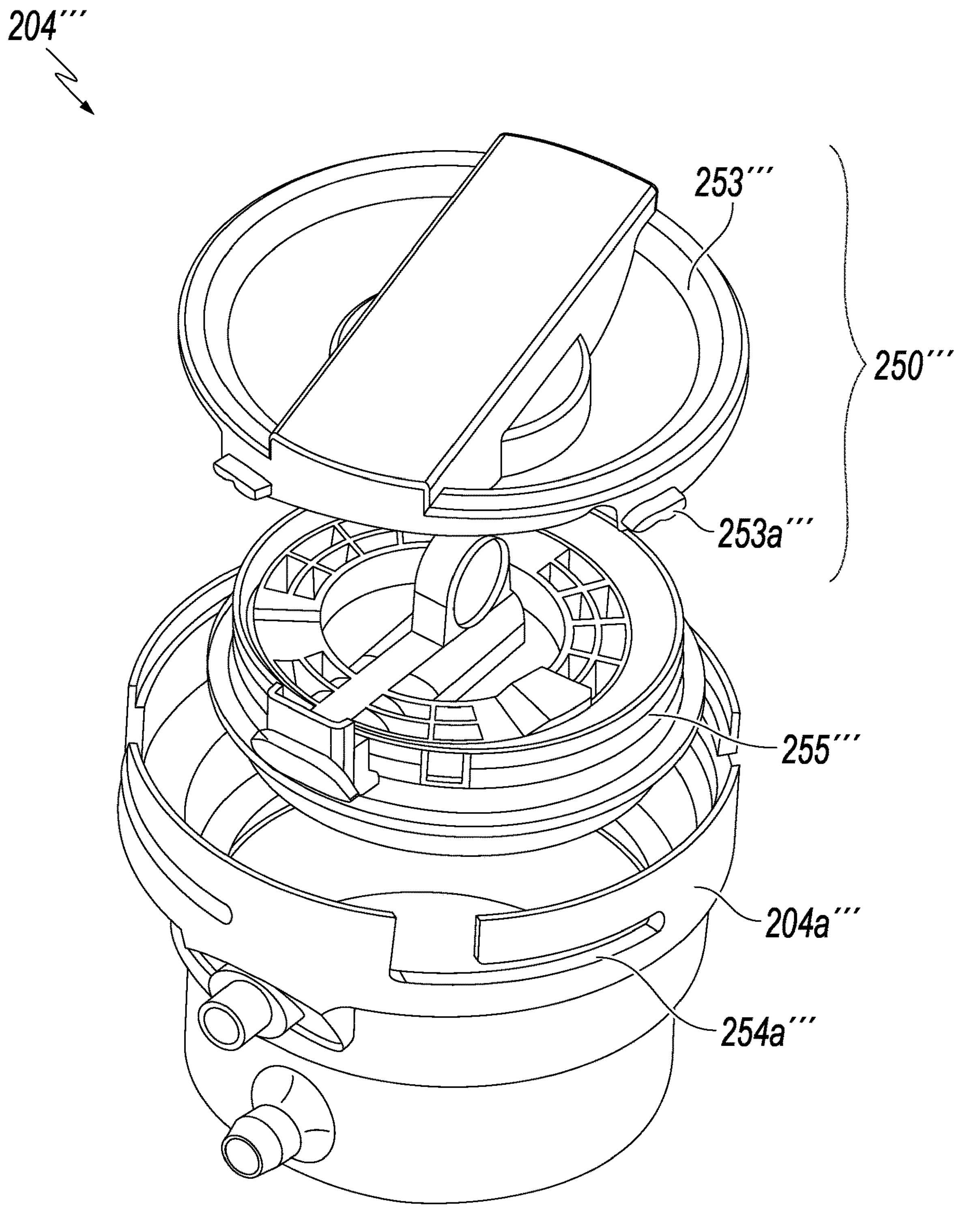
FIG. 12B is an exploded view of another embodiment of an upper end cap and a filter seat of a beverage device.

An alternative embodiment of a filter module 204''' having another locking mechanism implementation is illustrated in FIG. 12B. In general, the filter module 204''' (and components thereof) can share features and functionality with the filter module 204 (and components thereof). Like the filter module 204, the filter module 204''' can include a filter seat 204*a*''' and an upper end cap 250U''' that includes a locking mechanism 253''' and a cap body 255'''.

In the embodiment illustrated in FIG. 12B, the locking mechanism 253" includes ramped protrusions 253*a*''' that extend radially from an outer edge thereof. The filter seat 204*a*''' includes corresponding slots 254*a*''' that are configured to engage with the protrusions 253*a*''' to connect the upper end cap 250U''' to the filter seat 204*a'''*.

Figure 12C:
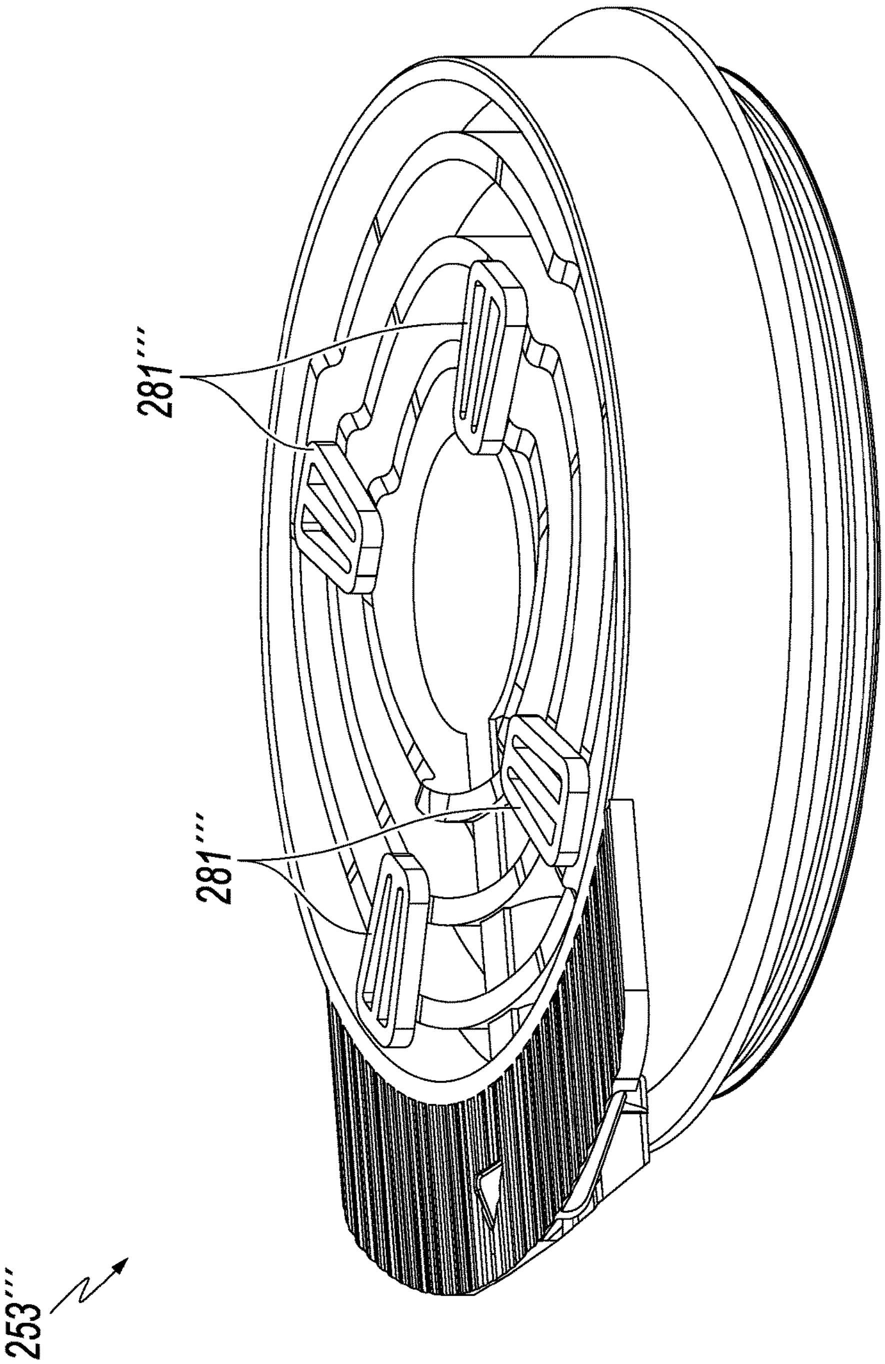
FIG. 12C is an isolated view of a locking mechanism of the upper end cap shown in FIG. 12B.

An isolated view of the locking mechanism 253''' is provided in FIG. 12C. As shown, the locking mechanism 253''' can include one or more ribs 281''' extending from the underside thereof. The ribs 281''' can be configured to interact with ramped bosses on the top of the cap body 255''' to exert downforce when the locking mechanism 253''' is rotated. In some aspects, the ramped bosses can have a flat section such that, when the locking mechanism 253''' is fully rotated, the ribs 281''' on the underside of the locking mechanism 253''' sit on the flat sections of the ramped bosses. The locking mechanism 253''' can be configured to remain at the same height within slots 254*a*''' while the ramped bosses push the cap body 255''' down against an O-ring to compress the O-ring and form a seal. The ramped bosses on the cap body 255''' can sit in a circular pattern that is concentric with the locking mechanism 253''' and not concentric with the cap body 255'''.

Referring to FIGS. 3 and 6, between dispensing cycles, fluid that has entered the chamber 252 of the filter seat 204*a* but has not been dispensed through the dispensing outlet 206 can be retained in the chamber 252. To prevent excess warming of the retained fluid, the device 200 can be configured to recirculate the retained water back into the fluid reservoir 202. During a recirculation cycle, fluid contained in the chamber 252 can be driven through the outlet 247 of the filter seat 204*a*, which can be formed near an upper end of the filter seat 204*a* (FIG. 6). The fluid that passes through the outlet 247 can pass into the third flow tube 242 and into the solenoid valve 212. The solenoid valve 212 can be opened during recirculation to allow the fluid to pass therethrough. This fluid can then re-enter the fluid reservoir 202 through the opening 209 (FIG. 5).

As explained herein, between uses, fluid can remain stagnant within the device, such as in fluid lines, the filter module, etc. This fluid, once chilled, will eventually return to ambient temperature. When a user initiates fluid dispensing, even if they are sourcing from a chilled reservoir, the ambient-temperature fluid will dispense first before chilled fluid, thereby raising the overall temperature of the chilled fluid to an undesirable level. Recirculation via the recirculation lines can help cycle this ambient-temperature fluid with chilled fluid to ensure the dispensed fluid is as chilled as possible, but mixing chilled fluid with ambient-temperature fluid will result in fluid that is less chilled than it otherwise could be. This recirculation process can be further improved by reducing or minimizing the amount of idle fluid to be recirculated so that the chilled fluid remains as chilled as possible. For example, by reducing the overall volume of space within the device where fluid could otherwise settle and come up to ambient temperature, the negative impact of a large volume of ambient-temperature water can be mitigated. This can be accomplished in a number of ways as described below.

Figure 13A:
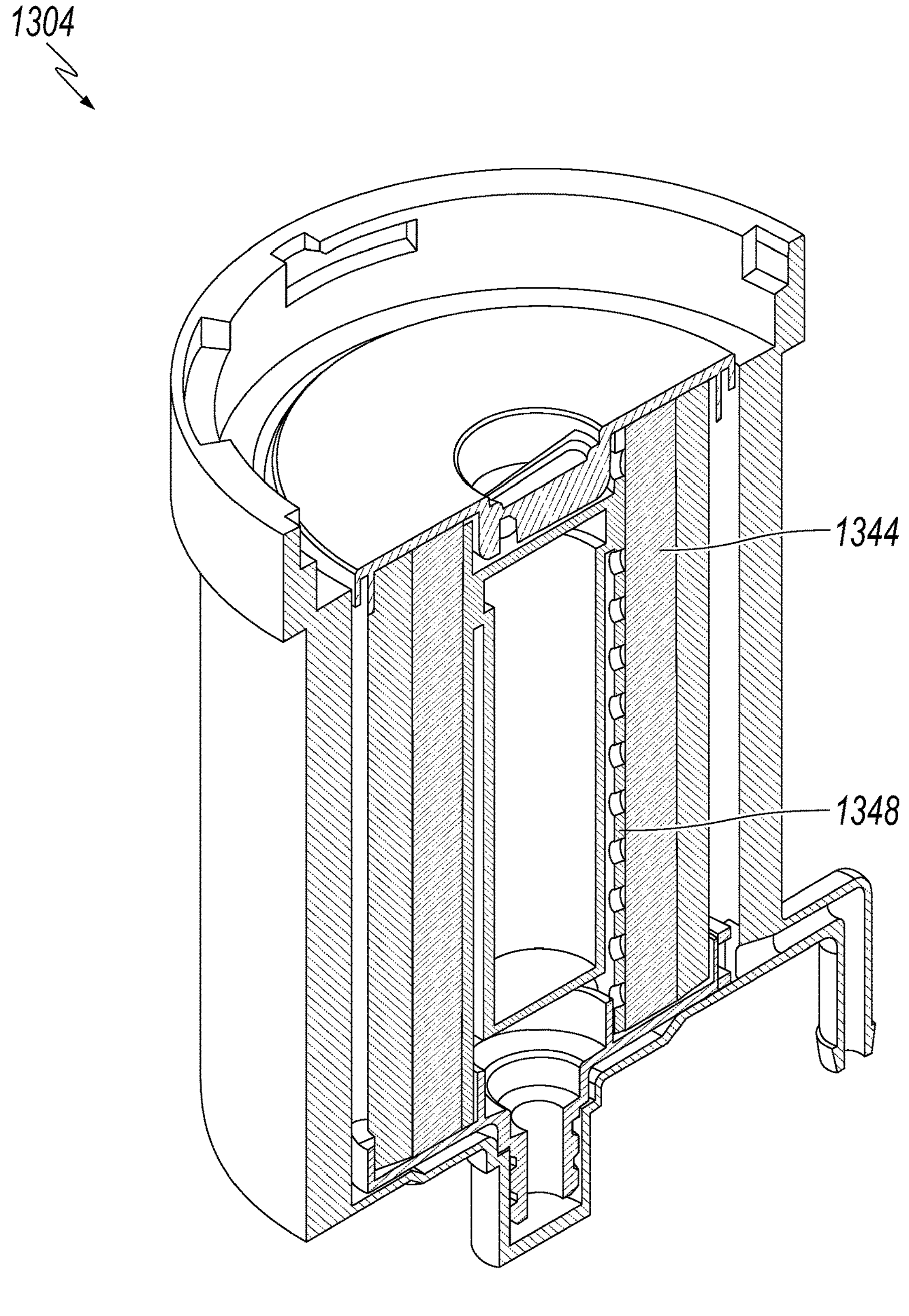
FIG. 13A is a cross-sectional perspective view of another embodiment of a filter module of a beverage device.
Figure 13B:
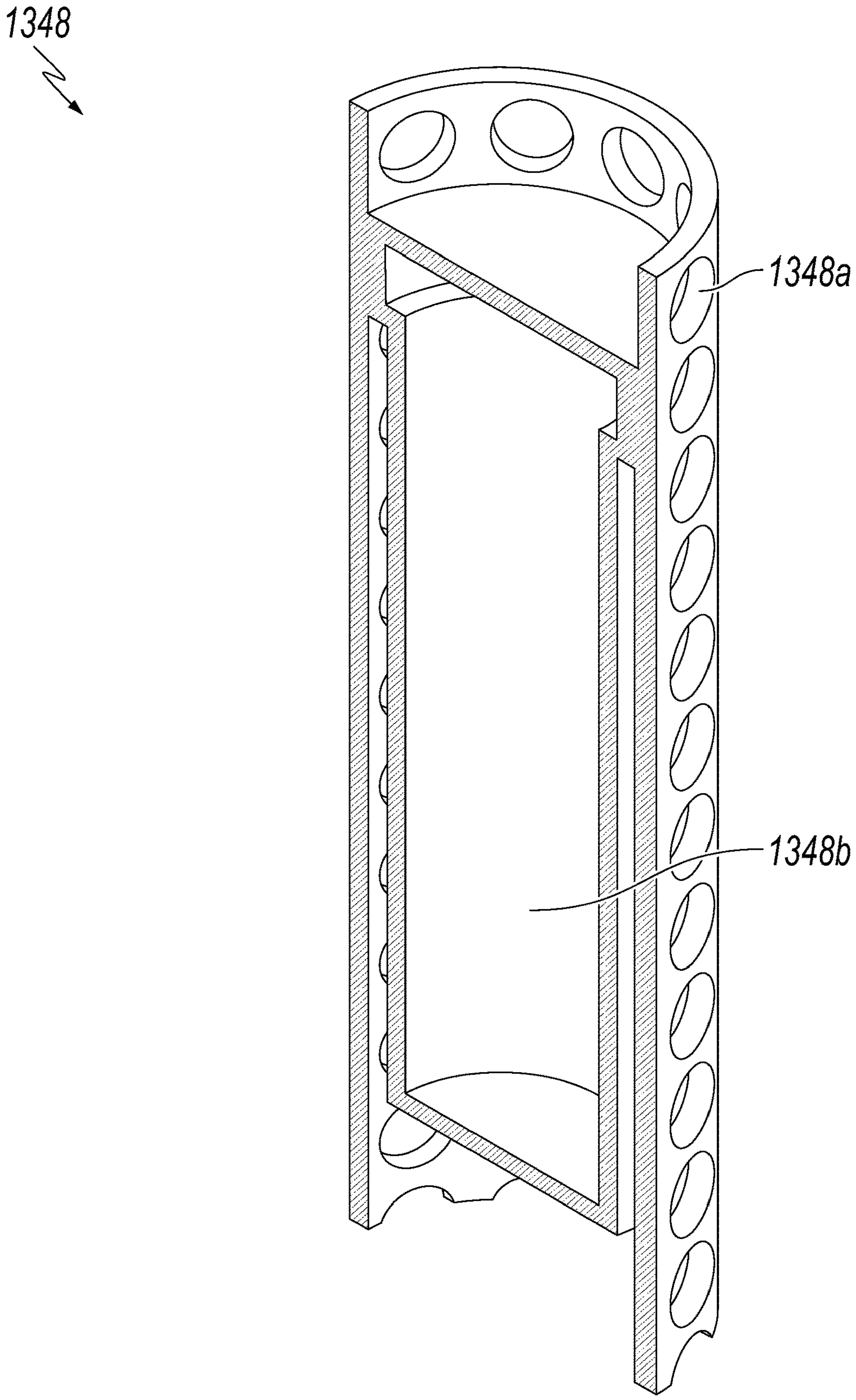
FIG. 13B is an isolated cross-sectional view of a central core of the filter module of FIG. 13A.

FIGS. 13A-13B illustrate an embodiment of a filter module 1304 for a beverage device with fluid lines and pathways having a reduced internal volume to minimize the impact of idle, ambient-temperature fluid on chilled fluid. In general, components of the filter module 1304 share features and functionality with like-named and like-numbered components of the filter module 204 of the beverage device 200, as described with respect to FIGS. 2-12, and with like-named and like-numbered components of the filter module 104, as described with respect to FIG. 1. References to specific components of the filter module 1304 should therefore be understood to encompass the corresponding components of filter modules 104 and/or 204, unless otherwise noted.

It is noted that the illustrated shape of the filter module 1304 is exemplary and could be modified based on factors such as durability, filter performance, cost, ornamentality, aesthetic appeal, and/or the like.

As shown in FIG. 13A, the module 1304 can include a filter medium 1344 defining a central cavity. A central core 1348 can be arranged within the central cavity of the filter medium 1344. As shown in FIG. 13B, the central core 1348 can include a first hollow scaffold 1348*a* and a second hollow scaffold 1348*b* disposed within the first hollow scaffold 1348*a*. The first hollow scaffold 1348*a* can be a hollow cylindrical surface that is perforated with numerous through-holes. The second hollow scaffold 1348*b* can be configured to reduce a volume of the central cavity defined by the filter medium 1344 to limit the amount of filtered water that the module 1304 is capable of retaining in between dispensing cycles. By reducing the overall volume of space within the central cavity where fluid could otherwise settle and come up to ambient temperature, the second hollow scaffold 1348*b* can reduce or minimize the amount of idle fluid that requires recirculation.

In some aspects, fluid can flow into the filter module 1304 through an inlet on an upper end of the module 1304, through the filter 1344, through the first hollow scaffold 1348*a*, and into a channel defined between the first hollow scaffold 1348*a* and the second hollow scaffold 1348*b*. During a dispensing operation, the fluid can travel down this channel and into an outlet port at a bottom end of the filter module 1304. During a recirculation operation, the fluid can travel along the channel and out of another outlet port formed in a side of the filter module 1304.

Figure 13C:
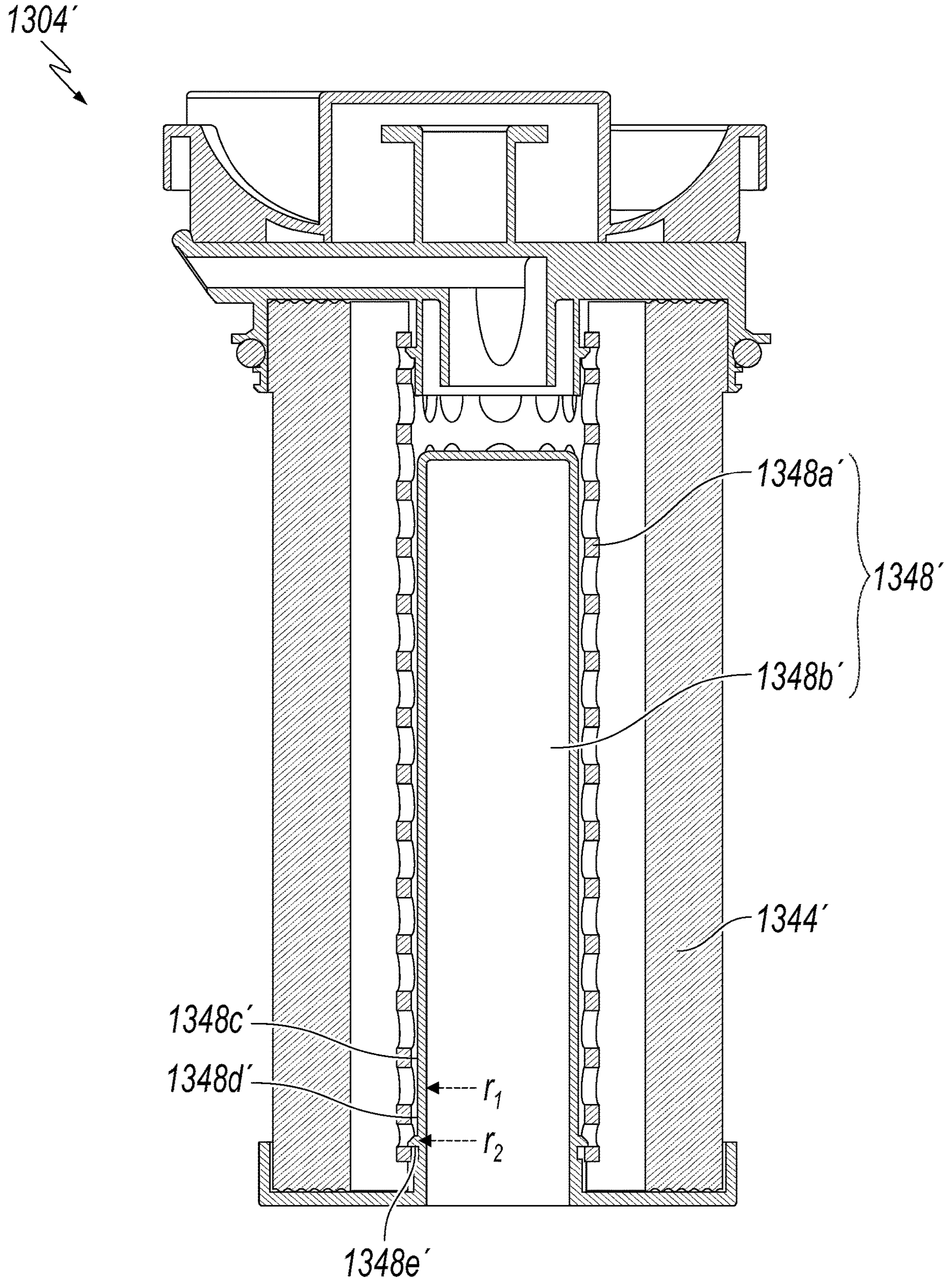
FIG. 13C is a cross-sectional view of another embodiment of a filter module of a beverage device.

FIG. 13C shows another embodiment of a filter module 1304' for a beverage device with fluid lines and pathways having a reduced internal volume to minimize the impact of idle, ambient-temperature fluid on chilled fluid. In general, the filter module 1304' can share features and functionality with the filter module 1304. Like the filter module 1304, the filter module 1304' can include a filter medium 1344' and a central core formed by a first hollow scaffold 1348*a'* and a second hollow scaffold 1348*b'*.

A fluid channel 1348*c'* can be defined between the first hollow scaffold 1348*a'* and the second hollow scaffold 1348*b'*. Fluid that passes through the filter medium 1344' can be received in and transported along the channel 1348*e'* to be delivered from the filter module 1304'.

The second hollow scaffold 1348*b'* can include a first outer radial surface 1348*d'* that extends to a first radius $r_1$ and a second outer radial surface 1348*e'* that extends to a second radius $r_2$. The first outer radial surface 1348*d'* can be further from a terminal end of the filter medium 1344' than the second outer radial surface 1348*e'*.

As described, a filter module of a beverage device can include a removable filter cartridge that can be detached from the beverage device and replaced with an identical filter module. By enabling filter cartridges to be swapped as desired (for example, when the filter media of one filter cartridge reaches the end of its lifetime), the described filter modules can encourage regular filter replacement.

In certain aspects, a filter module can incorporate one or more frangible components that are structurally configured to break or become permanently deformed when the filter cartridge is decoupled from the filter module. This intentional breakage mechanism can serve as a tamper-evident and anti-reuse feature, effectively preventing the reinstallation of expired or previously used filter cartridges, which may no longer meet performance or safety standards. Additionally, the frangible features can deter the use of unauthorized or substandard replacement cartridges by rendering the module inoperable if non-compliant components are introduced. This approach can enhance the integrity of the filter module, ensure consistent water quality, and support compliance with regulatory or manufacturer-specified maintenance protocols.

Figure 14:
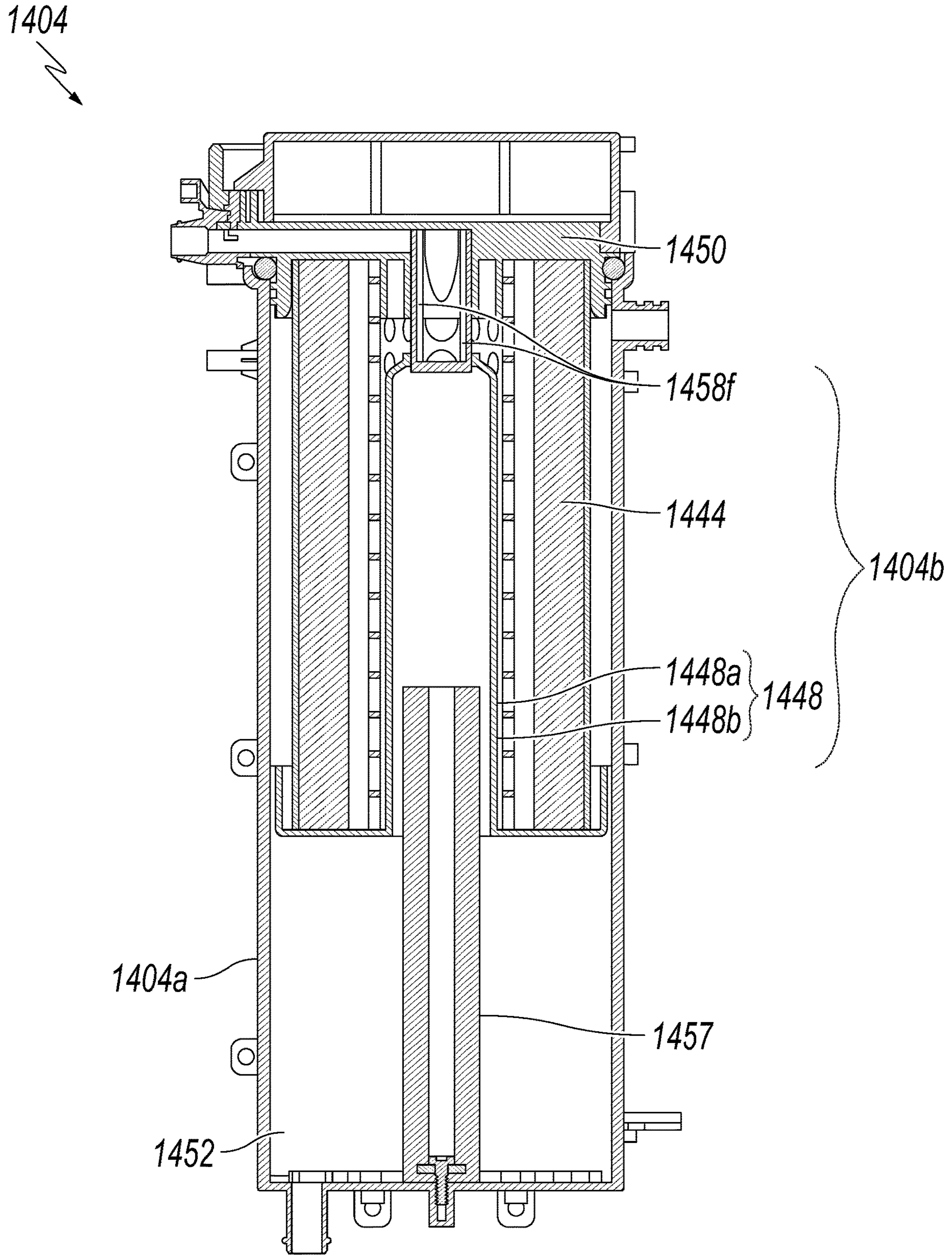
FIG. 14 is a cross-sectional perspective view of another embodiment of a filter module of a beverage device.

FIG. 14 illustrates an embodiment of a filter module 1404 having frangible components for mitigating tampering, filter media reuse, and unauthorized filter replacement. The filter module 1404 (and components thereof) can generally share features and functionality with the other filter modules described herein, for example, the filter module 1304 shown in FIG. 13A.

As shown, the filter module 1404 can include a filter seat 1404 and a filter cartridge 1404*b*. The filter cartridge 1404*b* can be removably coupled to the filter seat 1404*a* and can include a filter medium 1444 that surrounds a central core 1448 formed from an outer hollow scaffold 1448*a* and an inner hollow scaffold 1448*b*. An upper end cap 1450 can lock the filter cartridge 1404*b* to the filter seat 1404*a*.

In some aspects, the filter module 1404 can include a spur 1457 that extends from a bottom surface of the filter seat 1404 and through an opening in a lower end of the inner hollow scaffold 1448*b*. The spur 1457 can prevent the filter cartridge 1404*b* from being replaced with another filtering apparatus that has a flat bottom surface.

In the illustrated embodiment, the upper end cap 1450 is joined to the filter cartridge 1404*b* by a pair of frangible snap-fit features 1458*f*. Each frangible feature 1448*f* can extend from an upper end of the inner hollow scaffold 1448*b* and can be connected to the upper end cap 1450 by a snap-fit mechanism. When the filter cartridge 1404*b* is decoupled from the filter seat 1404, or, in some aspects, when the filter cartridge 1404*b* is disassembled following removal in order (e.g., for disposal or recycling), the frangible features 1458*f* can be configured to break or permanently deform. This can prevent the filter cartridge 1404*b* from being reconnected to the filter seat 1404 and, as a result, prevent the filter medium 1444 from being reused.

Figure 15:
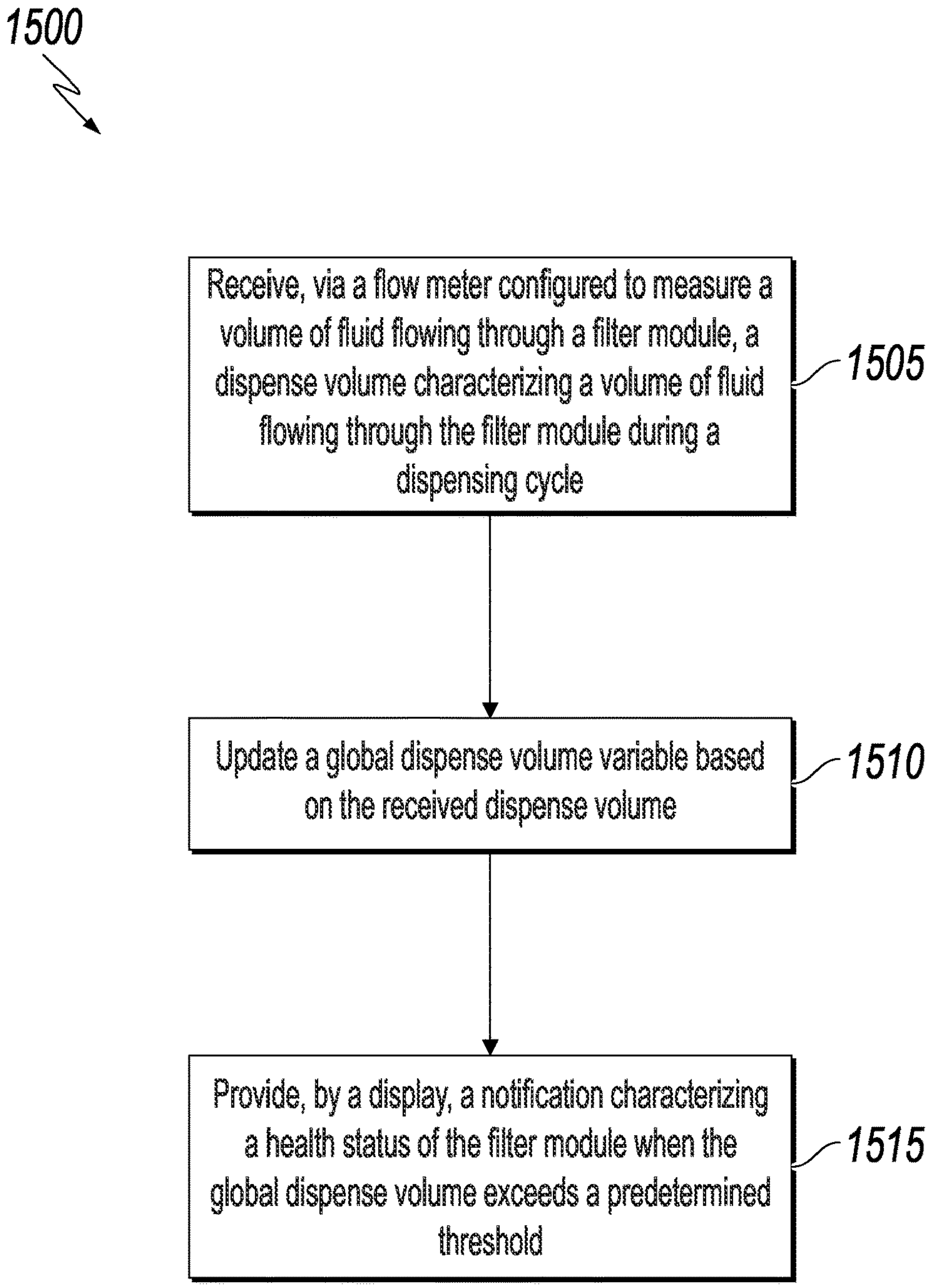
FIG. 15 is a flowchart illustrating a method of monitoring a health status of a filter module of a beverage machine.

The described beverage devices can be configured to automatically monitor the health of their filter modules, for example, to alert users when the modules require maintenance, cleaning, or replacing, as introduced previously. This can be done in a number of ways. FIG. 15 provides an example method 1500 of monitoring a health status of a filter module (e.g., the filter module 104 shown in FIG. 1, the filter module 204 shown in FIG. 6, the filter module 1304 shown in FIG. 13, etc.) of a beverage device and providing a notification characterizing that health status. Operations of the method 1500 can be implemented using a controller (e.g., the controller 120 shown in FIG. 1) of the beverage device.

At 1505, data indicating a dispense volume can be received via a flow meter (e.g., the flow meter 114 shown in FIG. 1, the flow meter 214 shown in FIG. 3, etc.) configured to measure a volume of fluid flowing through the filter module. The dispense volume can characterize a volume of fluid flowing through the filter module during a dispensing cycle.

At 1510, a global dispense volume variable can be updated based on the received dispense volume. The global dispense volume variable can be stored by the memory (e.g., the memory 124 shown in FIG. 1) of the controller. In some aspects, the global dispense volume variable can characterize a total volume of fluid that has flowed through the filter module over the lifetime of the filter module (e.g., since the filter module was initially installed).

The global dispense volume variable can be periodically or continuously updated until it exceeds a predetermined threshold. In some aspects, the predetermined threshold is based on a recommended maximum volume of fluid that can be filtered by the filter module before replacement is required. In some aspects, the global dispense volume variable exceeding the predetermined threshold can indicate that the filter medium (e.g., the filter medium 249 shown in FIG. 6) is no longer usable, will likely no longer be useable in the near future (e.g., within 24 hours, within a week, etc.).

At 1515, when the global dispense volume exceeds the predetermined threshold, a notification characterizing a health status of the filter module can be provided by a display (e.g., a display of the user interface 118 shown in FIG. 1 or the user interface 218 shown in FIG. 2). In some aspects, the notification characterizing the health status can include an indication of a point in time (e.g., a date) that the filter module should be replaced. In some aspects, the notification can include a scannable code (e.g., a QR code) configured to link to a digital storefront through which replacement filter modules can be ordered, or a push notification or link provided to a device in wired or wireless communication with the controller, such as a computer, mobile phone, etc.

In some aspects, following replacement of the filter module, the global dispense volume variable can be reset. In some aspects, the controller can automatically reset the global dispense volume variable upon detecting, for example, that a microswitch associated with the filter module has been disengaged and subsequently reengaged, indicating that an old filter module has been removed and a new filter module has been installed. In some aspects, the controller can reset the global dispense volume variable upon receipt of user input, via the user interface, confirming that a new filter module has been installed.

In some aspects, a beverage device can be configured to interface with one or more dedicated vessels that are specifically designed to couple to the device and receive filtered water dispensed therefrom. These vessels may include mechanical or magnetic alignment features, sealing interfaces, or locking mechanisms that ensure secure and leak-free engagement with the dispensing outlet. The use of dedicated vessels offers several advantages. The dedicated vessels can enable hands-free operation of the beverage device by reducing or eliminating the need for manual positioning and minimizing the risk of spills. Additionally, the dedicated vessels can allow for optimized fluid flow and fill control, as the device can be calibrated to dispense precise volumes tailored to the vessel's capacity. Third, the dedicated vessels can be designed with thermal insulation, lids, or portability features that enhance the user experience. Finally, this configuration supports aesthetic and functional integration, allowing users to maintain a clean and organized countertop while benefiting from a streamlined and efficient dispensing process.

Figure 16:
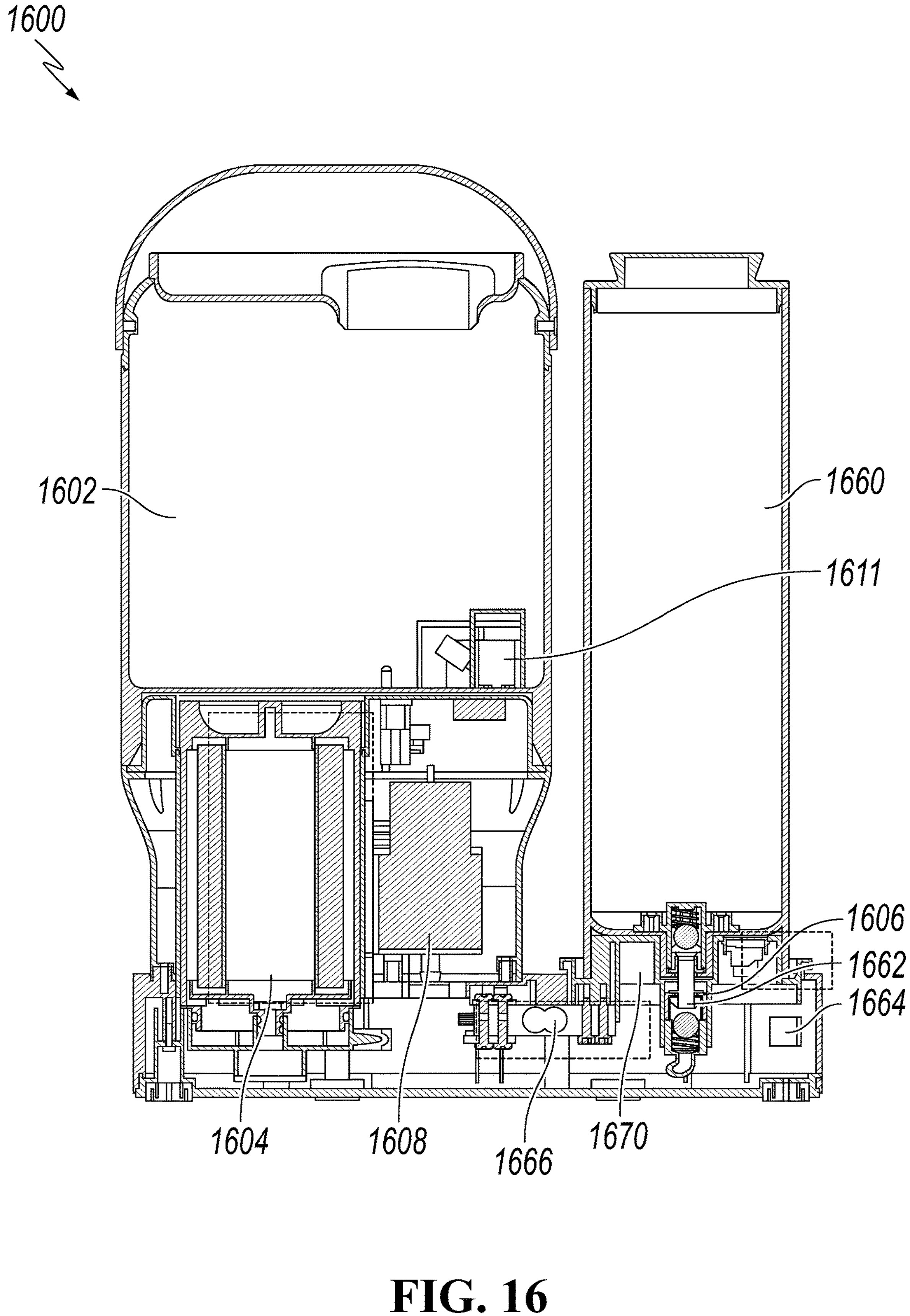
FIG. 16 is a cross-sectional view of another embodiment of a beverage device.

FIG. 16 illustrates an example beverage device 1600 that includes a vessel 1660 for receiving filtered fluid dispensed from the device 1600. In general, components of the beverage device 1600 can share features and functionality with like-named and like-numbered components of the beverage device 100, as described with respect to FIG. 1, and/or the beverage device 200, as described with respect to FIGS. 2-12. References to specific components of the beverage device 1600 should therefore be understood to encompass the corresponding components of the beverage device 100 and/or the beverage device 200 unless otherwise noted. For brevity, certain details of the components of beverage device 1600 are not repeated, but those details are applicable to corresponding and similar components of beverage device 100 and/or the beverage device 200.

The vessel 1660 can be a bottle or other reservoir that is configured to removably couple to the beverage device 1600 to receive filtered fluid dispensed therefrom. In various aspects, the vessel 1660 can have a capacity of 0.5 L, 1 L, 1.5 L, or a different amount. The vessel 1660 can be formed from any suitable material or combination of materials, for example, plastic, aluminum, glass, and/or the like. In some aspects, the vessel 1660 can include an opening through which fluid contained by the vessel 1660 can be poured when the vessel 1660 is decoupled from the beverage device 1600.

In some aspects, the beverage device 1600 can be provided only with the vessel 1660. In other aspects, the beverage device 1600 can be provided with the vessel 1660, along with one or more additional vessels which, like the vessel 1660, are configured to removably couple to the beverage device 1600 to receive filtered fluid dispensed therefrom. The additional vessels can be identical to the vessel 1660 or distinct from the vessel 1660. For example, the additional vessels can be vessels with a different capacity than the vessel 1660, or vessels formed from a different material than the vessel 1660.

As shown in FIG. 16, the beverage device 1600 can include a fluid reservoir 1602, a filter module 1604, a dispensing outlet 1606, and a pump 1608. The fluid reservoir 1602, the filter module 1604, the dispensing outlet 1606, and the pump 1608 can generally share features and functionality with like-named and like-numbered components of the beverage device 100 described with respect to FIG. 1 and the beverage device 200 described with respect to FIGS. 2-12. For brevity, these components are not described in detail.

The beverage device 1600 can additionally include a fluid level sensor 1611, a vessel seat 1670, a vessel sensor 1664, and a fill sensor 1666. Each of these components is described in detail below.

The fluid level sensor 1611 can enable automated monitoring, by a controller of the device 1600, of an amount of fluid contained in the reservoir 1602 at any given time. As shown in FIG. 16, the fluid level sensor 1611 can be arranged within the interior volume of the reservoir in which fluid is configured to be contained. The fluid level sensor 1611 can be coupled to the controller of the device 1600, which can be configured to detect, based on data provided by the fluid level sensor 1611, when the reservoir 1602 requires refilling. The controller 1600 can be configured to provide alerts or notifications (e.g., via a user interface of the device 1600) regarding the amount of water contained in the reservoir 1602, for example, to notify users when the reservoir 1602 is empty or nearly empty.

The fluid level sensor 1611 can be implemented using any suitable device or combination of devices. In some aspects, the fluid level sensor 1611 includes one or more floats and a sensor configured to detect motion of the one or more floats. For example, the fluid level sensor 1611 can be implemented using one or more magnetic see-saw floats and a hall effect sensor.

The vessel seat 1670 can be configured to receive the vessel 1660 thereon. As shown in FIG. 16, the dispensing outlet 1606 can extend through the vessel seat 1670. In some aspects, the vessel seat 1670 can be configured to interface with a valve of the vessel 1660 to open a fluid flow path between the vessel 1660 and the dispensing outlet 1606.

The vessel sensor 1664 can be configured to detect when the vessel 1660 is properly coupled to the vessel seat 1670. The vessel sensor 1664 can be implemented using any suitable device or combination of devices. For example, the vessel sensor 1664 can include a microswitch configured to be engaged when the vessel 1660 is connected to the vessel seat 1670.

In some aspects, if the device 1600 is provided with multiple vessels (e.g., the vessel 1660 and one or more additional vessels), the vessel sensor 1664 can be configured to identify which of the vessels is coupled to the device 1600. In some aspects, each vessel can include a radio frequency identifier (RFID) tag configured to uniquely identify the vessel, and the vessel sensor 1664 can include a radio frequency (RF) sensor configured to detect the various RFID tags. In some aspects, each vessel can include a feature of a different color, and the vessel sensor 1664 can include a color sensor (e.g., a RGB sensor) configured to identify said colors.

The vessel sensor 1664 can be coupled to the controller of the beverage machine 1600. In some aspects, the controller can be configured to initiate and cease fluid dispensing through the fluid outlet 1606 based on whether data provided by the vessel sensor 1664 indicates that the vessel 1660 is coupled to the vessel seat 1670. In some aspects, the controller can be configured to determine an amount of fluid to dispense into the vessel 1660 based on data provided by the vessel sensor 1664.

The fill sensor 1666 can be configured to measure a fill level of the vessel 1660. In the illustrated embodiment, the fill sensor 1666 includes a load cell arranged beneath the vessel seat 1670. The load cell can be configured to measure a weight of the vessel 1660 and any fluid contained therein. As filtered fluid is pumped into the vessel 1660, the load cell can measure the increase in the weight of the vessel 1660. In other aspects, the fill sensor 1666 can be a flow meter. The fill sensor 1666 can be coupled to the controller of the beverage machine 1600, which can be configured to control an amount of fluid dispensed from the beverage machine 1600 by continuously monitoring data provided by the fill sensor 1666.

In some aspects, a beverage device can be configured without recirculation functionality. By omitting the components and control logic required for fluid recirculation (e.g., additional valves, flow paths, etc.), a beverage device can achieve a simplified architecture that reduces manufacturing complexity and cost. This streamlined design can also result in a smaller overall footprint, making the device more suitable for compact environments such as small kitchens, dorm rooms, or office desks.

Figure 17:
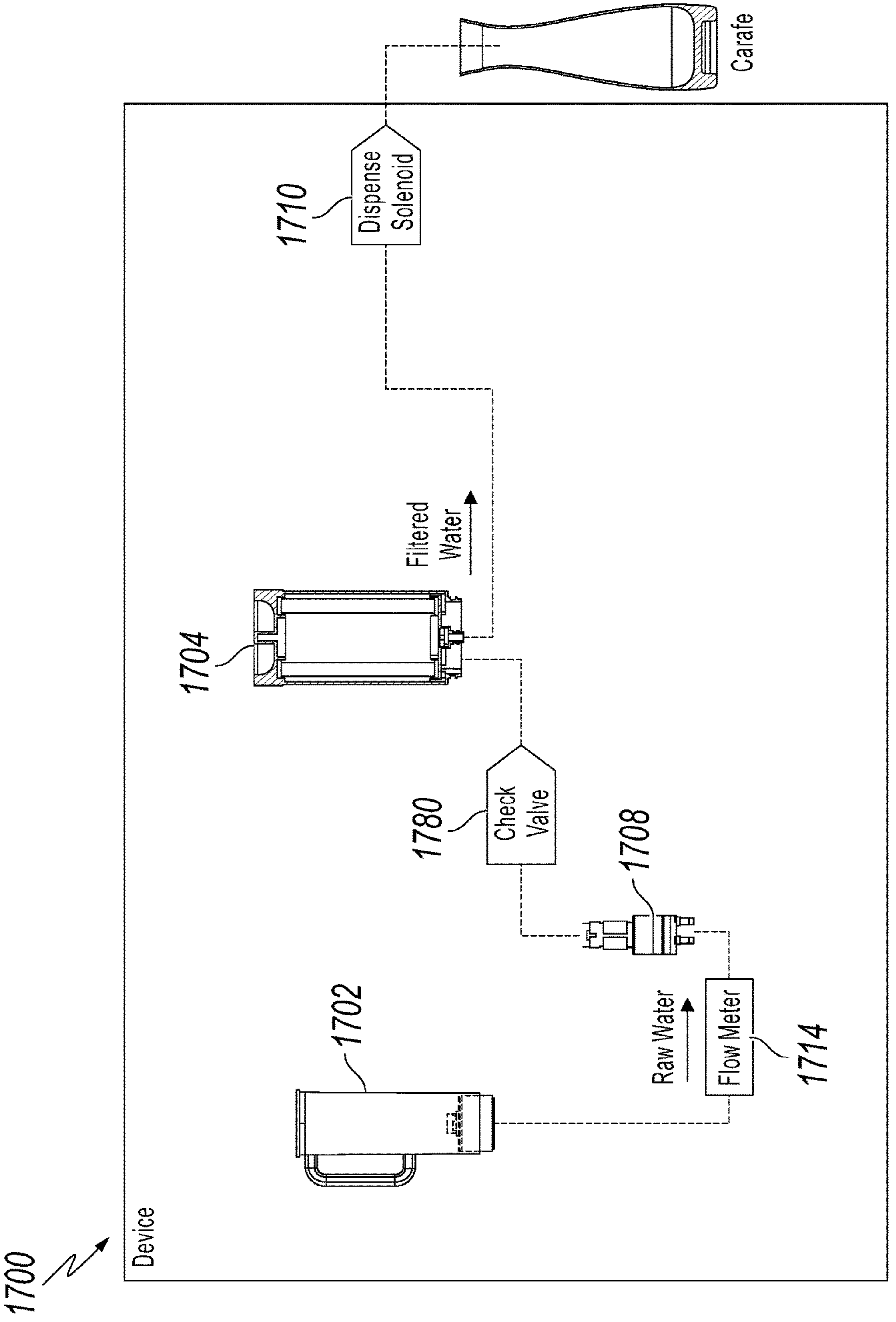
FIG. 17 is a diagram of another embodiment of a beverage device.

FIG. 17 illustrates a diagram of a non-recirculating beverage device 1700. In general, components of the beverage device 1700 can share features and functionality with like-named and like-numbered components of the other beverage devices described herein (e.g., the beverage device 100, as described with respect to FIG. 1, the beverage device 200 as described with respect to FIGS. 2-12, etc.). References to specific components of the beverage device 1700 should therefore be understood to encompass the corresponding components of the other described beverage devices unless otherwise noted. For brevity, certain details of the components of beverage device 1700 are not repeated, but those details are applicable to corresponding and similar components of the other beverage devices.

As shown in FIG. 17, the beverage device 1700 can include a fluid reservoir 1702, a flow meter 1714, a pump 1708, a filter module 1704, and an outlet valve 1710. The fluid reservoir 1702, flow meter 1714, pump 1708, filter module 1704, and outlet valve 1710 can generally share features and functionality with like-named and like-numbered components of, for example, the beverage device 100 described with respect to FIG. 1 and the beverage device 200 described with respect to FIGS. 2-12. For brevity, these components are not described in detail.

The device 1700 can additionally include a check valve 1780. As shown in FIG. 17, the check valve 1780 can be arranged upstream of the pump 1708 and downstream of the filter module 1704. The check valve 1780 can be configured to control the flow of fluid from the pump 1708 into the filter module 1704. The check valve 1780 can be implemented using any suitable type of valve, for example, a solenoid valve (which can be electronically actuated by a controller of the device 1700 to open or close based on user commands or programmed logic), a pinch valve, a ball valve, or gate valve.

In some aspects, a beverage device can include a heating element configured to heat filtered water prior to dispensing, enabling the device to deliver filtered water for heated beverages such as tea, instant coffee, or soups in addition to (or as an alternative to) chilled or ambient temperature water for drinking. These aspects can eliminate the need for separate water heating appliances like kettles, thereby saving space and streamlining kitchen workflows. The heating functionality can be precisely controlled by the device's controller, allowing for targeted temperature settings and energy-efficient operation. Additionally, because the water is filtered before heating, users can benefit from improved taste and safety, especially in regions with poor tap water quality.

Figure 18:
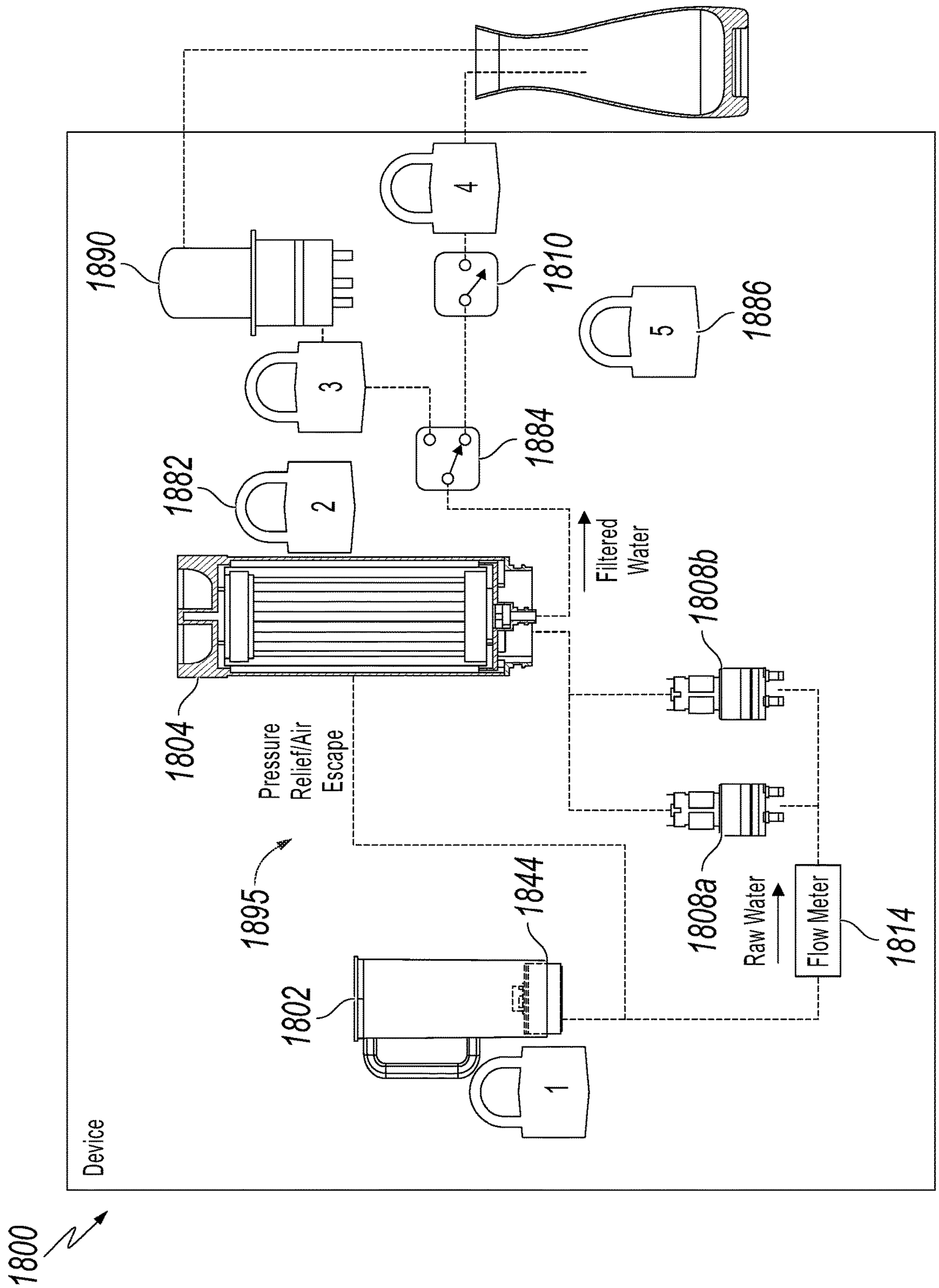
FIG. 18 is a diagram of another embodiment of a beverage device.

FIG. 18 illustrates a diagram of a beverage device 1800 that is configured to dispense heated and unheated filtered fluid. In general, components of the beverage device 1800 can share features and functionality with like-named and like-numbered components of the other beverage devices described herein (e.g., the beverage device 100, as described with respect to FIG. 1, the beverage device 200 as described with respect to FIGS. 2-12, etc.). References to specific components of the beverage device 1800 should therefore be understood to encompass the corresponding components of the other described beverage devices unless otherwise noted. For brevity, certain details of the components of beverage device 1800 are not repeated, but those details are applicable to corresponding and similar components of the other beverage devices.

As shown in FIG. 18, the beverage device 1800 can include a fluid reservoir 1802, a flow meter 1814, a filter module 1804, and an outlet valve 1810. The fluid reservoir 1802, flow meter 1814, filter module 1804, and outlet valve 1810 can generally share features and functionality with like-named and like-numbered components of, for example, the beverage device 100 described with respect to FIG. 1 and the beverage device 200 described with respect to FIGS. 2-12. For brevity, these components are not described in detail.

Additionally, the beverage device 1800 can include a reservoir valve 1844, a pair of pumps 1808*a*, 1808*b*, a filter seal 1882, a fluid heater 1890, a hot water valve 1884, and sealed tubing 1886. Each of these components is described in further detail below.

The reservoir valve 1844 can be configured to control a flow of unfiltered fluid out of the fluid reservoir 1802. In general, the reservoir valve 1844 can share features with the valve 244 and/or the valve 246 of the device 200, described above with respect to FIG. 3. In some aspects, when the valve 1844 is open, fluid can flow into and out of the reservoir 1802 through an opening in the reservoir 1802.

The pair of pumps 1808*a*, 1808*b* can be configured to drive fluid throughout the beverage device 1800. Each pump 1808*a*, 1808*b* can share features and functionality with pumps of the other beverage devices described herein, for example, the pump 108 of the beverage device 100 (FIG. 1) and/or the pump 208 of the beverage device 200 (FIGS. 2-12). As a result of the pair of pumps 1808*a*, 1808*b*, the device 1800 can provide enhanced fluid control and operational flexibility relative to devices with a single pump. Multiple pumps can contribute to redundancy and reliability, ensuring continued operation even if one pump requires maintenance.

The filter seal 1882 can be configured to prevent fluid leaks from the filter module 1804. In some aspects, the filter seal 1882 can include an O-ring disposed on the filter and a seal around the outlet of the top cap (e.g., the outlet 251*b* of the top cap 250 described with respect to FIG. 11A) of the filter module.

The fluid heater 1890 can be configured to heat filtered water to a temperature above ambient temperature. As shown in FIG. 18, the fluid heater 1890 can be arranged downstream of the filter module 1804 and can be configured to receive filtered fluid from the filter module 1804. Filtered water provided to the fluid heater 1890 can be heated by the fluid heater 1890 and then dispensed from the device 1800 via an outlet of the fluid heater 1890.

Various types of heating technologies may be used to implement the fluid heater 1890, including electric resistance heaters (e.g., nichrome wire coils), PTC (positive temperature coefficient) ceramic heaters, and induction heating elements. The fluid heater 1890 can be controlled by the controller of the device 1800 to maintain a target temperature range, enabling the dispenser to deliver heated beverages such as tea, coffee, or soups with consistent thermal performance.

The hot water valve 1884 can be arranged upstream of the filter module 1804 and downstream of the filter module fluid heater 1890 and the outlet valve 1810. The hot water valve 1844 can be configured to control whether fluid from the filter module 1804 flows to the fluid heater 1890, to be heated prior to being dispensed, or to the outlet valve 1810, to be dispensed without being heated. The hot water valve 1844 can be implemented using any suitable type of valve, for example, a solenoid valve (which can be electronically actuated by a controller of the device 1800 to open or close based on user commands or programmed logic), a pinch valve, a ball valve, or gate valve.

The sealed tubing 1886 can connect one or more components of the device 1800. In some aspects, the sealed tubing 1886 can be platinum-cured silicone tubing. Platinum curing can enhance the oxygen barrier of the tubing, reducing the amount of gas that is able to pass through the silicone and thereby preventing contamination. Additionally, relative to silicone tubing that is not platinum cured, platinum cured silicone tubing can have a smoother surface, which can mitigate microbiological growth on the tubing.

In some aspects, the device 1800 can include a pressure relief/air escape pathway 1895. The pathway 1895 can be configured to release air from the filter module 1804 to reduce pressure levels within the filter module 1804. As shown in FIG. 18, the pathway 1895 can connect the filter module 1804 to a location downstream of the fluid reservoir 1802 and upstream of the flow meter 1814. In some aspects, the air that is released from the filter module 1804 can be pumped into the fluid reservoir.

In some aspects, a beverage device can include one or more controls configured to provide users with additional control over automated functions of the device. For example, a beverage device can include controls configured allow users manually reset or adjust values that are stored by the controller of the device. Such controls can enable fine-grained troubleshooting and maintenance to be performed and can allow users to tailor the device's automated functions to their particular needs.

Figure 19:
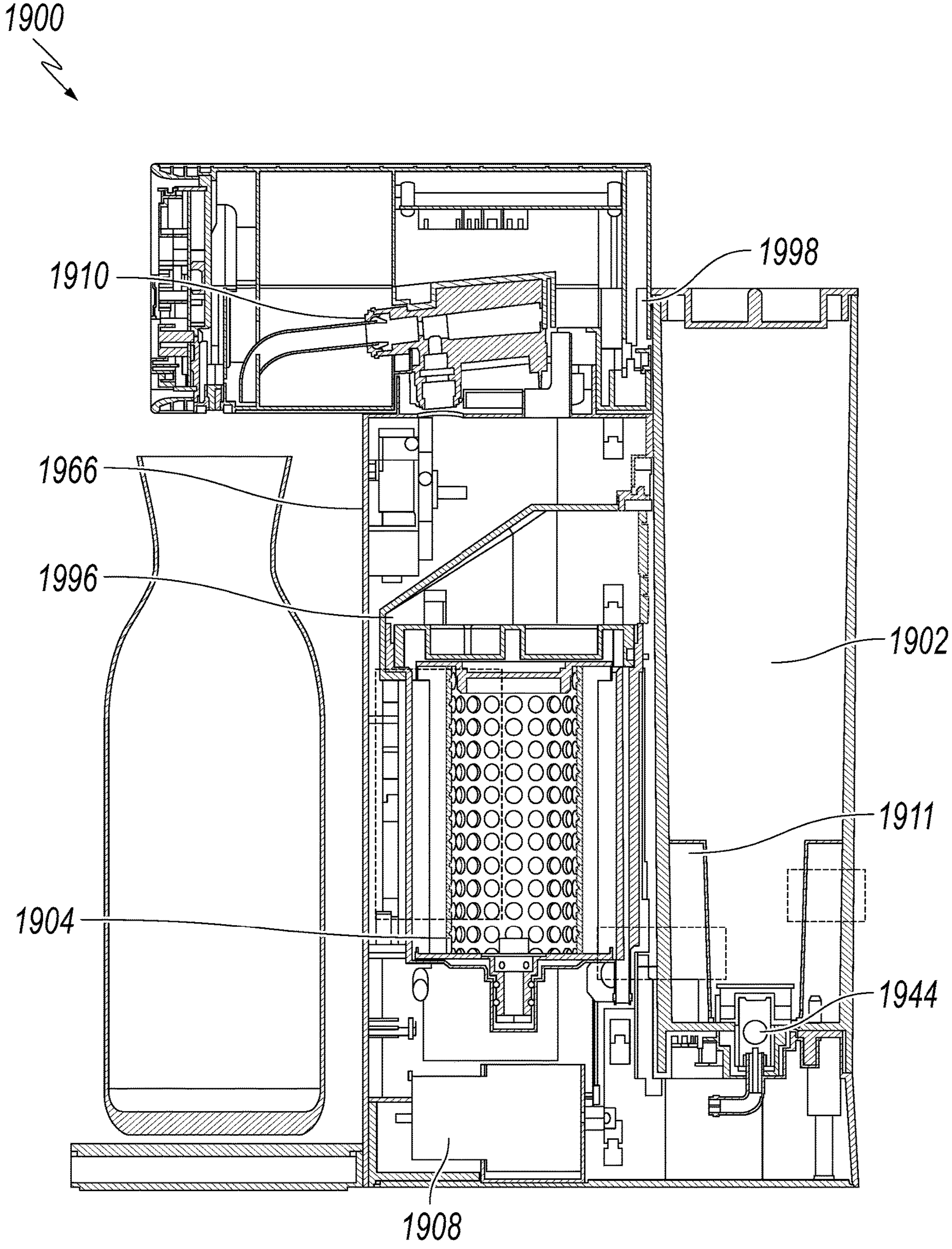
FIG. 19 is a cross-sectional view of another embodiment of a beverage device.

FIG. 19 illustrates an example beverage device 1900. In general, components of the beverage device 1900 can share features and functionality with like-named and like-numbered components of the other beverage devices described herein (e.g., the beverage device 100, as described with respect to FIG. 1, the beverage device 200 as described with respect to FIGS. 2-12, etc.). References to specific components of the beverage device 1900 should therefore be understood to encompass the corresponding components of the other described beverage devices unless otherwise noted. For brevity, certain details of the components of beverage device 1900 are not repeated, but those details are applicable to corresponding and similar components of the other beverage devices.

As shown in FIG. 19, the beverage device 1900 can include a fluid reservoir 1902 comprising a reservoir valve 1944 and a fluid level sensor 1911, a pump 1908, a filter module 1904, a fill sensor 1966, and an outlet valve 1910. These components can generally share features and functionality with like-named and like-numbered components of, for example, the beverage device 100 described with respect to FIG. 1 and the beverage device 200 described with respect to FIGS. 2-12. For brevity, these components are not described in detail.

Additionally, the beverage device 1900 can include a filter module detection sensor 1996 and a filter reset control 1998. Each of these components is described in further detail below.

The filter module detection sensor 1996 can be arranged adjacent to the filter module 1904 and can be configured to detect when the filter module 1904 is properly installed within the device 1900. The filter module detection sensor 1996 can include any suitable device of combination of devices. In some aspects, the filter module detection sensor 1996 can include one or more microswitches configured to be activated by the filter module 1904 when the filter module 1904 is properly installed.

The filter reset control 1998 can be configured to reset the value of a global dispense volume variable that characterizes a total volume of fluid that has flowed through the filter module 1904 over the lifetime of the filter module 1904 (e.g., since the filter module was initially installed). The global dispense volume variable can be stored by a memory of the controller of the device 1900. When the filter reset control 1998 is engaged, the value of the global dispense volume variable can be updated to a starting value corresponding to a beginning of the life of the filter module 1904. The filter reset control 1998 can be implemented using a button, a switch, a capacitive touch sensor, and/or the like. In some aspects, the filter reset control 1998 can be provided as a component of a user interface of the device 1900. In some aspects, the filter reset control 1998 can be housed in an interior region of the device 1900, for example, to mitigate the risk of accidental resetting of the global dispense volume variable.

Figure 20:
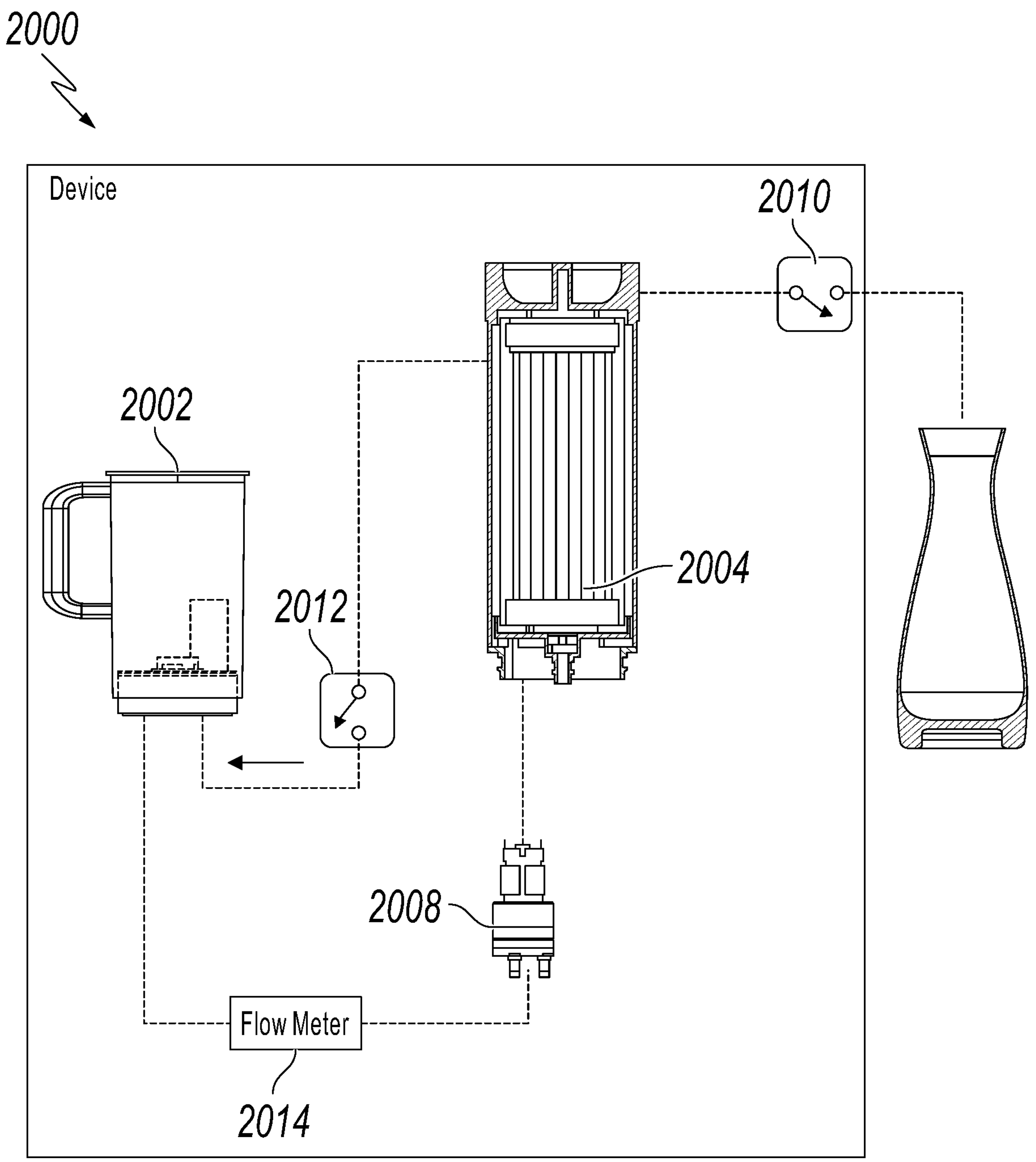
FIG. 20 is a diagram of another embodiment of a beverage device.

FIG. 20 illustrates a diagram of a beverage device 2000 that is configured to recirculate retained fluid (e.g., air and/or water) to manage fluid temperature and pressure within the device 2000. In general, components of the beverage device 2000 can share features and functionality with like-named and like-numbered components of the other beverage devices described herein (e.g., the beverage device 100, as described with respect to FIG. 1, the beverage device 200 as described with respect to FIGS. 2-12, etc.). References to specific components of the beverage device 2000 should therefore be understood to encompass the corresponding components of the other described beverage devices unless otherwise noted. For brevity, certain details of the components of beverage device 2000 are not repeated, but those details are applicable to corresponding and similar components of the other beverage devices.

As shown in FIG. 20, the beverage device 2000 can include a fluid reservoir 2002, a flow meter 2014, a pump 2008, a filter module 2004, an outlet valve 2010, and a recirculation valve 2012. The fluid reservoir 2002, flow meter 2014, pump 2008, filter module 2004, outlet valve 2010, and recirculation valve 2012 can generally share features and functionality with like-named and like-numbered components of, for example, the beverage device 100 described with respect to FIG. 1 and the beverage device 200 described with respect to FIGS. 2-12. For brevity, these components are not described in detail.

The recirculation valve 2012 can be arranged in a flow path between the filter module 2004 and the fluid reservoir 2002. During a recirculation operation, fluid (e.g., air or water) retained by the filter module 2004 can be pumped out of the filter module 2004 to the recirculation valve 2012. The recirculation valve 2012 can be opened to allow this fluid to flow into the water reservoir 2002.

The recirculation valve 2012 can be any suitable type of valve (or combination of valves). In some aspects, the recirculation valve 2012 can be a solenoid valve. In these aspects, the recirculation valve 2012 can be operably coupled to a controller of the device 2000. During a recirculation operation, the controller can open the recirculation valve 2012 to allow recirculated fluid to flow from the filter module 2004 to the reservoir 2002. During a filtering/dispensing operation, the controller can close the recirculation valve 2012.

As described, a filter module of a beverage device can include one or more filter media that perform the filtration function of removing contaminants from the unfiltered fluid. The filter media can be formed from any suitable material or combination of materials and can have any suitable structure.

Figure 21A:
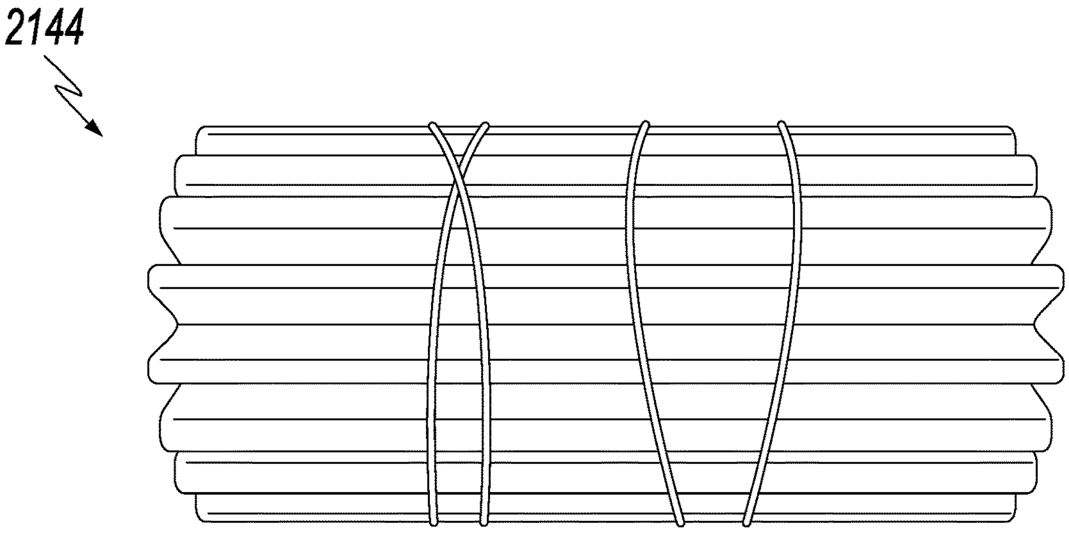
FIG. 21A is a side view of an embodiment of a filter medium.
Figure 21B:
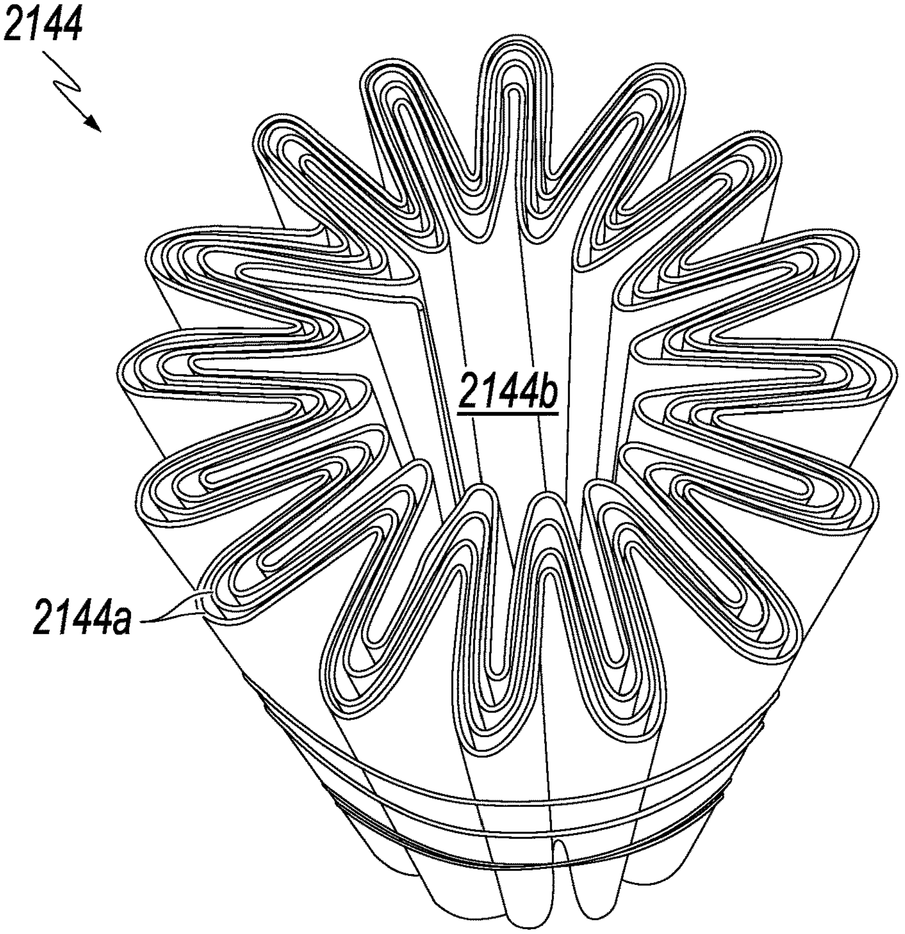
FIG. 21B is a top perspective view of the filter medium of FIG. 21A.

FIGS. 21A-21B depict an example filter medium 2144. In the depicted embodiment, the filter medium 2144 includes numerous layers of pleated sheets 2144*a* that are wrapped to form a generally cylindrical structure defining a hollow core 2144*b* therethrough. Each layered sheet can be formed from a material configured to remove contaminants from unfiltered fluid. In some aspects, each sheet can be formed from paper. In some aspects, the filter medium 2144 can include at least two different types of layers 2144*a*. For example, the filter medium 2144 can include a first layer formed from a first material and a second layer formed from a second material, or a first layer having a first thickness and a second layer having a second thickness.

FIGS. 22-24B provide plots of data characterizing the performance of various beverage device aspects. Each of these figures is described in further detail below.

Figure 22:
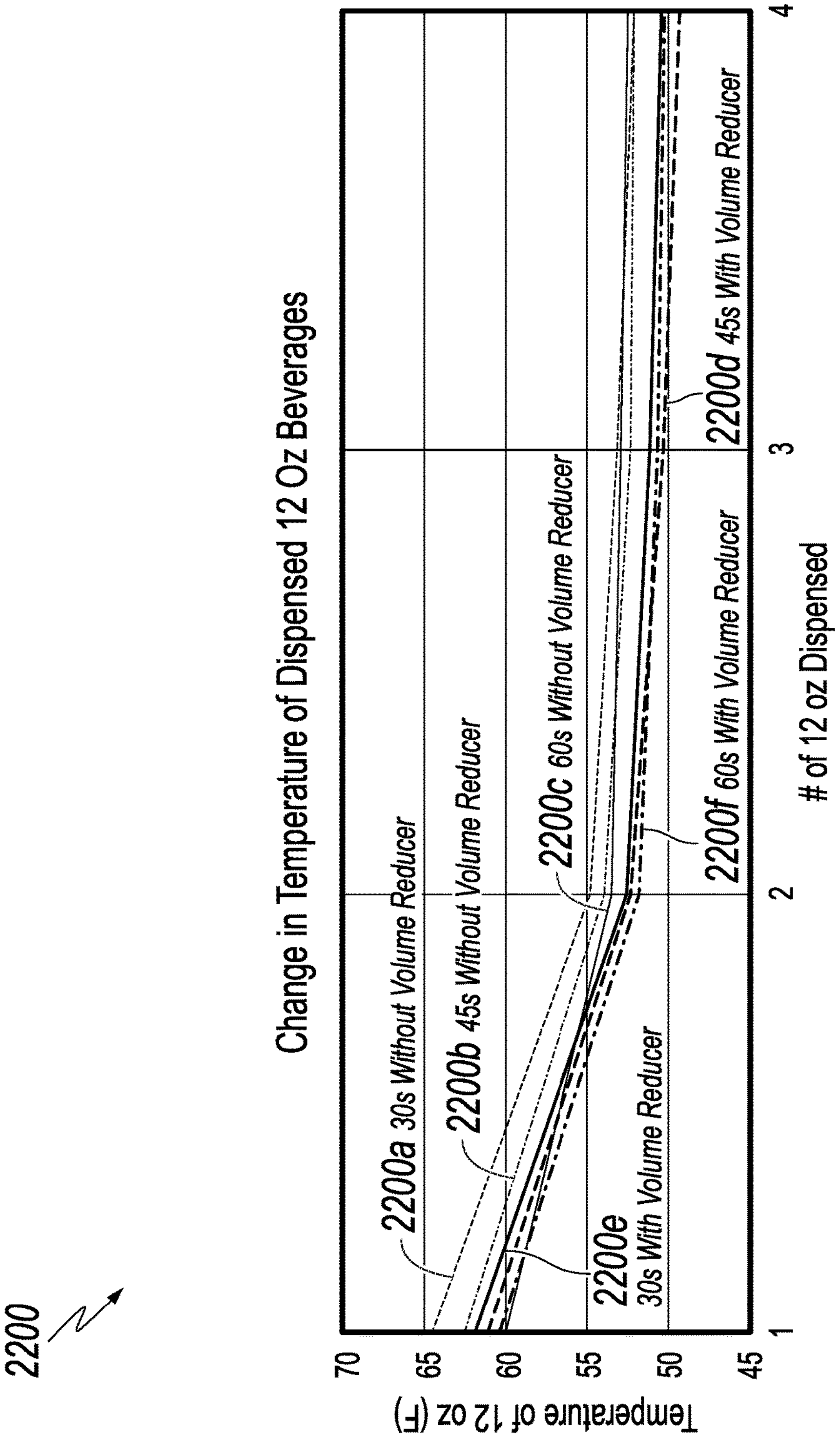
FIG. 22 is a plot of the temperature of beverages dispensed by beverage device aspects with and without base volume reducers in their filter modules as a function of the number of dispensed beverages.

FIG. 22 is a plot 2200 of the temperature of beverages dispensed by beverage device aspects with and without base volume reducers in their filter modules as a function of the number of dispensed beverages. Each line 2200*a*-2200*f* in the plot 2200 indicates, for a given recirculation cycle duration (30 seconds, 45 seconds, 60 seconds) and a given filter module configuration (with a base volume reducer or without a base volume reducer), a change in the temperature of dispensed 12-ounce beverages as the number of dispensed 12-ounce beverages increases. As shown, temperature reductions between approximately 5° F. and approximately 10° F. occurred between the first dispensed beverage and the second dispensed beverage.

Figure 23:
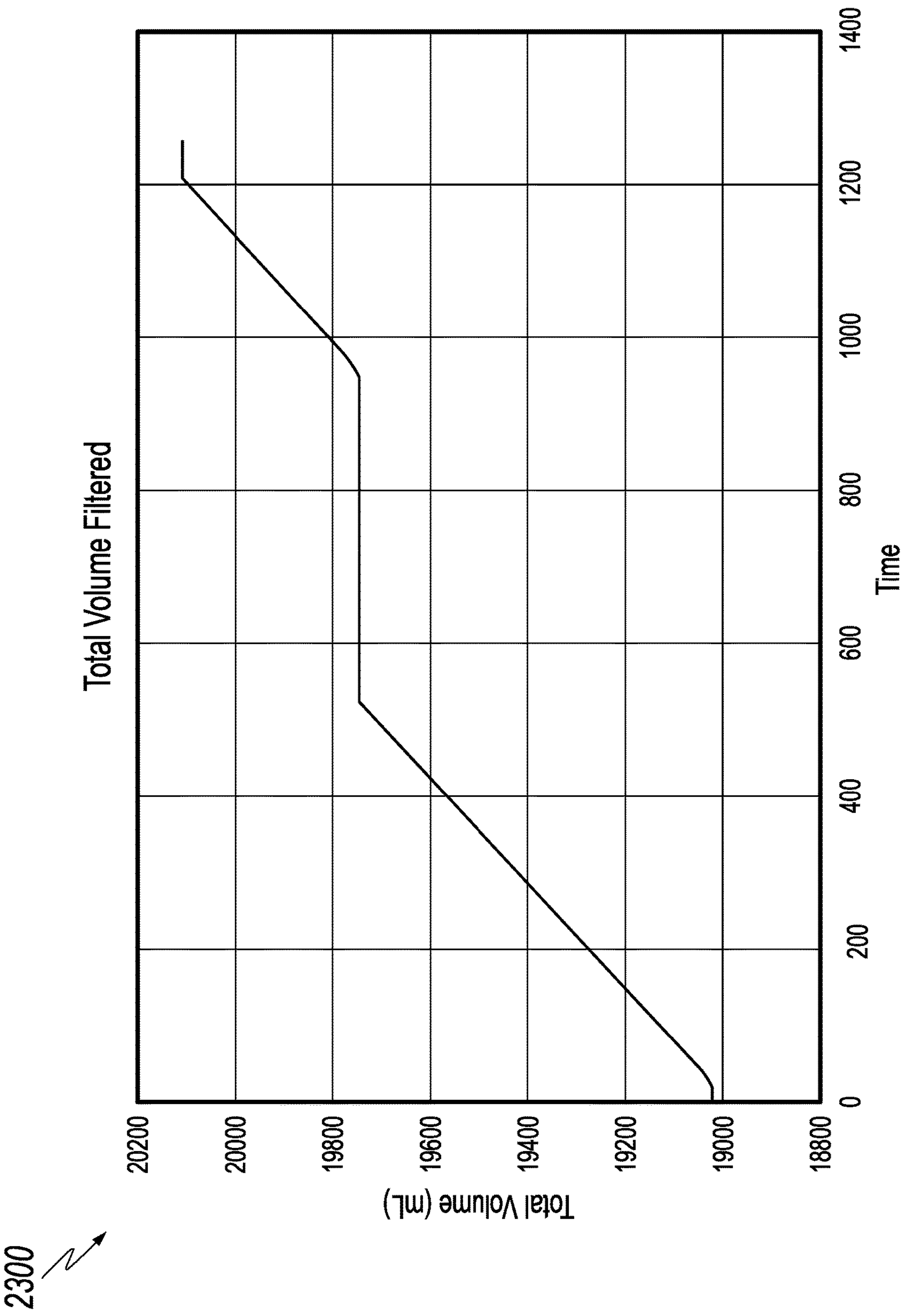
FIG. 23 is a plot of the total volume of fluid filtered by an embodiment of a beverage device over time.

FIG. 23 is a plot 2300 of the total volume of fluid filtered by an embodiment of a beverage device over time. As described, a beverage device can be configured to monitor the total volume of filtered fluid, for example, using data provided by a flow meter, to track a health status of the filter module.

Figure 24A:
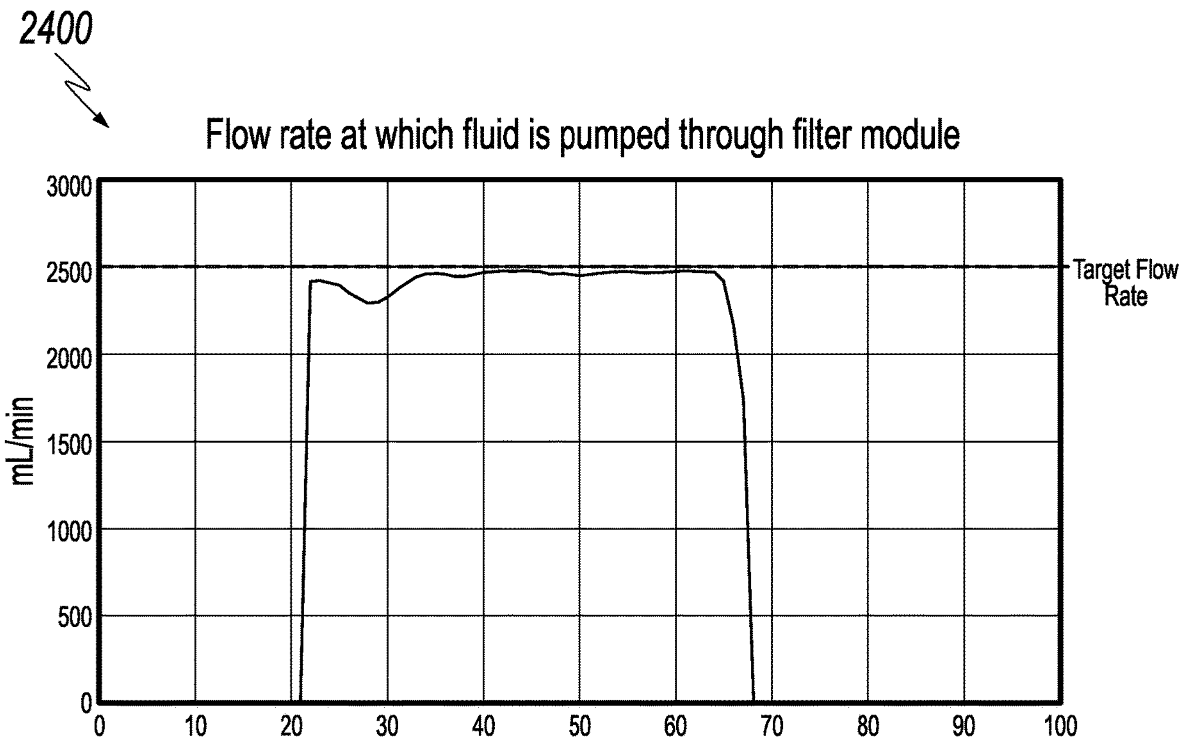
FIG. 24A is a plot of data characterizing a flowrate at which fluid is pumped through a filter module by an embodiment of a beverage device.

FIG. 24A is a plot 2400 of data characterizing a flowrate at which fluid is pumped through a filter module by an embodiment of a beverage device. During operation, the beverage device can be configured to control a pump such that the flowrate of fluid through the filter module is be maintained at approximately a predetermined target flowrate (2500 mL/min in the depicted example).

Figure 24B:
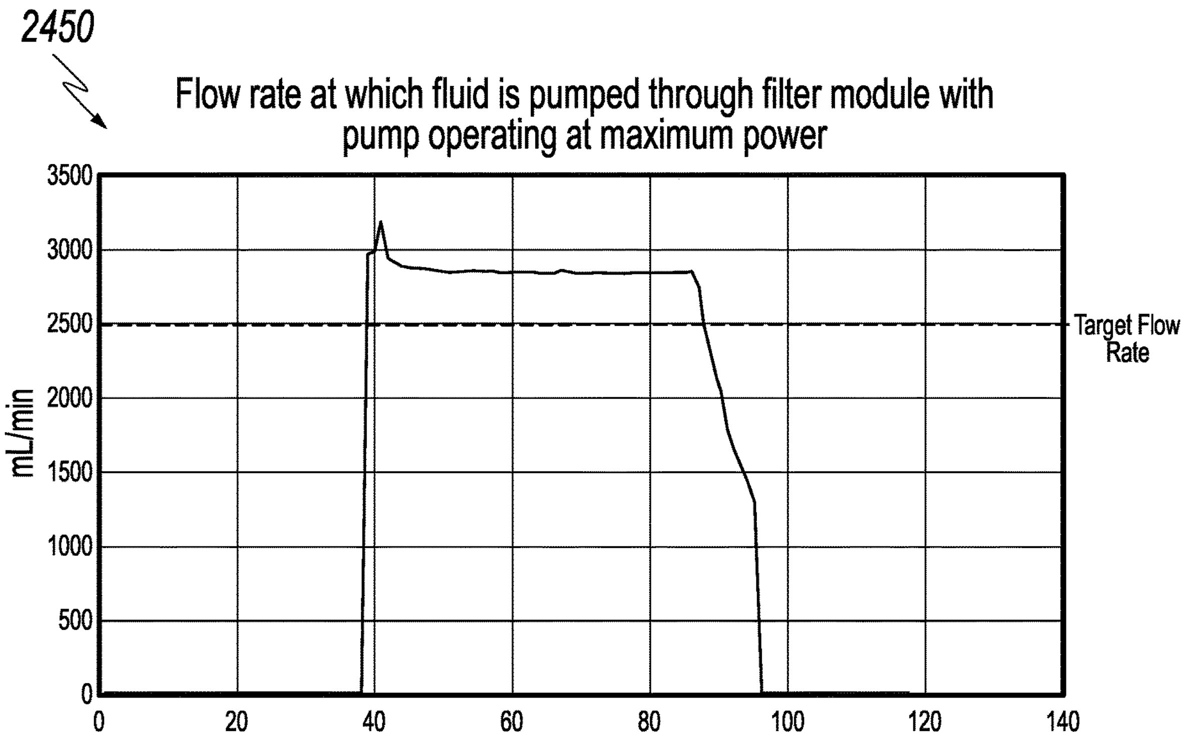
FIG. 24B is a plot of data characterizing a flowrate at which fluid is pumped through a filter module by an embodiment of a beverage device when a pump of the beverage device is operating at maximum power.

FIG. 24B is a plot 2450 of data characterizing a flowrate at which fluid is pumped through a filter module by an embodiment of a beverage device when a pump of the beverage device is operating at maximum power. As shown, when the pump is operating at its maximum capability, fluid can be driven through the filter module at a rate that exceeds a target flowrate (2500 mL/min in this example) at which the fluid is driven during normal operation. The beverage device can be configured to increase the operating power of the pump (and thereby increase the flowrate of fluid through the filter module) above the target flowrate to prevent flowrate reductions resulting from, for example, the filter module becoming clogged with sediment.

Figure 25:
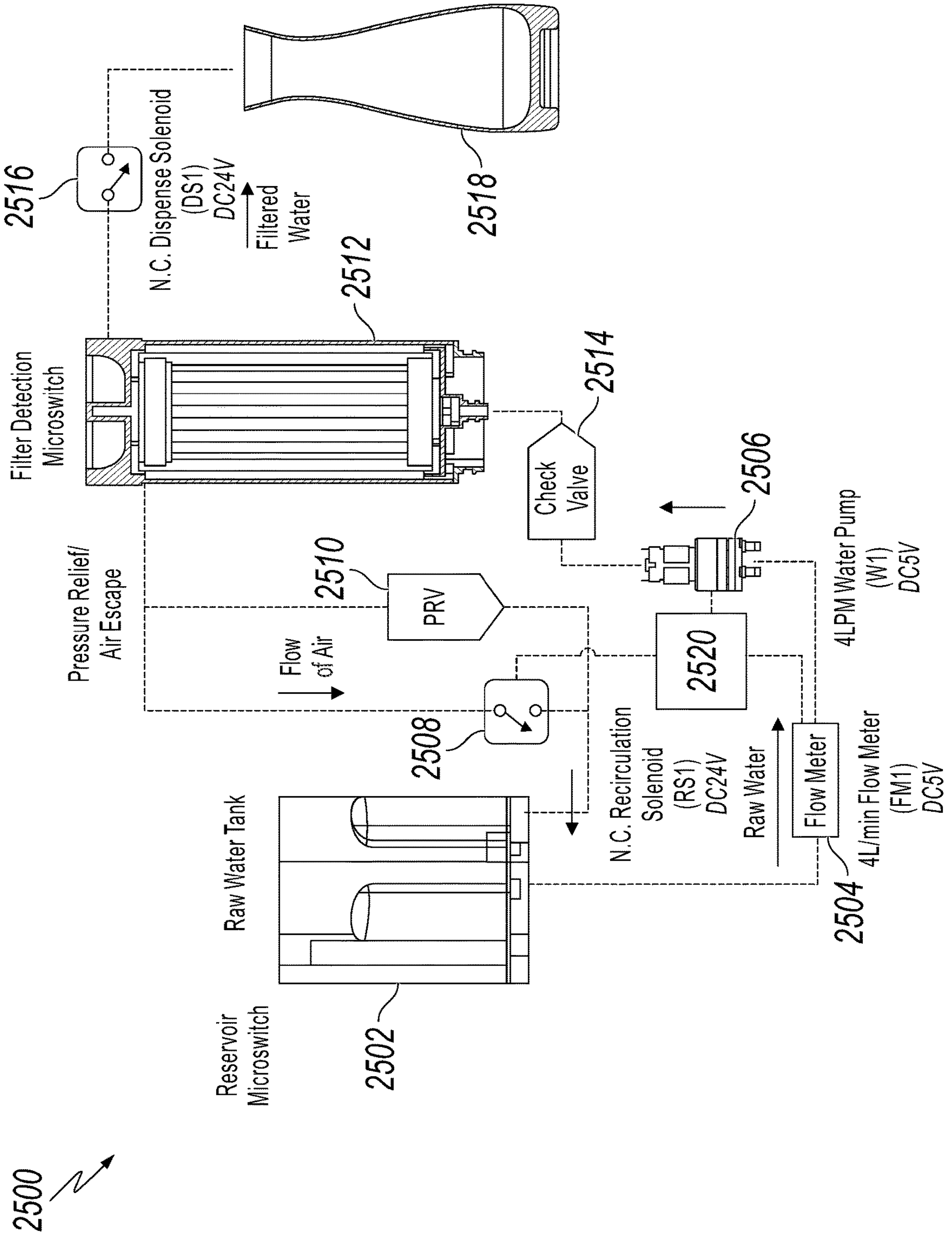
FIG. 25 is a system diagram illustrating a fluid flow configuration for a beverage device.

FIG. 25 illustrates a beverage system 2500 for filtering fluid. In some aspects, components and functionalities of the beverage system 2500 can be similar to those of the beverage system configurations described above. Accordingly, references to specific components/functionalities of the beverage system 2500 should therefore be understood to encompass the corresponding components of the other described beverage devices unless otherwise noted. For brevity, certain details of the components of the beverage system 2500 are not repeated, but those details are applicable to corresponding and similar components of the other beverage devices.

As shown in FIG. 25, the beverage system 2500 can include a raw water tank 2502, a flow meter 2504, a water pump 2506, a recirculation solenoid 2508, a pressure relief valve 2510, a filter module 2512, a check valve 2514, and a dispense solenoid 2516 configured to dispense filtered fluid into a vessel 2518. The beverage system 2500 can also include a reservoir microswitch (not shown) configured to detect whether the raw water tank 2502 is present and properly installed in the beverage system 2500 and a filter detection microswitch (not shown) configured to detect the presence or absence of the filter module 2512. The raw water tank 2502 serves as a fluid supply reservoir configured to hold unfiltered fluid from which the beverage system 2500 can draw, similar to the fluid reservoir 1802 described with respect to FIG. 18. The flow meter 2504 can be arranged downstream of the raw water tank 2502 to measure the volume of fluid flowing through the beverage system 2500, similar to the flow meter 1814 described with respect to FIG. 18. The water pump 2506 can be configured to draw fluid from the raw water tank 2502 through the flow meter 2504 and to drive the fluid through the beverage system 2500, similar to the two-pump system described above in reference to FIG. 18.

The recirculation solenoid 2508 controls the flow of fluid back into the raw water tank 2502 along a recirculation path, similar to as described above. In the illustrated embodiment, the recirculation solenoid 2508 is a normally closed solenoid valve coupled to the controller, which selectively opens and closes the recirculation solenoid 2508 to control recirculation of fluid back into the raw water tank 2502, similar to the recirculation valve 112 described with respect to FIG. 1 and the recirculation valve 212 described with respect to FIGS. 2-12. The pressure relief valve 2510 regulates pressure within the fluid pathway of the beverage system 2500. As shown in FIG. 25, an air escape pathway extends from the pressure relief valve 2510 toward the raw water tank 2502, allowing the pressure relief valve 2510 to release air from the filter module 2512 and reduce pressure levels within the filter module 2512. Based on data provided by the filter detection microswitch, the controller determines whether the filter module 2512 is properly installed and can provide an alert if the filter module 2512 is missing or improperly installed.

The filter module 2512 receives unfiltered fluid from the raw water tank 2502 and removes impurities from the fluid before dispensing, similar to the filter module 1804 described with respect to FIG. 18. The check valve 2514, positioned downstream of the filter module 2512, controls fluid flow direction within the beverage system 2500 and prevents backflow of fluid toward the filter module 2512 during certain operating conditions. The dispense solenoid 2516 controls the release of filtered water from the beverage system 2500 to a dispensing outlet. In the illustrated embodiment, the dispense solenoid 2516 is a normally closed solenoid valve coupled to the controller, which selectively opens and closes the dispense solenoid 2516 to control dispensing of filtered fluid to a vessel such as a carafe or pitcher for user consumption.

The beverage system 2500 can also include a controller 2520, which is also referred to herein as at least one processor, for example, and which is configured to control operations of the system 2500. In some aspects, the controller 2520 can be similar to the controller 120 of FIG. 1 and can operate similarly. Operations performed by the controller 2520 are described in greater detail below in reference to FIGS. 35-41. In some aspects, the controller 2520 can store system variables in non-volatile memory, such as filter change counts, dispense volume totals, remaining filter life, and timing parameters, so the beverage system 2500 can resume operation after a power interruption without losing usage data or configuration settings. In some aspects, the controller's main control loop can operate at a fixed interval (e.g., 200 milliseconds) to provide consistent timing for monitoring sensors, updating system state, and controlling output devices such as the water pump 2506, recirculation solenoid 2508, and dispense solenoid 2516. In other aspects, the control loop can execute in response to specific events, such as installation of a new filter or a sudden drop in flowrate. Other timing intervals may be used depending on the controller's processing capabilities and the system's responsiveness requirements.

Figure 26A:
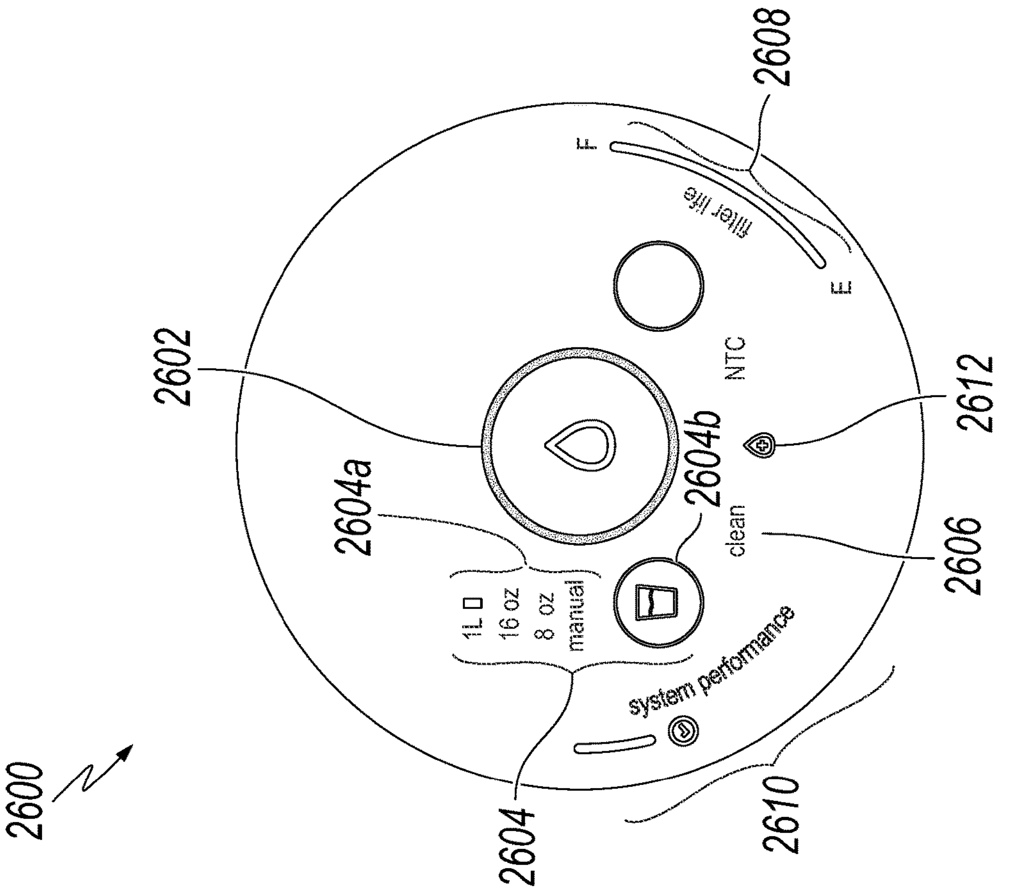
FIGS. 26A-26F are various views of a user interface for a beverage device according to the systems described herein.
Figure 26B:
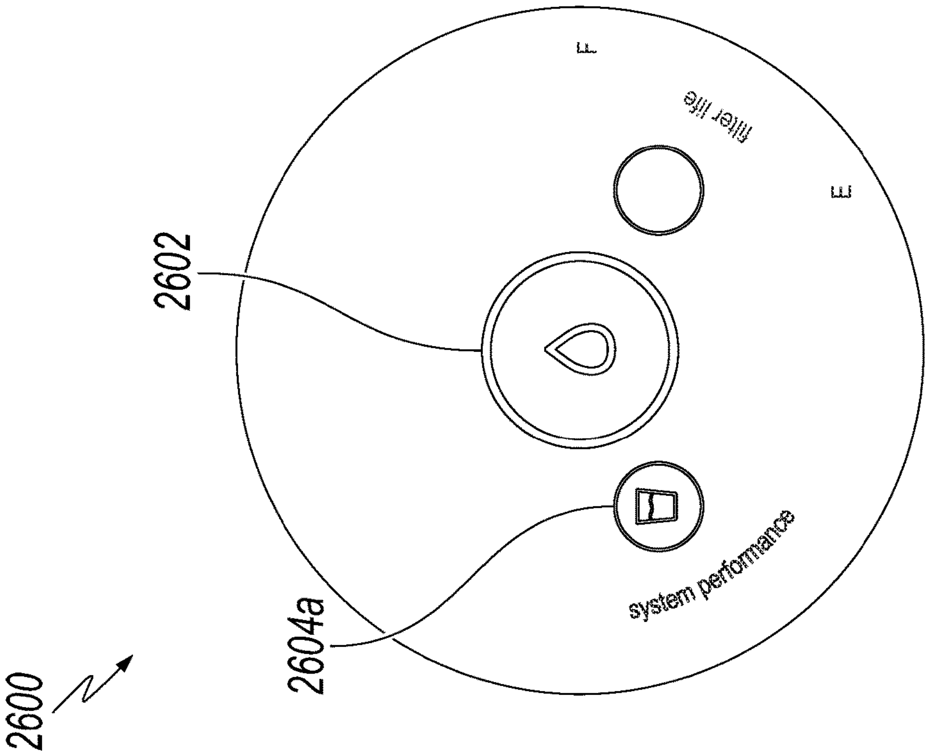

Referring to FIGS. 26A and 26B, a user interface (UI) 2600 for a beverage device is illustrated in active and inactive states, respectively. The UI 2600 receives user input characterizing a request to dispense a filtered beverage and displays system status information to a user, similar to the user interface 118 described with respect to FIG. 1 and the user interface 218 described with respect to FIG. 2. The UI 2600 can be implemented using an LCD, OLED, or e-ink display configured to present information regarding device status, alerts, and instructions. The UI 2600 includes a dispense button 2602, which is configured to initiate or terminate a dispensing operation responsive to receipt of user inputs. The UI 2600 can also include a volume selection region 2604 which includes an indication of a plurality of volume selection options 2604*a* and a volume selection button 2604*b*. In the illustrated embodiment, the volume selection options 2604*a* can indicate a variety of beverage volume options to be dispensed by the system (e.g., a 1 L option, a 16 oz option, an 8 oz option, a manual option, etc.). In some aspects, the user can toggle between different options 2604*a* by interacting with the volume selection button 2604*b*. For example, when the user interacts with the volume selection button 2604*b* to toggle the system to select the 1 L option, the beverage systems described herein can be configured to dispense 1 L of filtered fluid during a next dispensing operation. Alternatively, when the user interacts with the volume selection button 2604*b* to toggle the system to the manual option, the user is enabled to dispense fluid continuously while the dispense button 2602 is engaged rather than dispensing a predetermined volume.

In some aspects, the UI 2600 also includes one or more filter status indicators 2606, 2608 configured to provide the user with information regarding the status of the filter on the system. For example, the filter status indicator 2606 can simply provide the user with a simple indication as to whether or not the filter is "clean," the indicator 2608 can provide the user with a dynamic bar indication, illustrating the amount of life left in the filter (e.g., between a full filter status "F" and an empty or depleted filter status "E". The filter life indicator 2608 includes an illuminated arc portion that indicates remaining filter life. As the filter module processes fluid over time, the illuminated arc portion decreases in length to visually communicate the remaining filter capacity to a user. In some aspects, the controller (e.g., controller 2520) can track and display the filter life in either continuously or in discrete jumps (e.g., by breaking the total filter life into 10 discrete segments, or any other number). The UI 2600 can also include a system performance indicator 2610 configured to display information pertaining to how well the system is performing or if there is an error with the system. The UI can also include an "add water" indicator 2612 configured to illuminate when the controller determines that the fluid tank of the systems is low on fluid or empty.

FIG. 26B illustrates the UI 2600 in an inactive or off state. In the inactive state, the display elements of the UI 2600 are dimmed or deactivated. The dispense button 2602, the volume selection options 2604*b* and other interface elements remain visible but not illuminated, while other illuminated indicators are not displayed.

In some aspects, the UI 2600 can further include a progress bar (not shown) configured to display progress of various operational cycles of the beverage device. For example, in some aspects, the controller can calculate and display progress for different operations including filter priming cycles, filter rinse cycles, filter drain cycles, etc. The details of various cycles of the beverage systems described herein are discussed in greater detail below.

FIGS. 26C-26F illustrate a variation of the UI 2600, referred to herein as UI 2600', which provides additional display modes for presenting information to a user. In some aspects, the user can cycle between various display modes or select a preferred display mode via the UI 2600', for example, by interacting with the UI 2600' via swipe or tap gesture inputs. As shown in FIGS. 26C-26F, the UI 2600' can include a central display area 2601' configured to display different information to the user based on the selected mode. The UI 2600' can also include a dispense button 2602', a size/volume button 2604', and a filter button 2606'. While the central display area 2601', dispense button 2602', size/volume button 2604', and filter button 2606' are shown in FIGS. 26C-26F in a particular arrangement relative to one another, other positional arrangements are also contemplated herein. It is also contemplated herein that any of the dispense button 2602', size/volume button 2604', and filter button 2606' could be included as selectable modes for display by the central display area 2601', rather than being provided as distinct buttons.

Figure 26C:
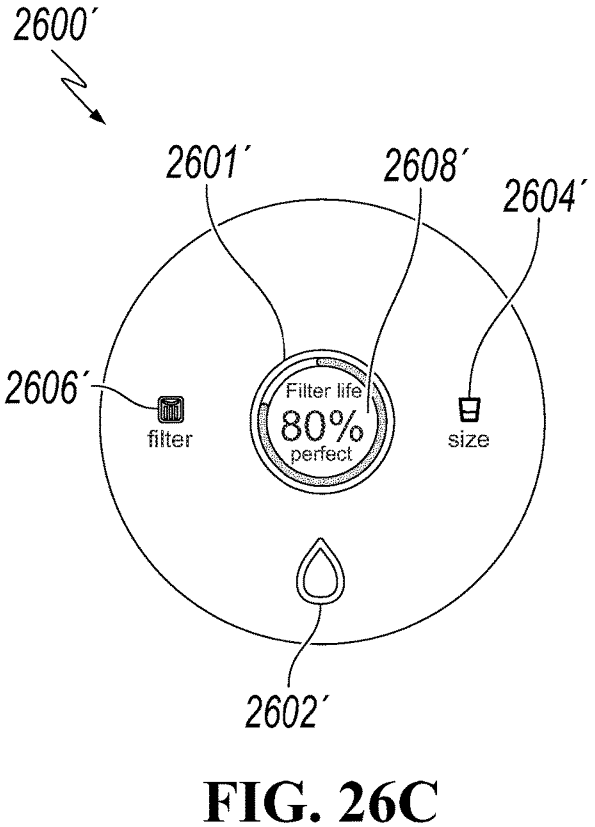
Figure 26D:
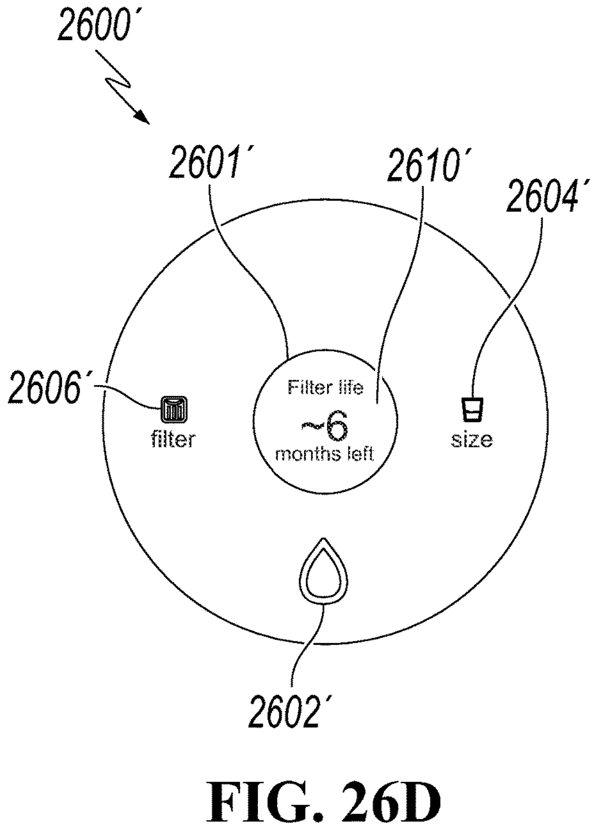
Figure 26E:
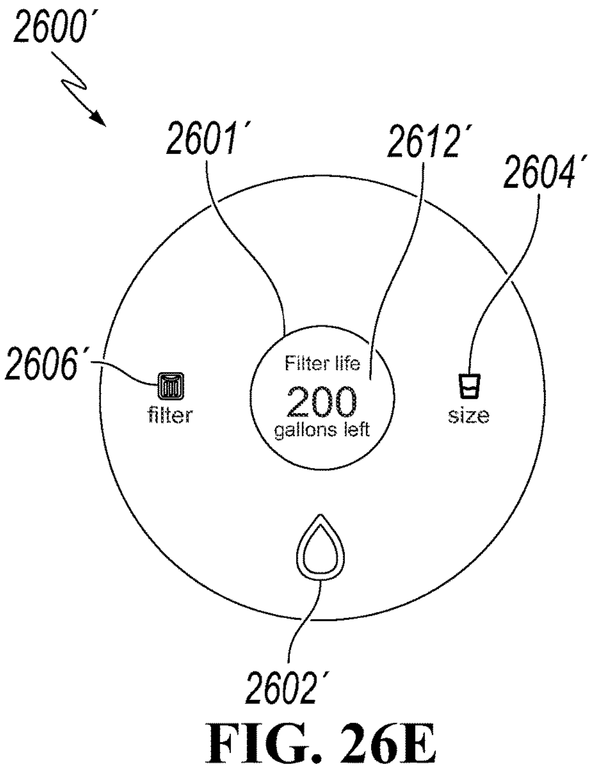
Figure 26F:
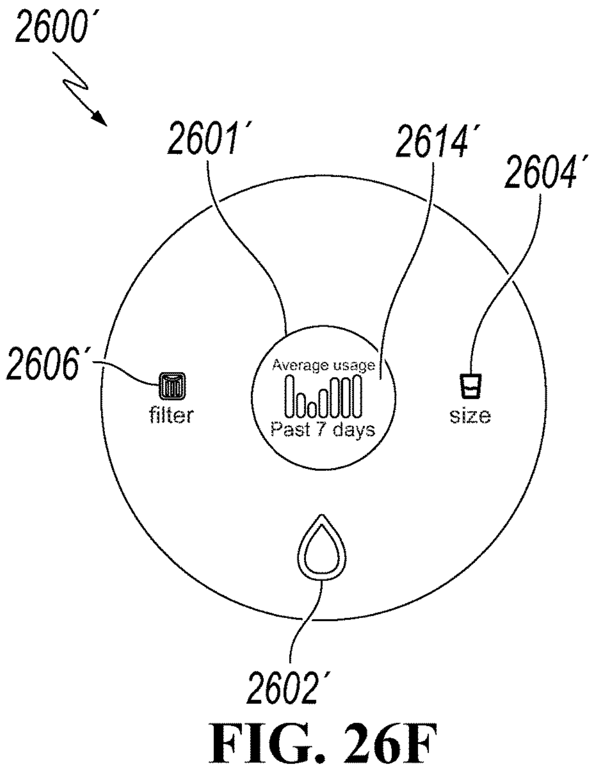

As shown in FIG. 26C, in some aspects, the central display area 2601' can be configured to display filter life as a percentage. In this case, the central display area 2601' displays a percentage value 2608' (e.g., "80%") corresponding to a remaining life of the filter. FIG. 26D shows the UI 2600' displaying filter life as an estimated time remaining. In this case, the central display area shows an approximate time value 2610' (e.g., "~6 months left") with a filter life label above it, providing users with a time-based estimate of when filter replacement will be needed. FIG. 26E shows the UI 2600' displaying filter life as a volume remaining. In this case, the central display area shows a volume value 2612' (e.g., "200 gallons left"), providing users with a volume-based estimate of remaining filter capacity. FIG. 26F shows the UI 2600' displaying average usage statistics. In this case, the central display area shows a bar chart 2614' providing users with a visual representation of their water consumption patterns over the previous seven-day period, allowing users to track their hydration habits. For example, in some aspects, the controller can be configured to maintain a daily volume buffer array and calculate average weekly consumption for display on the UI 2600'. The daily volume buffer array stores dispense volume data for each day of a given time period (e.g., a seven-day period), and the controller calculates an average weekly consumption value based on the stored data. This consumption information provides users with insight into their water consumption patterns. In some aspects, the controller can further be configured to implement a goal tracking feature whereby the system or the user can set a goal volume of consumption (e.g., over the course of a week or a month, etc.) and the UI 2600' can be adapted to display progress toward the goal to encourage users to maintain adequate hydration levels.

In some aspects, the controller can be configured to track filter life based on a predetermined filter capacity that defines a total volume of fluid that the filter module is rated to filter before replacement is recommended. In some aspects, the predetermined filter capacity can be approximately 150 gallons, though other capacity values such as 240 gallons are also contemplated. The controller can store the predetermined filter capacity as a configurable parameter in memory, allowing the filter capacity value to be adjusted based on the specific filter cartridge type installed in the beverage system. The controller can maintain a total per-filter volume count variable that tracks a cumulative volume of fluid that has flowed through the currently installed filter module. Each time a dispensing operation completes, the controller can increment the total per-filter volume count by the volume dispensed during that operation. The controller can calculate remaining filter life by subtracting the total per-filter volume count from the predetermined filter capacity. This remaining filter life value can be stored in non-volatile memory and can be displayed on the user interface to inform users of the current filter status.

In some aspects, the buttons of the UIs 2600 and 2600' can be capacitive touch buttons configured to detect user contact, or can be mechanical/electromechanical buttons. As indicated above, in some aspects, the UI 2600 can be implemented using an LCD, OLED, or e-ink display configured to present information regarding device status, alerts, and instructions. Accordingly, in some aspects, some or all of the indicators discussed above may be back-lit indicators which are configured to be illuminated by the display, when activated. In some aspects, the indicators may be a mixture of text based and LED based indicators. In some aspects, the indicators may also include tactile portions configured to by distinguished by a user tactically.

Figure 27:
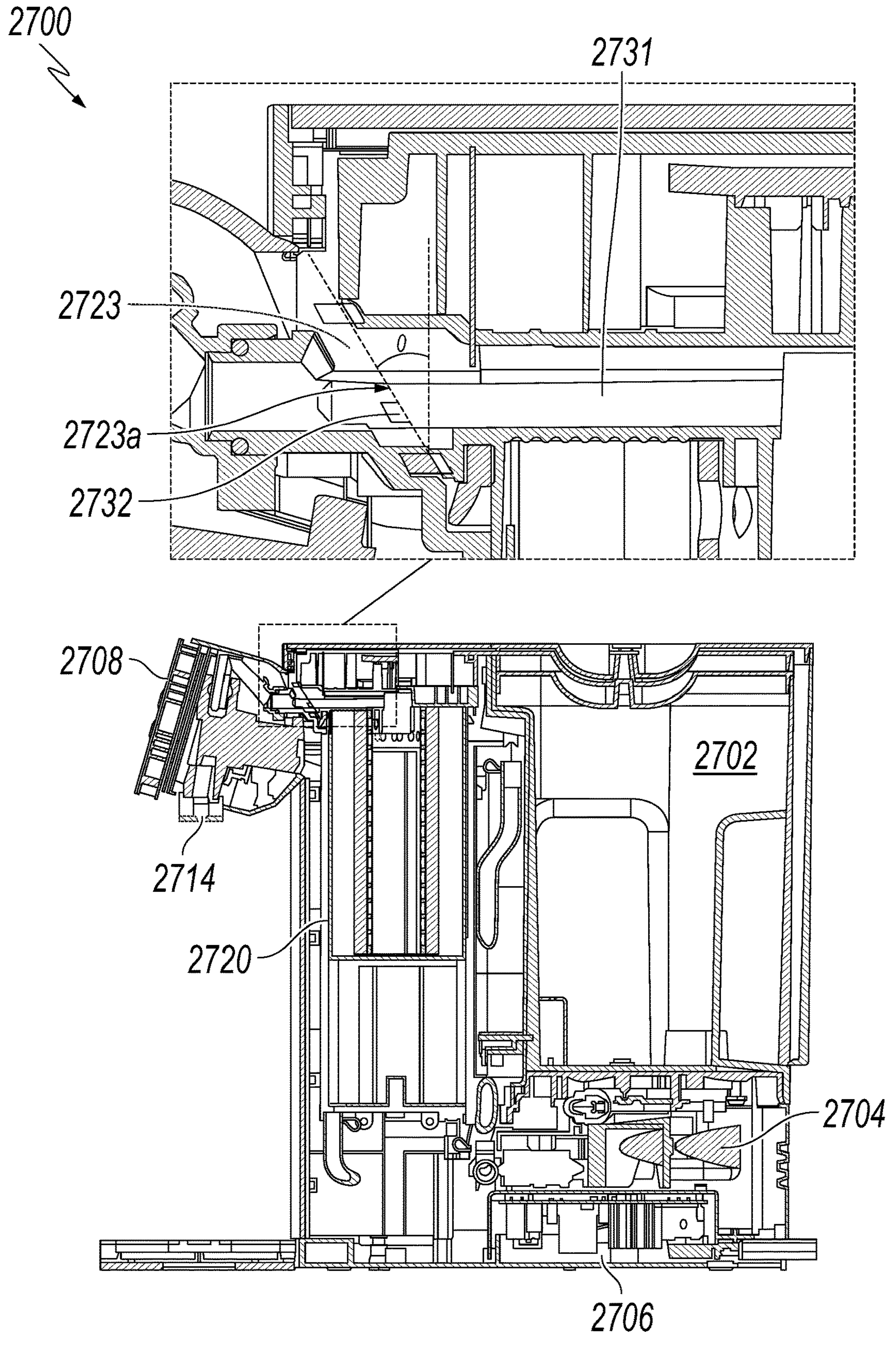
FIG. 27 is a cross-sectional side view of a beverage device with an enlarged detail view of a portion thereof.

FIG. 27 illustrates a cross-sectional side view of a beverage system 2700 with an enlarged detail view of a portion thereof. The beverage system 2700 includes components similar to the beverage systems described above, including a reservoir 2702 configured to store unfiltered fluid, a pumping system 2704, an electronics unit 2706, a user interface 2708, a filtered fluid dispensing outlet 2714, and a filtration unit 2720. The beverage system 2700 can operate similarly to the systems described above, with the pumping system 2704 configured to draw fluid from the reservoir 2702, drive the fluid through the filtration unit 2720 for filtering, and dispense filtered fluid through the dispensing outlet 2714. Components of the filtration unit 2720 are discussed in greater detail below in reference to FIGS. 28-34.

Figure 28A:
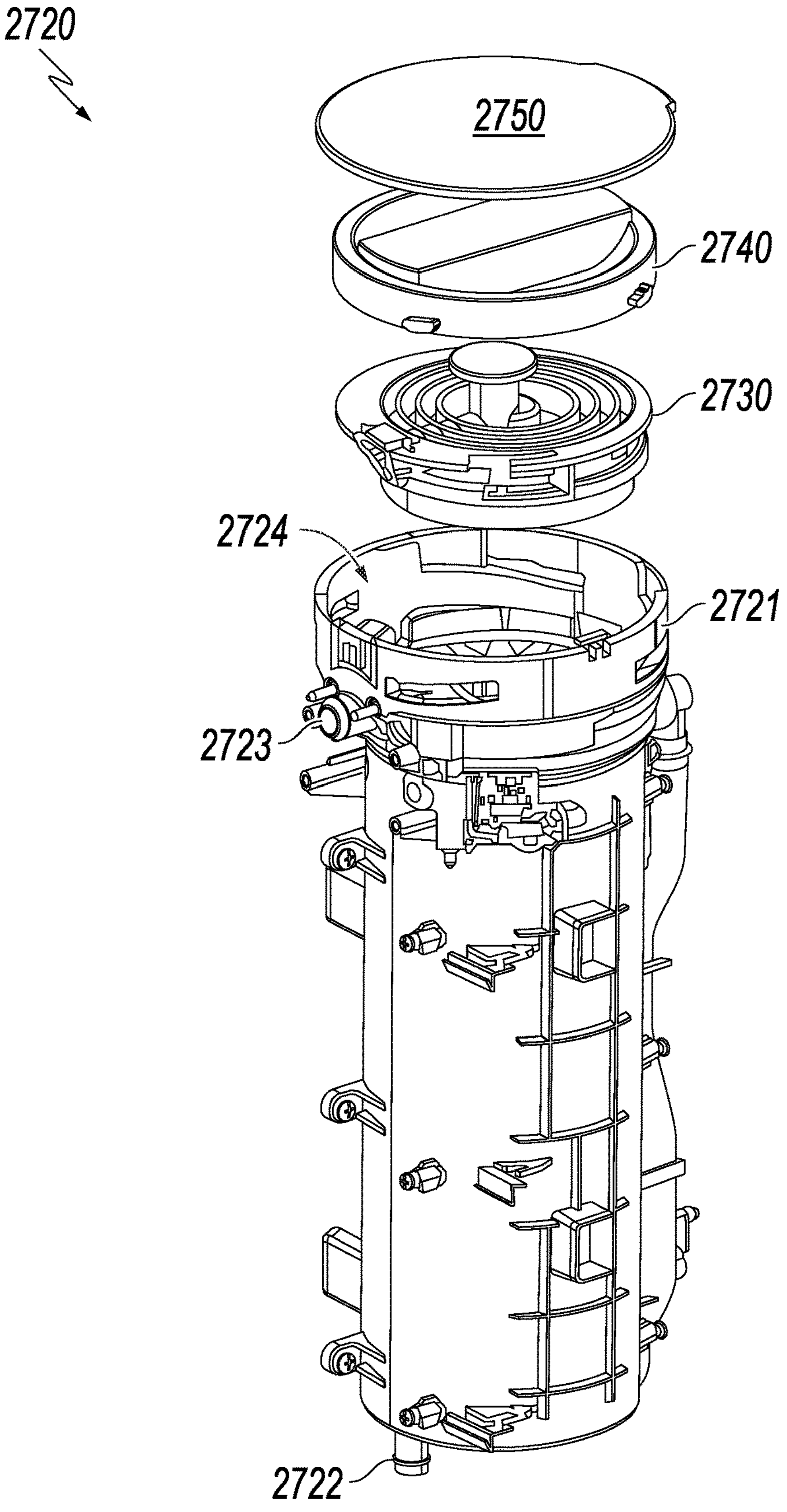
FIG. 28A is an exploded view of a filter module for a beverage device.
Figure 28B:
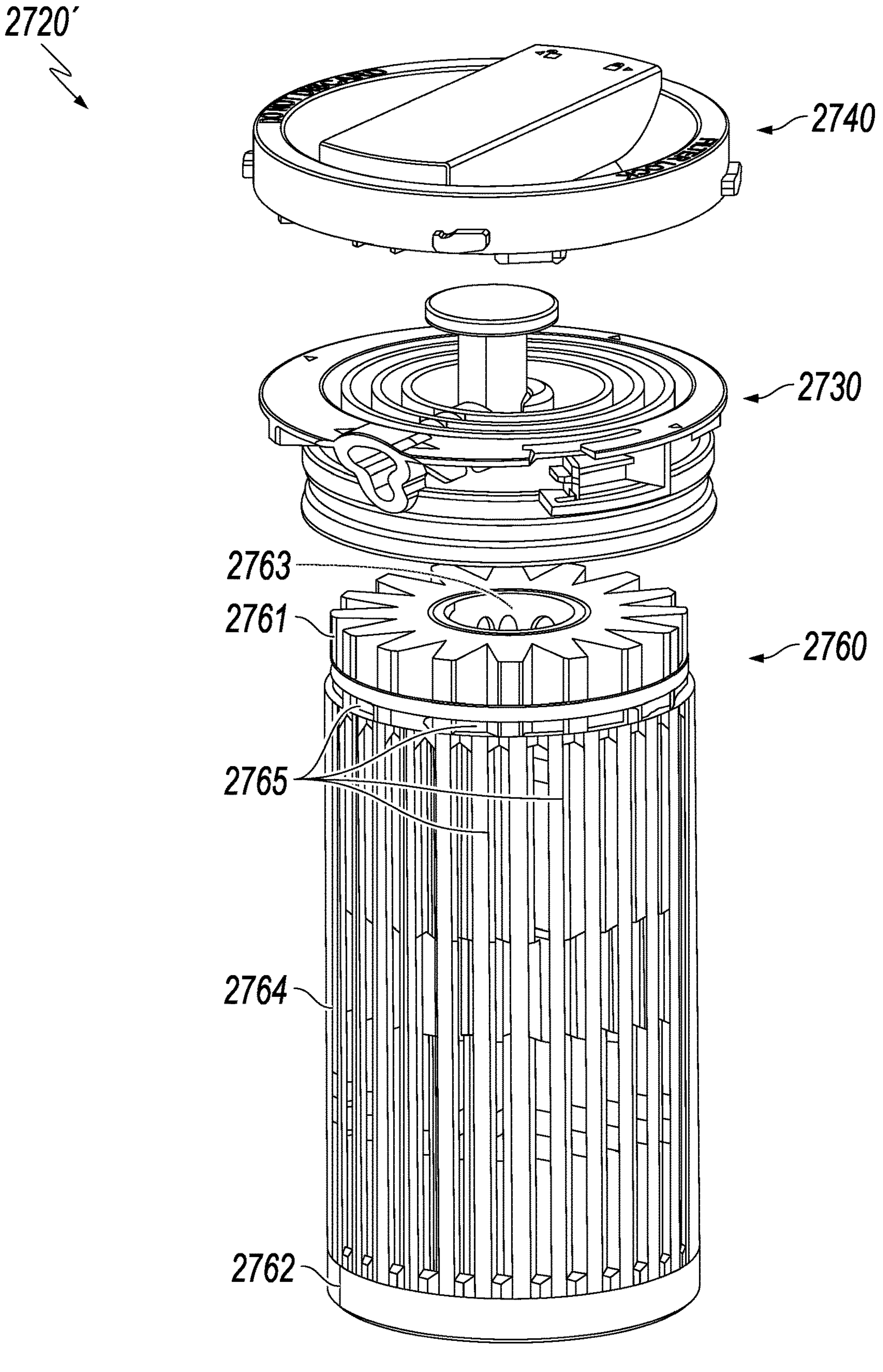
FIG. 28B is an exploded view of a filter assembly for a beverage device, including a filter cartridge and the cap body and locking cap of FIG. 28A.

FIG. 28A illustrates an exploded view of the filtration unit 2720. The filtration unit 2720 includes a filter housing 2721, a cap body 2730, a locking cap 2740, and an aesthetic top cap 2750. The filter housing 2721 is an elongated cylindrical housing configured to receive a filter cartridge 2760, as shown in FIG. 28B, within an internal volume thereof. However, in some aspects, the system 2700 can be configured to receive any of the filter cartridges described above. The filter housing 2721 includes a fluid inlet 2722 located at a lower portion thereof and configured to receive fluid to be filtered from the reservoir 2702, and a fluid outlet 2723 located at an upper portion thereof and configured to dispense filtered fluid from the filter housing 2721 to the dispensing outlet 2714. The cap body 2730 is configured to seal around a top opening 2724 of the filter housing 2721. The locking cap 2740 is configured to lockingly seal around the top opening 2724 over top of the cap body 2730 to lock the cap body 2730 in place. The aesthetic top cap 2750 is a circular lid configured to provide a finished appearance to the upper end of the filtration unit 2720 when assembled.

FIG. 28B illustrates an exploded view of a filter assembly 2720' for a beverage device, including a filter cartridge 2760 and the cap body 2730 and locking cap 2740 of FIG. 28A. In general, the filter cartridge 2760 can share features and functionality with other filter cartridges described herein, for example, the filter cartridge **204*b* described with respect to FIGS. 6-12. The filter cartridge 2760 is configured to be removably positioned within the internal volume of the filter housing 2721. As shown in FIG. 28B, the filter cartridge 2760 can include a filter medium 2761, a lower end cap 2762, a central core 2763, and a casing 2764 having airflow slots 2765 provided at a top and bottom thereof, or along a length thereof, to provide improved airflow when priming the filter. The casing 2764 can surround the filter medium 2761 and can provide structural support while enabling air to escape through the airflow slots 2765 during priming operations. The filter medium 2761 can have a hollow cylindrical structure defining a central channel therethrough. The filter medium 2761 can be configured to receive unfiltered fluid at an exterior surface thereof, and fluid received at the exterior surface can be drawn into the filter medium 2761 toward the central channel. The lower end cap 2762 can be coupled to a lower end of the filter medium 2761 and can be configured to retain the filter medium 2761 thereon. The central core 2763 can be arranged within the central channel of the filter medium 2761 and can be configured to prevent the filter medium 2761** from collapsing inward or otherwise deforming during operation.

Figure 29A:
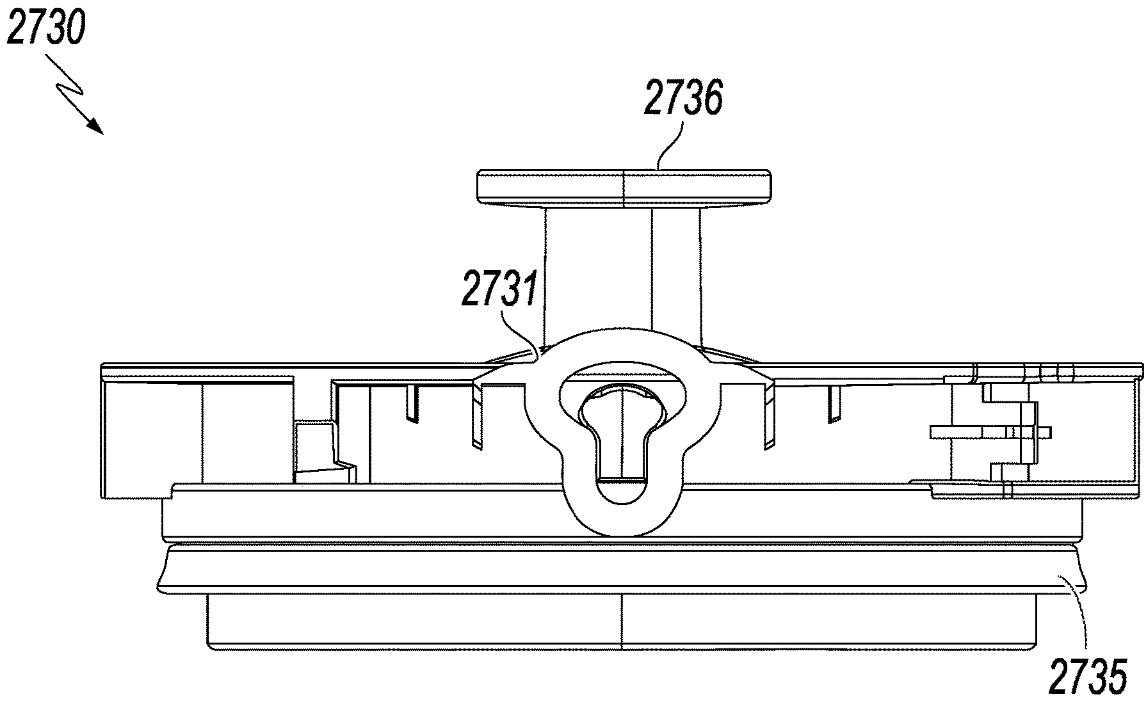
FIGS. 29A-29B are front and side views, respectively, of the cap body of the filter module of FIG. 28A.
Figure 29B:
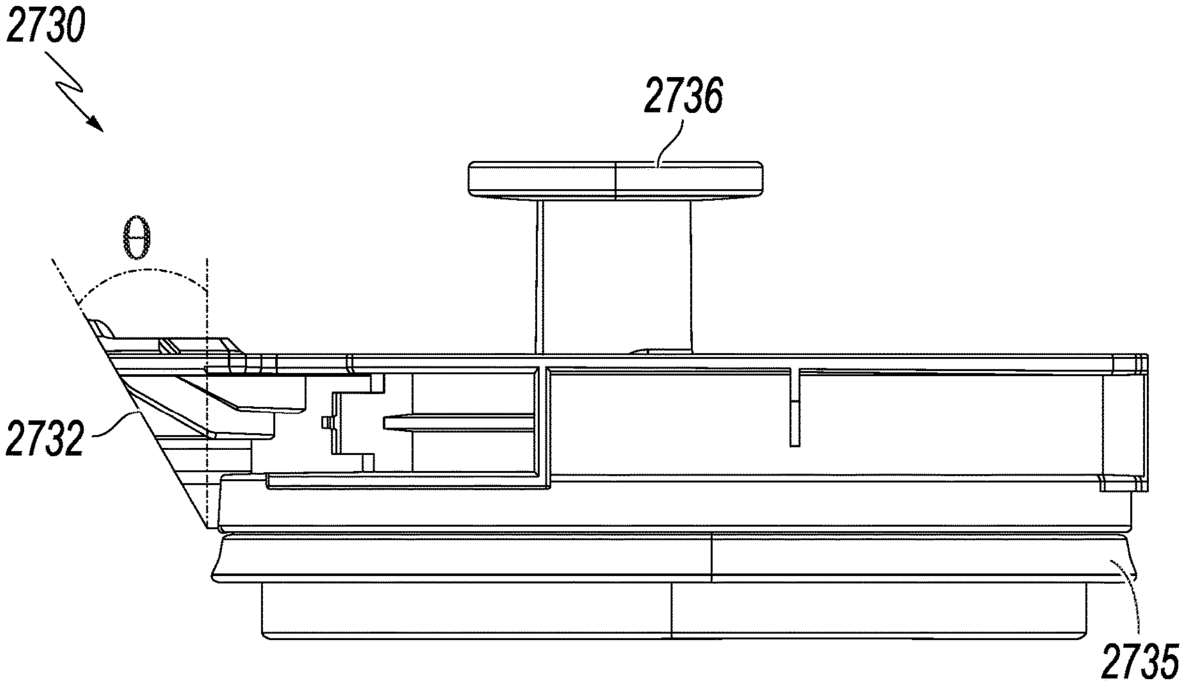

FIGS. 29A and 29B illustrate front and side views, respectively, of the cap body 2730. As shown in the front view of FIG. 29A, the cap body 2730 includes a fluid port 2731 having an outlet with a shape that resembles a scoop or paddle configuration with a rounded upper portion and a narrower lower neck region (e.g., similar to a head of a lacrosse stick). However, other outlet shapes are also contemplated herein, as discussed above with respect to the various outlet geometries including the rounded-trapezoidal geometry, the dented circular geometry, dual outlet configurations, etc. As shown in the side view of FIG. 29B, the fluid port 2731 includes an angled face 2732 that is set at an angle θ from a vertical plane and configured to sealingly engage with a corresponding internal angled face **2723*a* of the fluid outlet of 2723 of the filter housing 2721, as shown in the enlarged view of the portion of the system of FIG. 27. In some aspects, the angle θ can be between, for example, 30 and 60 degrees (e.g., 45 degrees). It is also appreciated that the angled face 2732 could be angled in the opposite direction from that shown in FIG. 29B. In such a configuration, a bottom edge of the angled face 2732 would be designed to protrude further from the cap body 2730 than a top edge of the angled face 2732. The cap body 2730 also includes a gasket seal 2735 disposed around a lower portion thereof, configured to provide a fluid-tight seal between the cap body 2730 and the top opening 2724 of the filter housing 2721. The cap body 2730 further includes a button handle 2736 that extends from an upper surface thereof, configured to be grasped by a user and pushed or pulled to place and remove the cap body 2730 from sealing engagement with the filter housing 2721**.

Figure 30:
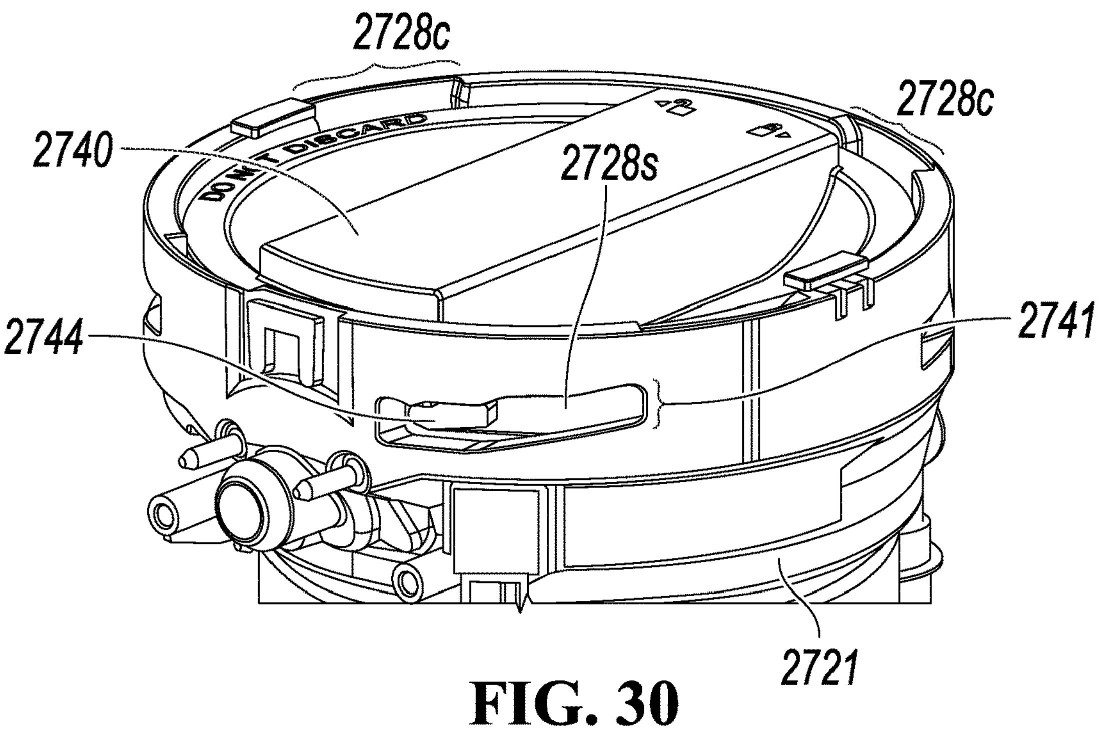
FIG. 30 is a perspective view of a top portion of the filter module of FIG. 28A.

The cap body 2730 and the locking cap 2740 are configured to lock in a nested fashion within the filter housing 2721. The locking cap 2740 is configured to lockingly seal around the top opening 2724 via a bayonet locking mechanism 2741. As shown in FIG. 30, the bayonet locking mechanism 2741 includes one or more tabs 2744 on the locking cap 2740 that engage with corresponding receiving slots **2728*s* formed along an upper edge of the filter housing 2721. When the locking cap 2740 is initially placed onto the filter housing 2721, the tabs 2744 can pass through cutout portions 2728*c* provided around a perimeter of the top opening 2724. As the locking cap 2740 is rotated, the tabs 2744 can be arranged to slide downwardly along the slots 2728*s* to secure the locking cap 2740 and the cap body 2730 within the filter housing 2721. Due to the downward angle of the slots 2728*s*, as the locking cap 2740 is secured, if further compresses the cap body 2730 downward into the filter housing 2721, thus further sealing the gasket seal 2735 of the cap body 2730 with the top opening 2724** of the housing.

Figure 31:
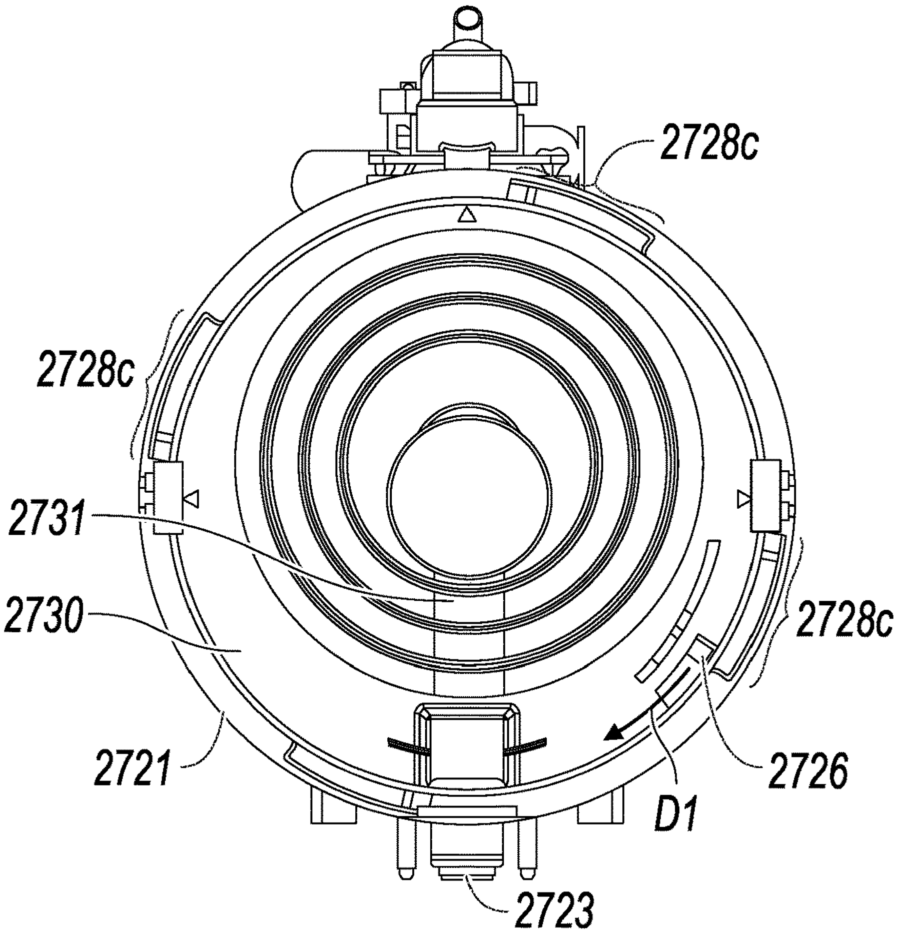
FIG. 31 is a top view of the filter module of FIG. 28A with the cap body placed therein.

FIG. 31 illustrates a top view of the filtration unit 2720 showing the cap body 2730 placed within the top opening of the filter housing 2721. As shown, the fluid port 2731 of the cap body 2730 is aligned with the fluid outlet 2723 of the filter housing 2721. In some aspects, the filtration unit 2720 can further include a filter switch 2726 which is configured actuate when the filter is properly locked within the unit, and communicate to the controller that the filter is properly seated. In some aspects, the filter switch includes a spring-biased switch element **2726*a* that is arranged protrude through the cap body, as shown in FIG. 31, and is configured to move radially in a direction D1 when actuated by the locking cap 2740**, as discussed below.

Figure 32:
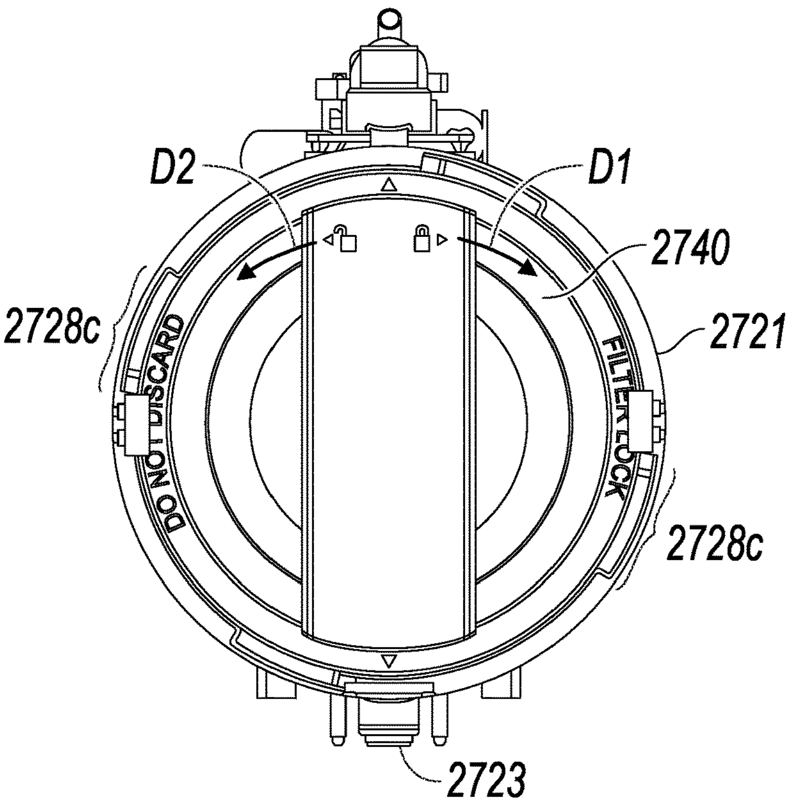
FIG. 32 is a top view of the filter module of FIG. 30, showing a locking cap placed within the filter module.
Figure 33:
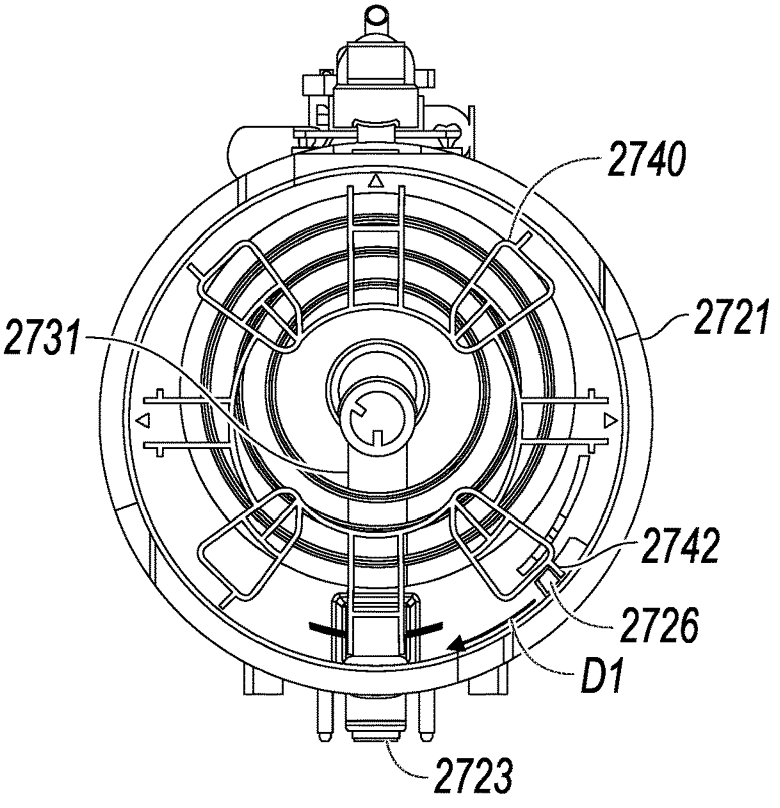
FIG. 33 is a top-sectional view of the filter module of FIG. 32, showing a protrusion of the locking cap causing actuation of a switch of the filter module.

FIGS. 32 and 33 illustrate a top view and a top sectional view, respectively, of the filtration unit 2720 with the locking cap 2740 placed within the filter housing 2721. As the locking cap 2740 is rotated clockwise in the radial direction D1, during a locking operation, as shown in FIG. 32, a locking tab 2742 of the locking cap 2740 is designed to contact and actuate the spring-biased switch element **2726*a* of the filter switch 2726, as shown in the sectional view of FIG. 33. This actuation informs the system that the filter is properly locked. The locking cap 2740 can be unlocked by rotating the locking cap 2740 in the counterclockwise direction D2, as shown in FIG. 32**.

Figure 34:
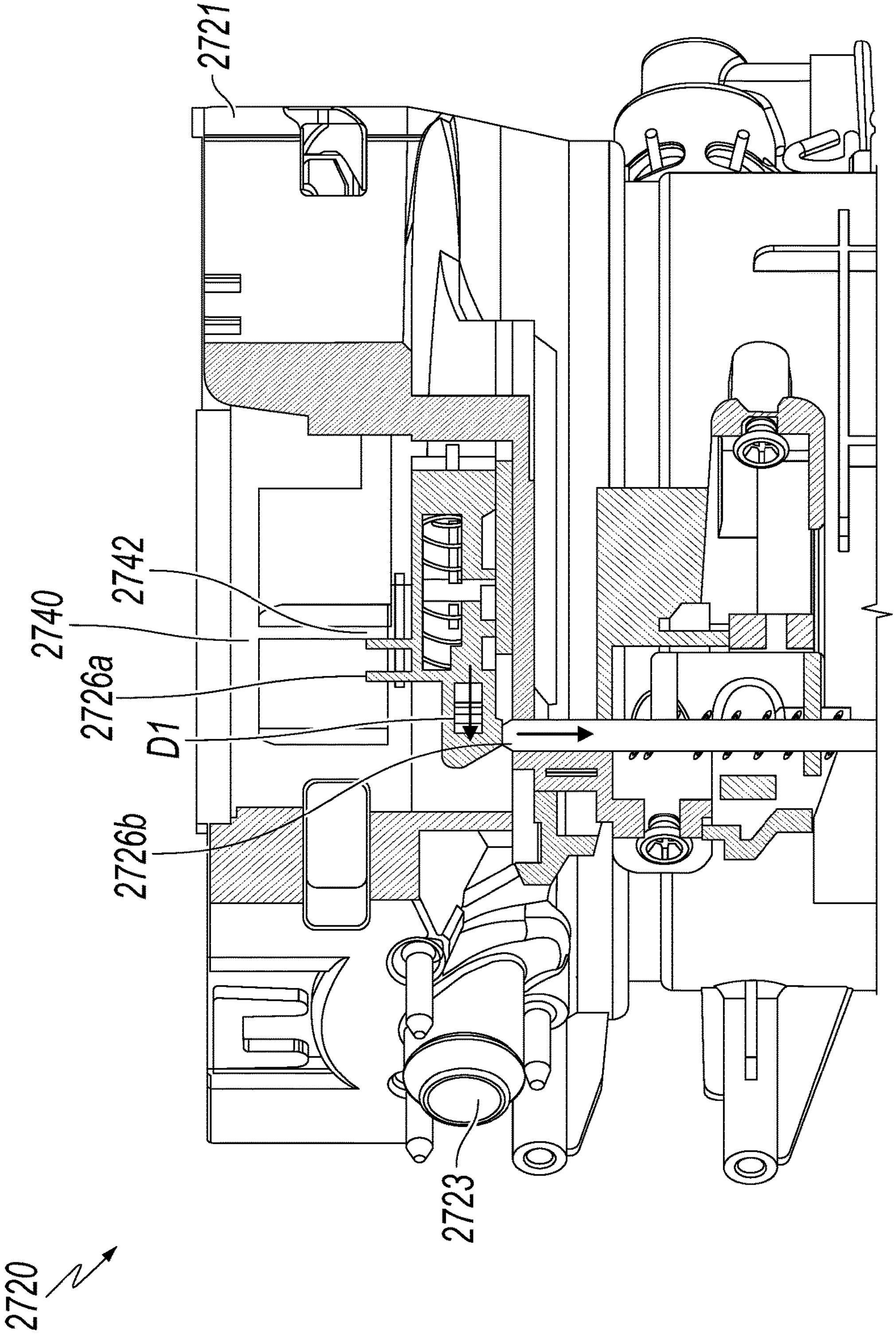
FIG. 34 is a sectional side view of the top portion of the filter module shown in FIG. 30, illustrating the actuation of the switch of the filter module.

FIG. 34 is a partial section view further illustrating the actuation of the filter switch 2726. As shown, as the locking tab 2742 of the locking cap 2740 interacts with the spring-biased switch element 2726*a*, the spring-biased switch element 2726*a* is biased in the direction D1 against the bias of the spring element 2726*a*. This causes a microswitch 2736*b* of the filter switch 2726 to actuate, which communicates with a controller of the beverage system 2700. When the locking cap 2740 is in the locked position, the locking tab 2742 is in continuous engagement with the spring-biased switch element 2726*a* such that the microswitch 2726*b* remains actuated, as shown, indicating that the filter cartridge is properly sealed within the filter housing 2721. If the locking cap 2740 is not properly rotated to the locked position, the locking tab 2742 does not engage the spring-biased switch element 2726*a*, which in turn does not engage the microswitch 2726*b*. In this unactuated state, the controller does not receive the signal indicating proper sealing and may provide an alert to a user via the user interface 2708 indicating improper installation of the filter cartridge.

In some aspects, the fluid port 2731 may be configured to move relative to the cap body 2730 to facilitate sealing engagement with the fluid outlet of 2723 of the filter housing 2721. Various movement configurations may be implemented to enable the corresponding angled face of the fluid port to engage with the internal angled face 2723*a* of the fluid outlet of 2723 after the cap body 2730 is sealed around the top opening 2724, as discussed below.

For example, in some aspects the fluid port may be pivotable. In such a case, the fluid port may include a pivot axis defined on the cap body about which the fluid port rotates. When the cap body is initially positioned within the filter housing, the fluid port may be oriented in a first angular position that provides clearance for insertion. After the cap body is seated around the top opening, the fluid port may be pivoted about the pivot axis to a second angular position in which the corresponding angled face contacts and seals against the internal angled face. The pivoting motion may be actuated manually by a user, automatically by engagement with a feature of the filter housing during locking cap rotation, or by a spring mechanism that urges the fluid port toward the sealing position once the cap body clears an obstruction during installation. In some aspects, the pivotable fluid port may operate in a manner similar to a dispensing lever on a water cooler, where a user-actuated lever pivots between a closed position and an open position to control fluid flow. In such configurations, the fluid port may include a lever arm extending from the pivot axis that a user can grasp and rotate to move the fluid port between the first angular position and the second angular position. The lever arm may be configured to provide mechanical advantage, reducing the force required to pivot the fluid port into sealing engagement. In some variations, the lever arm may include a detent or over-center mechanism that provides tactile feedback when the fluid port reaches the sealing position and that resists inadvertent movement away from the sealing position during operation.

In a slidable configuration, the fluid port may include a track or channel defined on the cap body along which the fluid port translates. The track may be oriented to guide the fluid port in a direction toward the fluid outlet. When the cap body is initially positioned within the filter housing, the fluid port may be located in a retracted position along the track. After the cap body is seated around the top opening, the fluid port may be slid along the track to an extended position in which the corresponding angled face contacts and seals against the internal angled face. The sliding motion may be actuated manually, by a cam mechanism engaged during locking cap rotation, or by a spring that urges the fluid port toward the extended sealing position.

In a rotatable configuration, the fluid port may include a rotational interface between the fluid port and the cap body that permits the fluid port to rotate about an axis. The axis of rotation may be oriented vertically, horizontally, or at an angle relative to the cap body. When the cap body is initially positioned within the filter housing, the fluid port may be oriented in a first rotational position. After the cap body is seated around the top opening, the fluid port may be rotated to a second rotational position in which the corresponding angled face aligns with and seals against the internal angled face. The rotational motion may be coupled to rotation of the locking cap such that rotating the locking cap to the locked position simultaneously rotates the fluid port into sealing engagement.

The spring-biased configuration using the spring element may be combined with any of the pivotable, slidable, or rotatable configurations described above. For example, a spring may urge a pivotable fluid port toward the sealing position, a spring may urge a slidable fluid port toward the extended position, or a spring may urge a rotatable fluid port toward the aligned sealing position. The spring bias may accommodate manufacturing tolerances and thermal expansion while maintaining the hermetic seal during operation.

Similarly, the magnetic coupling may be combined with any of the pivotable, slidable, or rotatable configurations to assist in drawing the fluid port into the final sealing position and maintaining sealing pressure. For example, in some aspects, the angled face of the fluid port and the internal angled face of the fluid outlet may include corresponding magnetic components, such as magnets or ferromagnetic materials, configured to magnetically secure the angled face of the fluid port to the internal angled face of the fluid outlet when engaged, thereby maintaining the hermetic seal during operation. Alternatively or additionally, an adhesive such as a pressure-sensitive adhesive, a curable adhesive, or a gasket-forming compound may be applied between the corresponding angled face and the internal angled face to provide a fluid-tight seal at the interface between the fluid port and the fluid outlet.

Figure 35:
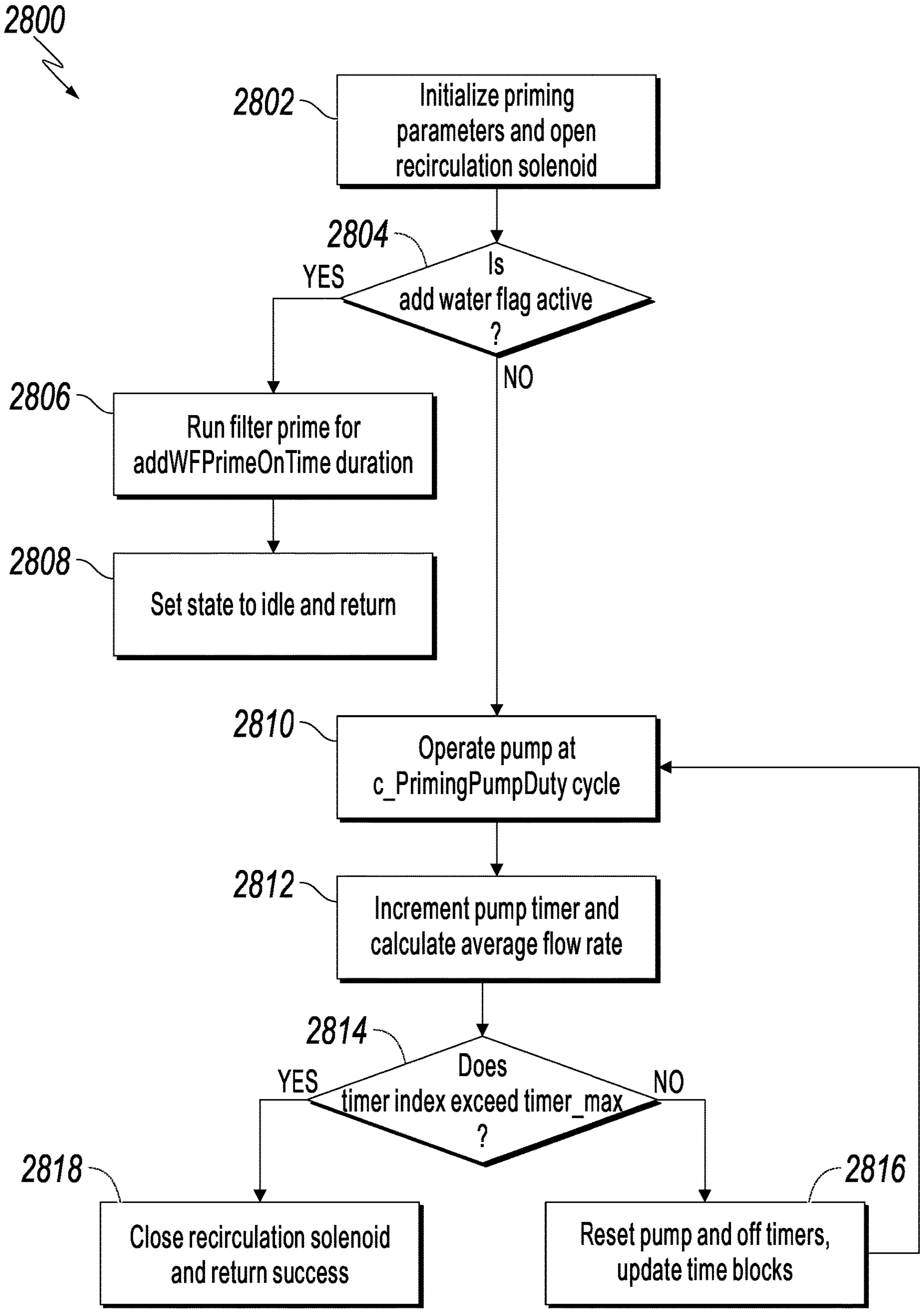
FIG. 35 is a flowchart illustrating an exemplary method of priming a filter in a beverage device according to the systems and methods described herein.

Referring to FIG. 35, a method 2800 of priming a filter in a beverage device is illustrated. The method 2800 can be implemented by a controller of any of the beverage devices described herein, for example, the controller 120 described with respect to FIG. 1. Filter priming can prepare a newly installed filter cartridge for operation by removing air from the filter module and establishing fluid flow through the filter medium. The method 2800 can be initiated responsive to detection of a new filter cartridge installation or responsive to a user input requesting filter priming via a user interface. The method 2800 is described in greater detail below with reference made to the system 2500 of FIG. 25.

At a step 2802, the controller can initialize priming parameters and open a recirculation solenoid. The priming parameters can include a pump timer variable, an off timer variable, and a timer index variable. The pump timer variable can track elapsed time during pump operation within a given priming cycle. The off timer variable can track elapsed time during pump-off periods within a given priming cycle. The timer index variable can track which priming cycle is currently being executed. Opening the recirculation solenoid at the beginning of the priming sequence can establish a flow path from the filter module (e.g., filter module 2512) back to the fluid reservoir, allowing air displaced from the filter module during priming to escape through the recirculation path.

At a step 2804, the controller can determine whether an add water flag is active. The add water flag can indicate that the fluid reservoir contains insufficient fluid to continue the priming operation. In some aspects, the add water flag can be set by an interrupt routine that monitors pump current, flowrate, and other sensor inputs to detect low water conditions. If the add water flag is active, the method 2800 can proceed to a step 2806.

At the step 2806, the controller can run filter prime for a configurable duration defined by an priming on-time parameter. For example, in some aspects, the priming on-time parameter can be set to approximately 3 seconds. Following execution of the step 2806, the method 2800 can proceed to a step 2808, where the controller can set the state to idle and return. In some aspects, when the add water flag becomes active during filter priming, the controller can reset a filter prime flag to true such that the priming sequence restarts after a user refills the fluid reservoir and presses a start/stop button on the user interface.

If the add water flag is not active at the step 2804, the method 2800 can proceed to a step 2810. At the step 2810, the controller can operate the pump at a configurable priming pump duty cycle. In some aspects, the priming pump duty cycle can be defined by a configurable priming pump duty parameter stored in memory. The configurable priming pump duty parameter can be set to a value such as 80% duty cycle, though other duty cycle values are also contemplated. Operating the pump at the configurable priming pump duty cycle can drive fluid from the fluid reservoir through the filter module to displace air and establish fluid flow through the filter medium.

At a step 2812, the controller can increment the pump timer and calculate an average flowrate. The pump timer can be incremented at each iteration of the main control loop to track elapsed time during pump operation. The average flowrate calculation can provide feedback regarding the priming operation progress.

At a step 2814, the controller can determine whether the timer index exceeds a maximum timer value. The maximum timer value can define a total number of priming cycles to be executed during the priming sequence. In some aspects, the controller can be configured to implement a filter priming sequence with configurable on-time and off-time arrays that define multiple priming cycles with different durations for each cycle. The on-time array can be stored as a pump on-time array parameter and can define pump-on durations for each priming cycle. The off-time array can be stored as a pump off-time array parameter and can define pump-off durations for each priming cycle. For example, in some aspects, the pump on-time array can be set to [4, 4, 4, 4, 4] seconds and the pump off-time array can be set to [0, 0, 0, 0, 0] seconds, defining five priming cycles each having a 4-second pump-on duration and a 0-second pump-off duration. Other array values and array lengths are also contemplated.

If the timer index exceeds the maximum timer value at the step 2814, the priming sequence is complete and the method 2800 can proceed to a step 2818. At the step 2818, the controller can close the recirculation solenoid and return success, indicating that the filter priming operation completed successfully.

If the timer index does not exceed the maximum timer value at the step 2814, the method 2800 can proceed to a step 2816. At the step 2816, the controller can reset the pump timer and the off timer and update time blocks. Updating time blocks can involve incrementing the timer index to advance to the next priming cycle and loading the corresponding on-time and off-time values from the configurable arrays. Following the step 2816, the method 2800 can return to the step 2810 to continue operating the pump at the configurable priming pump duty cycle for the next priming cycle.

In some aspects, the controller can be configured to calculate and display a progress bar during filter priming based on the timer index and total priming time. The progress bar calculation can determine a percentage of completion based on the current timer index relative to the maximum timer value. For example, if the maximum timer value is 5 and the current timer index is 2, the progress bar can display 40% completion. In some aspects, the progress bar calculation can also account for elapsed time within the current priming cycle relative to the on-time and off-time values for that cycle to provide a more granular progress indication. The progress bar can be displayed on the user interface to inform users of the priming operation status.

Figure 36:
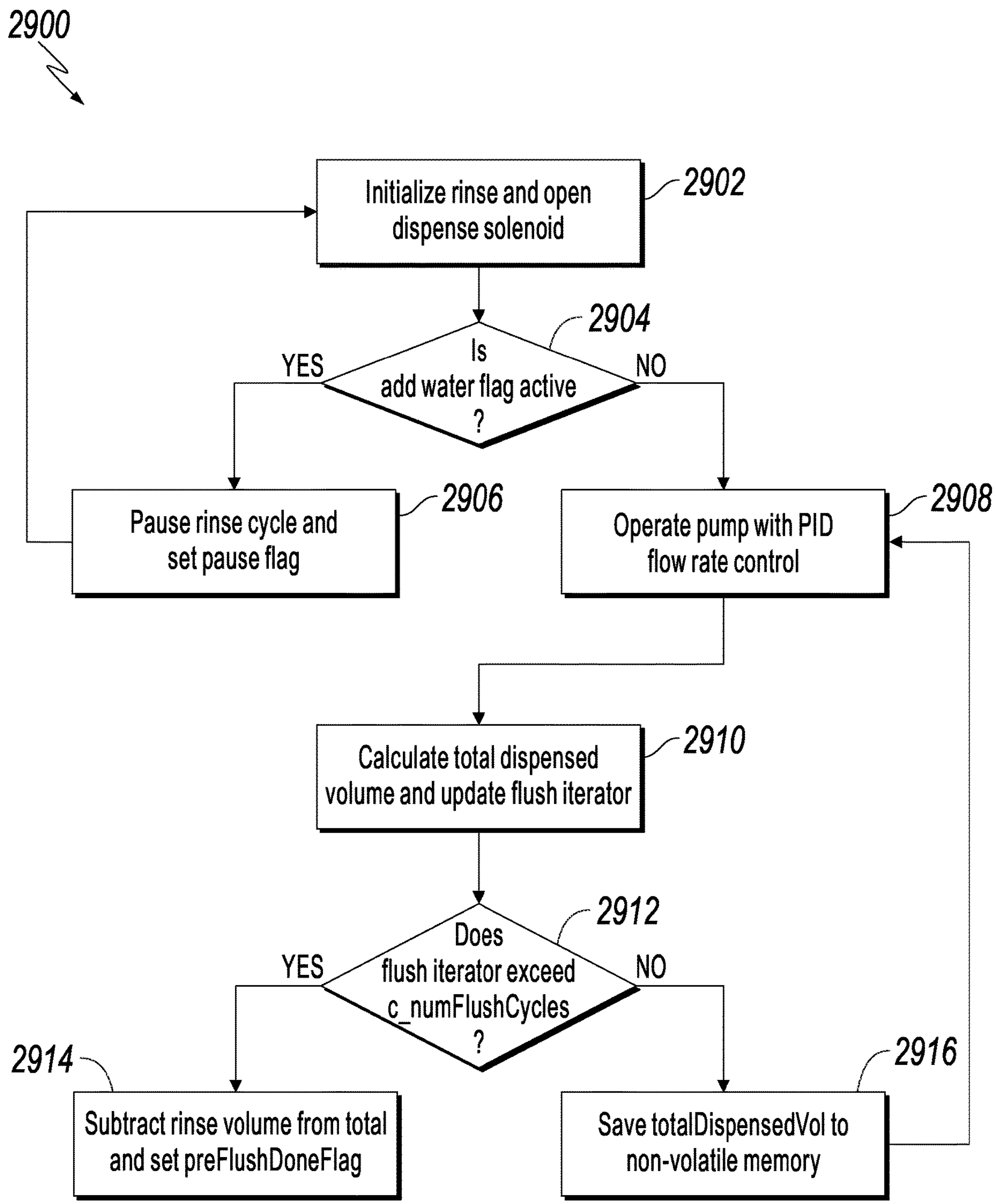
FIG. 36 is a flowchart illustrating an exemplary method for performing a rinse cycle for a beverage filtration system according to the systems and methods described herein.

Referring to FIG. 36, a method 2900 of performing a rinse cycle for a beverage filtration system is illustrated. The method 2900 can be implemented by a controller of any of the beverage devices described herein, for example, the controller 120 described with respect to FIG. 1. The rinse cycle can prepare a newly installed filter cartridge for normal operation by flushing a predetermined volume of fluid through the filter module to remove manufacturing residues, carbon fines, or other contaminants that may be present in a new filter medium. As described above, the beverage system can include a reservoir configured to hold a volume of fluid, a filter unit, a dispensing outlet, a user interface, a pump configured to pump the fluid from the reservoir through the filter unit to the dispensing outlet, and at least one flow meter configured to measure a flowrate of the fluid being pumped through the beverage system. The method 2900 is described in greater detail below with reference made to the system 2500 of FIG. 25.

In some aspects, the controller can be configured to initiate the rinse cycle responsive to a new filter being placed within the filter unit. The controller can determine that a filter has been placed within the filter unit based on data provided by a filter detection microswitch or other sensor configured to detect filter installation. In some aspects, the controller can provide a notification to the user interface prompting the user to confirm whether the filter is new. The controller can receive, via the user interface, a user input characterizing a confirmation that the filter is new, and can initiate the rinse cycle responsive to receipt of the user input. In some aspects, the controller can be configured to require the user to complete the rinse cycle before allowing normal dispensing operations when a new filter is installed, preventing the user from skipping the rinse after priming is complete.

At a step 2902, the controller can initialize the rinse cycle and open a dispense solenoid of the system (e.g., dispense solenoid 2516). Initializing the rinse cycle can include reading a total dispensed volume variable from non-volatile memory to determine whether a previous rinse cycle was interrupted and to resume from the correct point. Opening the dispense solenoid can establish a flow path from the filter module to the dispensing outlet, allowing fluid to be dispensed during the rinse operation.

At a step 2904, the controller can determine whether an add water flag is active. The add water flag can indicate that the fluid reservoir contains insufficient fluid to continue the rinse operation. If the add water flag is active, the method 2900 can proceed to a step 2906.

At the step 2906, the controller can pause the rinse cycle and set a pause flag. In some aspects, the controller can be configured to pause the rinse cycle responsive to determining that the user has removed the reservoir. The controller can provide a first notification to the user interface requesting the user to refill the reservoir responsive to pumping the volume of fluid from the reservoir. The pause flag can indicate to the system that the rinse cycle is temporarily suspended pending user action. In some aspects, the controller can be configured to receive, via the user interface, a user input characterizing a request to pause the rinse cycle, and can pause the rinse cycle responsive to receipt of the user input. Following the step 2906, the method 2900 can return to the step 2902 to reinitialize the rinse cycle once conditions permit resumption. In some aspects, the controller can be configured to receive, via the user interface, a user input characterizing a request to resume the rinse cycle, and can resume the rinse cycle responsive to receipt of the user input. In some aspects, the controller can be configured to automatically resume the rinse cycle responsive to determining that the user has placed the reservoir back within the beverage system.

In some aspects, the controller can be configured to implement a hold-to-rinse operation requiring the user to press and hold a dispense button during the rinse cycle. Releasing the dispense button can pause the rinse cycle, and re-engaging the button can resume the cycle. This hold-to-rinse interaction can provide the user with continuous control over the rinse operation.

If the add water flag is not active at the step 2904, the method 2900 can proceed to a step 2908. At the step 2908, the controller can operate the pump with PID flowrate control to drive fluid through the filter unit. The controller can receive, via the at least one flow meter, the flowrate of the fluid being pumped through the beverage system. The controller can compare the flowrate to a predetermined flowrate and can iteratively increase the duty of the pump until the flowrate is within a predetermined threshold of the predetermined flowrate. In some aspects, the predetermined flowrate can be about 1.5 to 3 liters per minute, for example, approximately 2500 milliliters per minute. In some aspects, the predetermined threshold can be plus or minus 75 milliliters per minute of the predetermined flowrate. In some aspects, the controller can be configured to modify the duty of the pump such that the flowrate does not exceed the predetermined flowrate.

In some aspects, the controller can be configured to implement a pump ramping function during the rinse cycle where the pump duty cycle starts slightly above a stall limit and gradually increases until reaching 100% duty cycle to determine an initial feedforward term. The pump ramping function can be executed when a flush iterator variable equals one, indicating the first rinse cycle iteration. During the ramping function, the controller can monitor the flowrate error at each duty cycle increment and can select the duty cycle that yields the minimum flowrate error as the initial PID feedforward term for subsequent rinse cycle iterations.

At a step 2910, the controller can calculate the total dispensed volume and update a flush iterator to track rinse cycle progress. The total dispensed volume can be calculated based on flow meter pulse counts multiplied by a flow meter coefficient that defines the volume per pulse. The flush iterator can be incremented each time a rinse cycle volume per cycle is dispensed. In some aspects, the rinse cycle volume per cycle can be between 70 and 80 ounces of fluid (e.g., 74 ounces of fluid) before prompting the user to refill the reservoir.

At a step 2912, the controller can determine whether the flush iterator exceeds a configurable number of flush cycles. The configurable number of flush cycles can define how many times the reservoir must be emptied and refilled to complete the rinse cycle. The controller can compare a total volume of fluid pumped from the reservoir to a predetermined volume. In some aspects, the predetermined volume can be between 70 and 80 ounces of fluid. The controller can repeat the steps of operating the pump to pump the volume of fluid from the reservoir, comparing the total volume of fluid pumped from the reservoir to the predetermined volume, and providing the first notification to the user interface requesting the user to refill the reservoir, until the total volume of fluid pumped from the reservoir is greater than or equal to the predetermined volume.

If the flush iterator exceeds the configurable number of flush cycles at the step 2912, the rinse cycle is complete and the method 2900 can proceed to a step 2914. At the step 2914, the controller can subtract the rinse volume from the total volume and set a pre-flush completion flag to indicate completion of the rinse cycle. The controller can be configured to subtract the rinse cycle volume from the total dispensed volume so that the rinse cycle does not affect filter life calculations. This subtraction can ensure that the volume of fluid dispensed during the rinse cycle is not counted toward the filter life tracking, as the rinse cycle fluid is not consumed by users and should not reduce the reported remaining filter capacity. The controller can provide a second notification to the user interface indicating that the rinse cycle is complete.

If the flush iterator does not exceed the configurable number of flush cycles at the step 2912, the method 2900 can proceed to a step 2916. At the step 2916, the controller can save the total dispense volume to non-volatile memory to preserve rinse cycle progress across power cycles. The controller can be configured to save dispensing progress data to non-volatile memory during the rinse cycle so that the rinse cycle can resume from the correct point after a power cycle. This non-volatile storage can ensure that if power is interrupted during the rinse cycle, the controller can read the stored total dispensed volume upon restart and continue the rinse cycle from where it was interrupted rather than restarting from the beginning. Following the step 2916, the method 2900 can return to the step 2908 to continue pump operation with PID flowrate control for the next rinse iteration.

Figure 37:
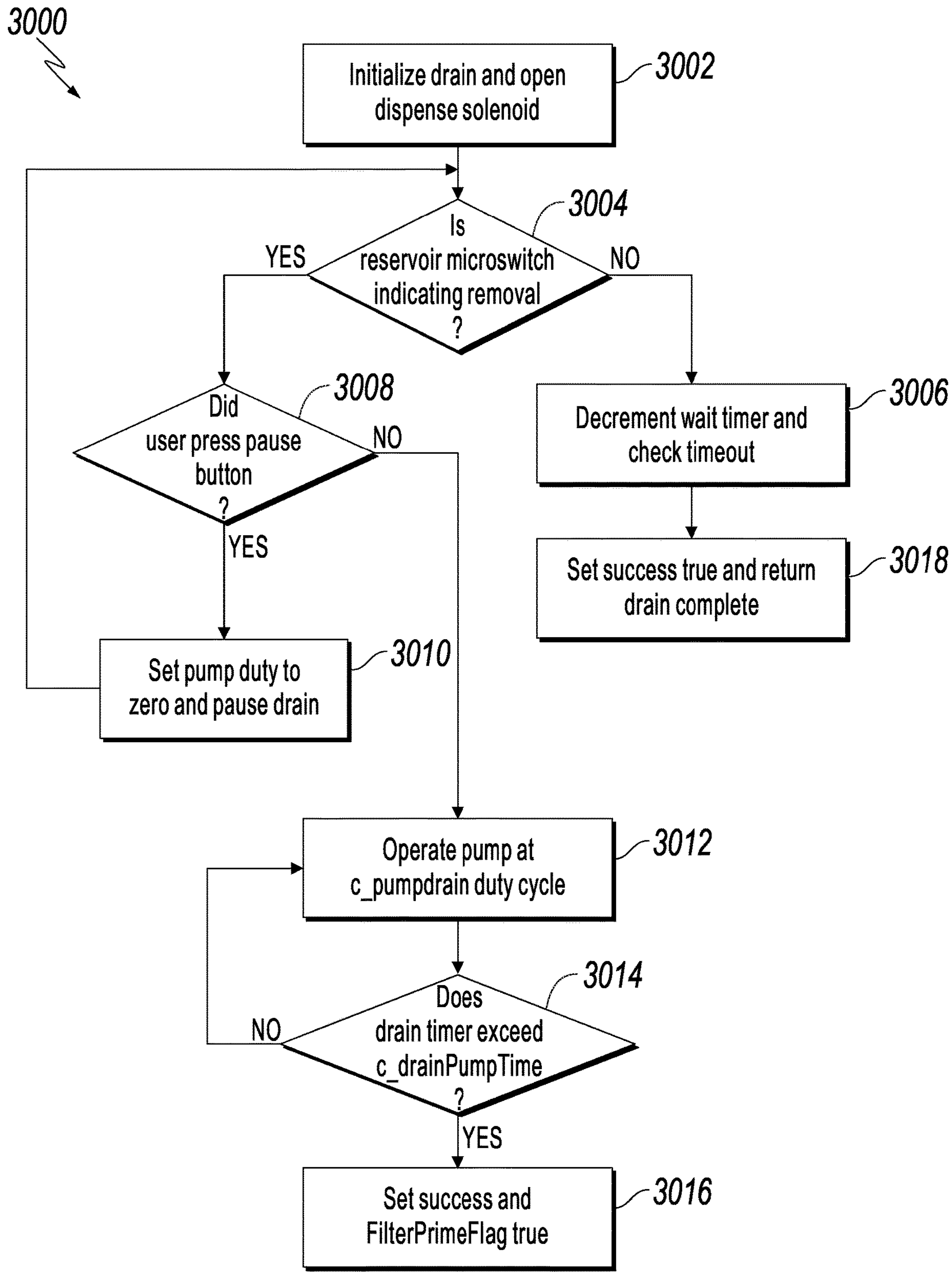
FIG. 37 is a flowchart illustrating an exemplary method for performing a drain cycle for a beverage filtration system according to the systems and methods described herein.

Referring to FIG. 37, a method 3000 of performing a drain cycle for a beverage filtration system is illustrated. The method 3000 can be implemented by a controller of any of the beverage devices described herein, for example, the controller 120 described with respect to FIG. 1. As described above, the beverage system can include a reservoir configured to hold a volume of fluid, a filter unit, a dispensing outlet, a user interface, and a pump configured to pump the fluid from the reservoir through the filter unit to the dispensing outlet. The controller can include at least one processor and a memory storing instructions which, when executed by the at least one processor, cause the at least one processor to perform operations of the method 3000. The drain cycle can remove excess fluid from the filter unit prior to filter replacement, allowing users to change the filter cartridge without spillage. The method 3000 is described in greater detail below with reference made to the system 2500 of FIG. 25.

In some aspects, the controller can be configured to determine that a filter within the filter unit needs to be replaced based on filter life tracking data. The controller can provide a notification to the user interface requesting the user to remove the reservoir prior to running the drain cycle. This notification can prompt the user to detach the reservoir from the beverage system before initiating the drain operation to prevent fluid from being drawn from the reservoir during draining.

At a step 3002, the controller can initialize the drain cycle and open a dispense solenoid of the system (e.g., dispense solenoid 2516). The controller can receive, via the user interface, a user input characterizing a request to run a drain cycle. Opening the dispense solenoid can establish a flow path from the filter module to the dispensing outlet, allowing excess fluid retained in the filter module to be pumped out during the drain operation.

At a step 3004, the controller can determine whether a reservoir microswitch indicates that the reservoir has been removed. The reservoir microswitch can detect whether the reservoir is present and properly installed in the beverage system. If the reservoir microswitch indicates that the reservoir has not been removed, the method 3000 can proceed to a step 3006.

At the step 3006, the controller can decrement a wait timer and perform a timeout check. The wait timer can track elapsed time while waiting for the user to remove the reservoir. If the wait timer reaches zero without the reservoir being removed, the drain cycle can timeout. In some aspects, the reservoir wait time can be approximately 300 seconds, however, longer or shorter wait times are also contemplated herein. If the reservoir has not been removed within the reservoir wait time, the controller can cancel the drain operation and provide a notification indicating that the drain cycle was canceled. If the drain cycle times out before completion, the filter prime flag may not be set, and the controller can provide an appropriate notification indicating that the drain operation did not complete successfully. In some aspects, the controller can provide a notification to the user interface indicating that the drain cycle is complete.

If the reservoir microswitch indicates that the reservoir has been removed at the step 3004, the method 3000 can proceed to a step 3008. At the step 3008, the controller can determine whether the user pressed a pause button. The controller can be configured to implement a pause function during the drain cycle that allows the user to pause and resume the drain operation by pressing a button on the user interface. If the user pressed the pause button, the method 3000 can proceed to a step 3010.

At the step 3010, the controller can set the pump duty to zero and pause the drain cycle. Pausing the drain cycle can temporarily suspend pump operation while maintaining the current drain progress. Following the step 3010, the method 3000 can return to the step 3004 to continue checking the reservoir microswitch status. The user can resume the drain cycle by pressing the button again, at which point the controller can continue the drain operation from where it was paused.

If the user did not press the pause button at the step 3008, the method 3000 can proceed to a step 3012. At the step 3012, the controller can operate the pump at a configurable drain pump duty cycle to pump excess fluid from the filter unit to the dispensing outlet. The drain cycle is time-based with configurable pump time and idle time parameters rather than being based solely on volume or flowrate, as discussed below. The controller can operate the pump for a predetermined amount of time to pump excess fluid from the filter unit to the dispensing outlet. In some aspects, the configurable drain pump duty cycle can be set to approximately 70% duty cycle, though other duty cycle values are also contemplated. In some aspects, the method can further include step prior to step 3012, wherein, responsive to determining that the reservoir has been removed from the beverage system based on the reservoir microswitch signal, the controller can wait to start operation of the pump at 3012 until after a second predetermined period of time elapses since the reservoir was removed. In some aspects, this second predetermined period of time can be referred to as the drain idle time and can be approximately 5 seconds, however, other drain idle times are also contemplated herein.

In some aspects, the beverage system can further include at least one flow meter configured to measure a flowrate of the fluid being pumped through the beverage system. The controller can be configured to receive, via the at least one flow meter, the flowrate of the fluid being pumped through the beverage system during the drain cycle. In some aspects, the predetermined amount of time can be set based on the flowrate.

At a step 3014, the controller can determine whether a drain timer exceeds a configurable drain pump time parameter. The configurable drain pump time parameter can define how long the pump operates during the drain cycle. If the drain timer exceeds the configurable drain pump time parameter, the controller can stop operation of the pump and the method 3000 can proceed to a step 3016. In some aspects, the drain pump time can be approximately 8 seconds, however, other pump times are also contemplated herein. In some aspects, as described above, the systems described herein can further include a user interface. In this case, the method 3000 can further include an optional step (not shown) whereby the controller calculates a progress value for the drain cycle and provides the progress value to the user interface for display. In some aspects, the progress value for the drain cycle can be calculated based on a ratio of the drain pump time (e.g., 8 seconds) to a sum of the drain pump time (e.g., 8 seconds) and the aforementioned drain idle time (e.g., 5 seconds). Accordingly, in some aspects, the progress value can be based on a total drain cycle time of approximately 13 seconds, however, other drain cycle times are also contemplated herein.

At the step 3016, the controller can set a success flag and a filter prime flag to true. The controller can be configured to set the filter prime flag to true when the drain cycle completes without timeout, triggering a filter prime sequence after draining. Setting the filter prime flag to true can cause the controller to initiate a filter priming operation after the user installs a new filter cartridge, preparing the new filter for normal operation. In some aspects, the controller can also be configured to set a recirculation request flag to true upon completion of the drain cycle, triggering a post-drain recirculation operation to relieve pressure within the fluid pathway.

In some aspects, the controller can be configured to calculate and display a progress bar during the drain cycle based on the drain timer relative to the sum of a drain idle time and a drain pump time. In some aspects, the drain idle time can be approximately 5 seconds. The progress bar can be displayed on the user interface to inform users of the drain operation status.

In some aspects, the controller can be configured to implement a delay between opening the dispense solenoid and operating the pump during the drain cycle to prevent pressure buildup in the system. The controller can wait for a configurable pump delay period after the dispense solenoid is opened before initiating pump operation. This solenoid delay period can allow the fluid pathway to stabilize and can prevent pressure spikes that could cause leaks or affect system performance. In some aspects, the configurable pump delay period can be stored as a system parameter in memory, allowing the delay duration to be adjusted based on system characteristics or operational requirements.

If the drain timer does not exceed the configurable drain pump time parameter at the step 3014, the method 3000 can return to the step 3012 to continue operating the pump at the configurable drain pump duty cycle. The controller can continue operating the pump until the predetermined amount of time has elapsed.

In some aspects, the controller can be configured to determine that the predetermined amount of time has elapsed, stop operation of the pump, and provide a notification to the user interface indicating that the drain cycle is complete. The notification can inform the user that the filter module has been drained and that the filter cartridge can be safely removed and replaced. For example, in some aspects, the notification can display information to the user such as "please remove filter" or the like.

The controller of the beverage system can be configured to implement a pump duty cycle control algorithm for controlling the pump during dispensing operations. The overall goal of the pump duty cycle control algorithm can be to iteratively control the pump duty to achieve an optimal filter contact time of the fluid during filtering. The filter contact time refers to the duration that each molecule of fluid remains in contact with the filter medium as the fluid passes through the filter module. Because the filter contact time is a function of the flowrate of fluid through the filter medium, the controller can regulate the flowrate through the filter module by adjusting the pump duty to achieve a desired contact time. Adequate contact time can allow the filter medium to effectively capture and remove contaminants from the fluid. In some aspects, the optimal filter contact time can be between 4 and 5 seconds, though the optimal contact time can vary based on the size and type of the filter, the characteristics of the filter medium, and the types of contaminants being removed.

Figure 38:
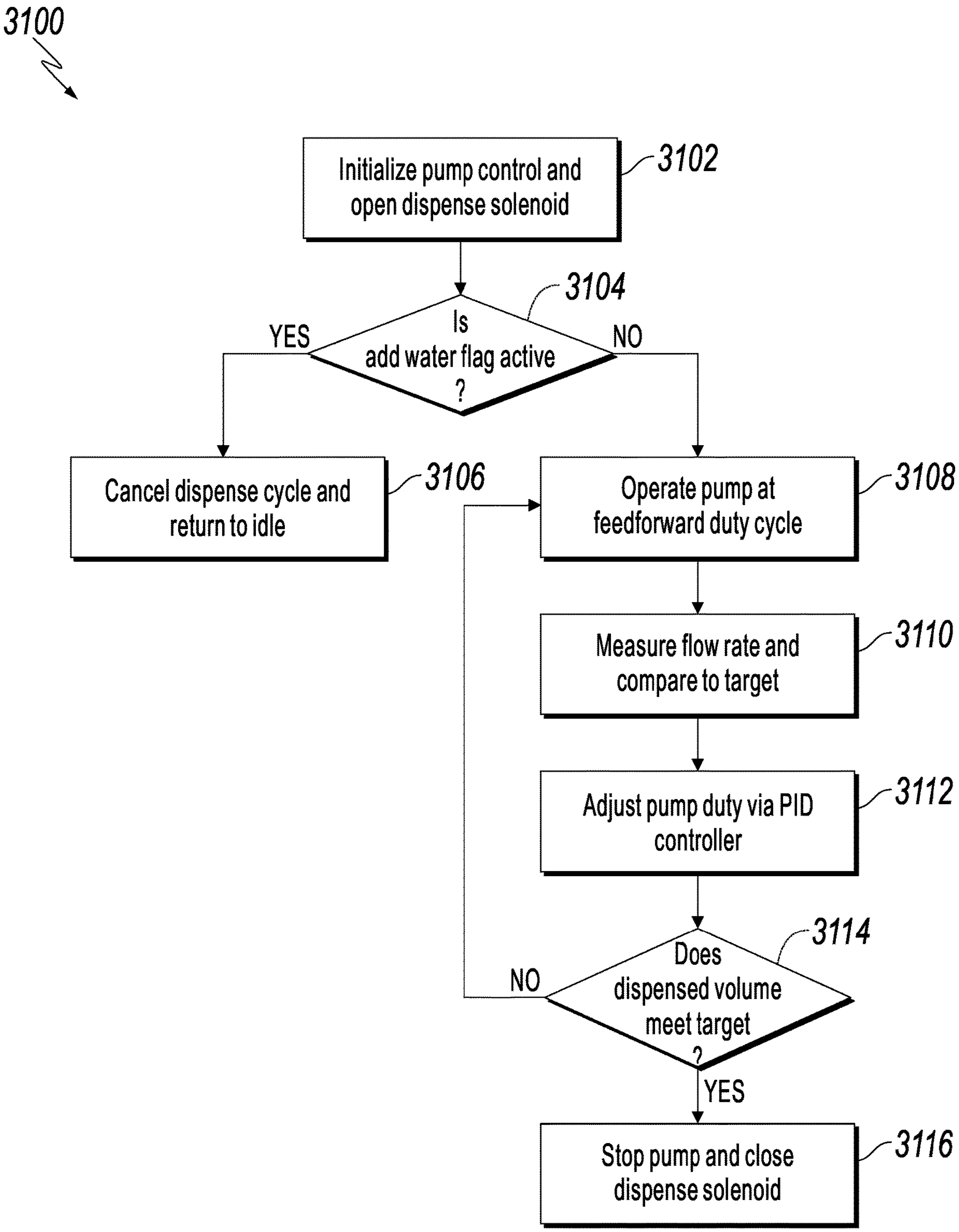
FIG. 38 is a flowchart illustrating an exemplary method of controlling a pump of a beverage filtration system according to the systems and methods described herein.

Referring to FIG. 38, a method 3100 of pump control during beverage dispensing with flowrate feedback control is illustrated. The method 3100 can be implemented by a controller of any of the beverage devices described herein, for example, the controller 120 described with respect to FIG. 1. As described above, the beverage system can include a reservoir configured to hold a fluid, a filter unit, a dispensing outlet, a user interface configured to receive a user input characterizing a request to dispense a filtered beverage, a pump configured to pump the fluid from the reservoir through the filter unit to the dispensing outlet, and at least one flow meter configured to measure a flowrate of the fluid being pumped through the beverage system. The controller can include at least one processor and a memory storing instructions which, when executed by the at least one processor, cause the at least one processor to perform operations of the method 3100. The method 3100 is described in greater detail below with reference made to the system 2500 of FIG. 25.

At a step 3102, the controller can receive, via the user interface, the request to dispense the filtered beverage. The controller can initialize pump control parameters and open a dispense solenoid of the system (e.g., dispense solenoid 2516). Opening the dispense solenoid can establish a flow path from the filter module to the dispensing outlet, allowing filtered fluid to be dispensed during the pump control operation.

At a step 3104, the controller can determine whether an add water flag is active. The add water flag can indicate that the fluid reservoir contains insufficient fluid to continue the dispensing operation. If the add water flag is active, the method 3100 can proceed to a step 3106.

At the step 3106, the controller can cancel the dispense cycle and return to idle. The controller can be configured to cancel the dispense operation when an add water error is detected, regardless of whether the dispense is manual or preset. This cancellation behavior can ensure that the pump does not continue operating when insufficient fluid is available in the reservoir, which could cause pump damage or introduce air into the fluid pathway.

If the add water flag is not active at the step 3104, the method 3100 can proceed to a step 3108. At the step 3108, the controller can operate the pump at a first duty to pump the fluid from the reservoir, through the filter unit, to the dispensing outlet. The first duty can be a feedforward duty cycle that provides an initial pump power level based on historical operating conditions. The memory can be configured to store historical data characterizing previous dispensing operations, and the first duty can be determined based on a function of one or more duties of the pump during one or more of the previous dispensing operations. In some aspects, the previous dispensing operations can include one or more filtered beverage dispensing operations or one or more rinse cycle dispensing operations. In some aspects, the first duty can be determined based on an average of one or more duties of the pump during one or more of the previous dispensing operations. In some aspects, the first duty can be determined based on a ratio of one or more duties of the pump during one or more of the previous dispensing operations. The ratio can be a learning rate parameter that controls the rate at which the feedforward term is adjusted based on observed performance. The learning rate parameter can define the proportion of the current pump duty value that is incorporated into the updated feedforward term, with the remaining proportion being retained from the previous feedforward term value. For example, with a learning rate of 70%, the updated feedforward term can be calculated as 0.7 times the current pump duty plus 0.3 times the previous feedforward term. In this manner, the ratio defines how the duties from previous dispensing operations are weighted relative to the current pump duty when calculating the updated feedforward term for subsequent dispensing operations. In some aspects, the first duty can be determined based on a duty of the pump during an immediately preceding dispensing operation.

The controller can be configured to use an adaptive feedforward term in the pump control that is updated based on steady-state error conditions. The feedforward term can be learned and updated once every dispense cycle when the error is under a threshold for a specified steady state time. In some aspects, the specified steady state time can be approximately 1000 milliseconds, though other values are also contemplated. This adaptive feedforward approach can allow the controller to learn the appropriate pump duty cycle for achieving the target flowrate based on actual system performance, accounting for variations in filter resistance, fluid viscosity, and other factors that may affect flowrate.

At a step 3110, the controller can receive, via the at least one flow meter, the flowrate of the fluid being pumped through the beverage system. The controller can compare the flowrate to a predetermined flowrate. In some aspects, the predetermined flowrate can be about 1.5 to 3 liters per minute, for example, approximately 2600 milliliters per minute for high flowrate dispensing or approximately 1500 milliliters per minute for low flowrate dispensing. In some aspects, the filter unit can comprise a filter cartridge including a paper filter medium configured to remove contaminants from the fluid flowing therethrough, and the predetermined flowrate can be a flowrate at which each molecule of the fluid remains in contact with the paper filter medium for between 4 and 5 seconds.

In some aspects, the controller can be configured to bias toward a lower pump duty as opposed to overshooting the target flowrate. By limiting the maximum flowrate to the predetermined flowrate, the controller can ensure that fluid passes through the filter medium at a rate that provides adequate contact time for effective filtration. If the measured flowrate exceeds the predetermined flowrate, the controller can reduce the pump duty cycle to bring the flowrate back within the acceptable range.

At a step 3112, the controller can adjust the pump duty via a PID controller based on the comparison between the measured flowrate and the predetermined flowrate. The controller can operate the pump at a second duty, greater than the first duty, responsive to determining that the flowrate is less than the predetermined flowrate. The controller can be configured to repeat the steps of receiving the flowrate of the fluid and comparing the flowrate to the predetermined flowrate, and to iteratively increase the duty of the pump until the flowrate is within a predetermined threshold of the predetermined flowrate. In some aspects, the predetermined threshold can be plus or minus 75 milliliters per minute of the predetermined flowrate. In some aspects, the controller can be configured to modify the duty of the pump such that the flowrate does not exceed the predetermined flowrate.

In some aspects, the controller can be configured to provide a clog warning to the user interface responsive to determining that the flowrate is below a second predetermined flowrate. The second predetermined flowrate can be a flowrate threshold that indicates the filter module may be becoming clogged with contaminants. In some aspects, the second predetermined flowrate can be approximately 1500 milliliters per minute for a clog warning condition, though other values are also contemplated. In some aspects, the controller can be configured to detect filter clog conditions based on multiple parameters to provide comprehensive monitoring of filter performance. The controller can monitor both the flowrate of fluid passing through the filter module and the electrical current drawn by the pump during operation to determine various clogging conditions. The various clogging conditions can include a clog warning and a clog error. A clog warning can indicate that the filter is experiencing reduced flow capacity due to partial clogging or sediment accumulation, but the filter remains functional and does not yet require replacement. A clog error can indicate that the filter has reached a level of clogging severe enough that the filter has reached its end of life and should be replaced to restore proper filtration performance. A clog warning flow limit (e.g., approximately 1500 ml/min) can define a first threshold below which the controller determines that the filter is experiencing reduced flow capacity warranting a clog warning notification. A filter clogged flow limit can define a second threshold below which the controller determines that the filter has reached a level of clogging that requires replacement. The filter clogged flow limit can be lower than the clog warning flow limit, such that the clog warning provides an early indication of degrading filter performance before the filter reaches the end-of-life condition. A clog current limit (e.g., approximately 700 mA) can define a threshold for pump current above which the controller determines that the pump is working harder than expected to drive fluid through the filter. The controller can implement debounce logic for filter clog detection to prevent spurious notifications caused by momentary fluctuations in flowrate or pump current. An error debounce parameter (e.g., approximately 20) can define a number of consecutive measurement cycles during which the clog conditions are satisfied before the controller generates a notification. The controller can track clog warning and clog error events by incrementing counter variables stored in non-volatile memory.

In some aspects, the controller can be configured to detect pump stall conditions based on pump current measurements obtained during operation of the pump. A flowrate stall limit (e.g., approximately 400 ml/min) can define a threshold below which the system detects a stall condition. The controller can implement a stall debounce counter (e.g., approximately 16) to prevent false stall detections caused by momentary fluctuations in pump current or flowrate.

In some aspects, the controller can be configured to detect low water conditions using a software-based approach that evaluates multiple parameters rather than relying solely on a float switch or other dedicated fluid level sensor. A no-water pump current threshold (e.g., approximately 500 mA) can define a pump current value below which the controller determines that the pump is operating without fluid. A no-flow water limit (e.g., approximately 200 ml/min) can define a flowrate value below which the controller determines that fluid is not flowing through the system despite pump operation. The controller can evaluate the pump duty, the pump current value, and the flowrate measurements together to make a determination regarding water availability. When the pump is operating at a duty cycle that would normally produce fluid flow, but the measured pump current is below the no-water pump current threshold and the measured flowrate is below the no-flow water limit, the controller can determine that an add-water condition exists. In response to detecting an add-water condition, the controller can set an add-water flag, pause the current operation, and provide a notification via the user interface requesting the user to refill the reservoir. The software-based water detection approach can provide an additional check even when a float switch indicates that water is present in the reservoir, addressing situations where the float switch has become stuck or is providing incorrect readings.

The controller can be configured to calculate dispensed volume based on flow meter pulse count rather than flowrate measurements for improved accuracy. The flow meter can generate pulses as fluid passes through the flow meter, with each pulse corresponding to a known volume of fluid. The controller can multiply the elapsed pulse count by a flow meter coefficient that defines the volume per pulse to determine the total dispensed volume. In some aspects, the flow meter coefficient can be approximately 1.07 milliliters per pulse, though other coefficient values are also contemplated based on the specific flow meter characteristics.

In some aspects, the controller can be configured to calculate flowrate using a filter that averages a number of previous flowrate measurements (e.g., the last 5 flowrate measurements). By maintaining a buffer of recent flowrate measurements and computing an average value from the buffered measurements, the controller can reduce noise and transient fluctuations in the flowrate signal, providing a more stable flowrate value for use in the PID control algorithm. The controller can also implement an exponential moving average filter for flowrate calculations, using an alpha coefficient that determines the weighting applied to new measurements relative to previous filtered values. For example, with an alpha coefficient of 0.8, each new flowrate measurement can contribute 80% of the weight to the filtered output, while the previous filtered value contributes 20% of the weight.

At a step 3114, the controller can determine whether the dispensed volume meets a target volume. The target volume can be a preset dispense size selected by the user via the user interface, such as 8 ounces, 16 ounces, or 1 liter. If the dispensed volume meets the target volume, the method 3100 can proceed to a step 3116.

At the step 3116, the controller can stop the pump and close the dispense solenoid. In some aspects, the controller can be configured to implement a delay between stopping the pump and closing the dispense solenoid to prevent pressure buildup in the system. Following the step 3116, the controller can open the recirculation solenoid to relieve pressure within the fluid pathway, as described above with respect to the pressure relief operations.

If the dispensed volume does not meet the target volume at the step 3114, the method 3100 can return to the step 3108 to continue operating the pump at the feedforward duty cycle and iteratively adjusting the pump duty until the target dispensed volume is reached.

Figure 39:
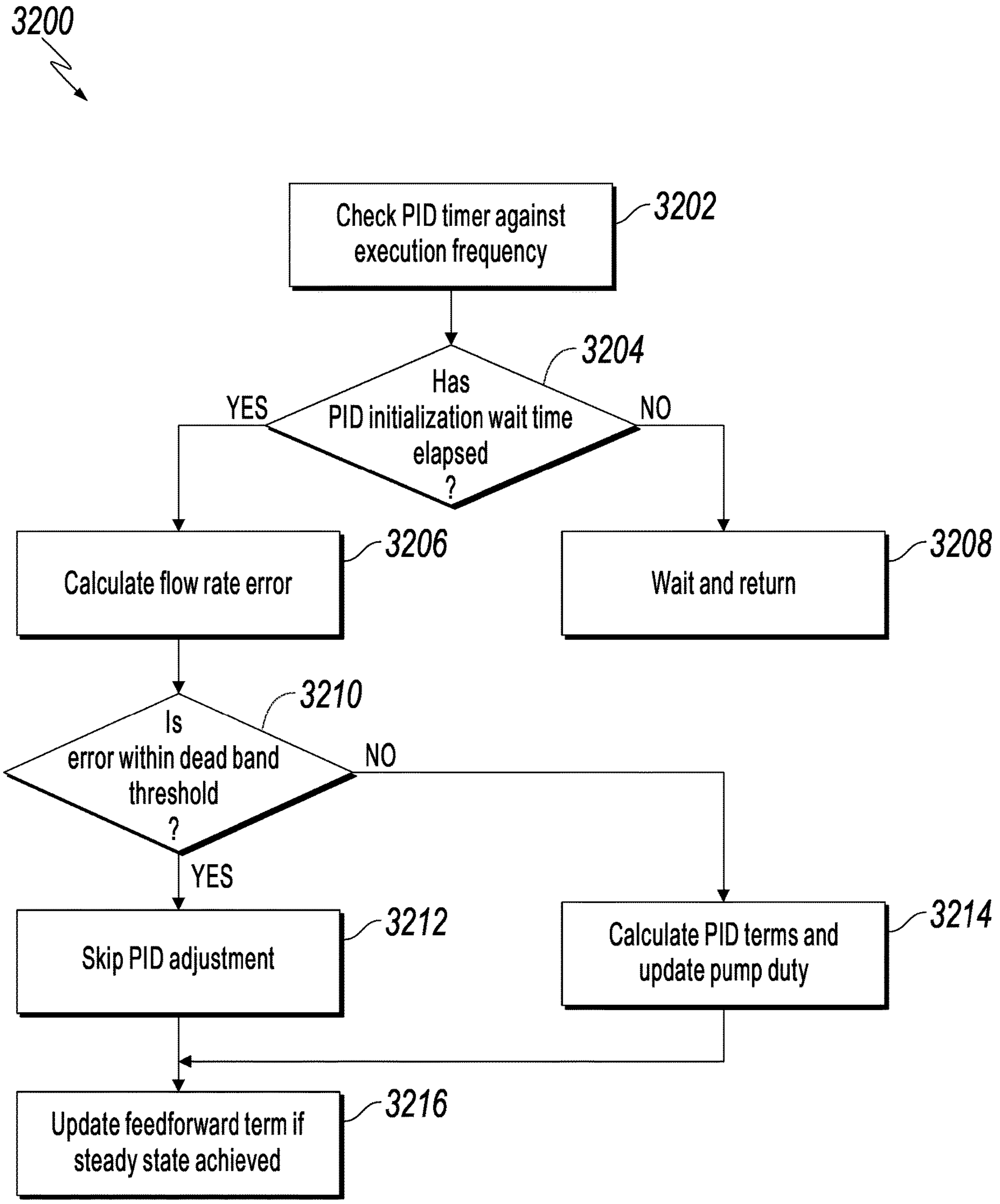
FIG. 39 is a flowchart illustrating an exemplary method for performing PID-based pump duty control in a beverage filtration system according to the systems and methods described herein.

Referring to FIG. 39, a method 3200 of PID-based pump duty control in a beverage system is illustrated. The method 3200 can be implemented by the controller of any of the beverage devices described herein, for example, the controller 120 described with respect to FIG. 1. The method 3200 can provide closed-loop control of the pump duty cycle based on flowrate feedback to maintain a target flowrate during dispensing operations. The method 3200 is described in greater detail below with reference made to the system 2500 of FIG. 25.

The controller can be configured to implement a PID (Proportional-Integral-Derivative) control algorithm for controlling the pump duty cycle. The PID control can include a proportional gain (Kp) term, an integral gain (Ki) term, and a derivative gain (Kd) term to adjust pump operation based on flowrate error. In some aspects, the proportional gain can be set to approximately 0.03, the integral gain can be set to approximately 0.0001, and the derivative gain can be set to approximately 0.0, though other gain values are also contemplated. The controller can be configured to execute the PID control algorithm at a configurable frequency defined by a PID execution frequency parameter. In some aspects, the PID execution frequency parameter can be set to a value such as 3, indicating that the PID control executes once every three iterations of the main control loop.

At a step 3202, the controller can check a PID timer against the PID execution frequency parameter. The PID timer can track elapsed time since the last PID calculation. If the PID timer has not reached the PID execution frequency parameter, the controller can skip the PID calculation for the current iteration and return. If the PID timer has reached the PID execution frequency parameter, the method 3200 can proceed to a step 3204.

At the step 3204, the controller can determine whether a PID initialization wait time has elapsed. The PID initialization wait time can define a delay period after the feedforward term executes before the PID controller begins making adjustments. The controller can be configured to implement a PID catch-up timer that waits for a specified time after the feedforward term executes before resuming PID adjustments to allow the flowrate to stabilize. In some aspects, the PID initialization wait time can be set to approximately 2000 milliseconds, though other values are also contemplated. This wait period can allow the flowrate to increase and stabilize in response to the feedforward term before the PID controller begins making corrections.

If the PID initialization wait time has not elapsed at the step 3204, the method 3200 can proceed to a step 3208. At the step 3208, the controller can wait and return without making PID adjustments. The controller can continue monitoring the PID timer and checking the PID initialization wait time until the wait period has elapsed.

If the PID initialization wait time has elapsed at the step 3204, the method 3200 can proceed to a step 3206. At the step 3206, the controller can calculate a flowrate error. The flowrate error can be calculated as a difference between the target flowrate and the measured flowrate received from the flow meter. The flowrate error can be positive when the measured flowrate is below the target flowrate and negative when the measured flowrate exceeds the target flowrate.

At a step 3210, the controller can determine whether the flowrate error is within a dead band threshold. The controller can be configured to implement a dead zone in the PID control where, when the flowrate error is below the threshold, the PID controller does not make adjustments to the pump duty cycle. In some aspects, the dead band threshold can be set to approximately 75 milliliters per minute, though other threshold values are also contemplated. The dead zone can prevent the PID controller from making unnecessary adjustments when the flowrate is sufficiently close to the target flowrate, reducing pump duty cycle oscillations and improving system stability.

If the flowrate error is within the dead band threshold at the step 3210, the method 3200 can proceed to a step 3212. At the step 3212, the controller can skip the PID adjustment. The controller can maintain the current pump duty cycle without modification when the flowrate error is within the dead zone.

If the flowrate error is not within the dead band threshold at the step 3210, the method 3200 can proceed to a step 3214. At the step 3214, the controller can calculate PID terms and update the pump duty. The controller can calculate the proportional term by multiplying the flowrate error by the proportional gain (Kp). The controller can calculate the integral term by accumulating the flowrate error over time and multiplying by the integral gain (Ki). In some aspects, the integral term can be bounded by minimum and maximum values to prevent integral windup. The controller can calculate the derivative term by determining the rate of change of the flowrate error and multiplying by the derivative gain (Kd). The controller can sum the proportional term, the integral term, and the derivative term to determine a PID adjustment value, and can add the PID adjustment value to the current pump duty cycle to determine an updated pump duty cycle.

The controller can be configured to adjust the proportional gain (Kp) value of the PID controller based on the measured flowrate during pump operation. In some aspects, the controller can increase the proportional gain when the measured flowrate is significantly below the target flowrate to provide more aggressive correction, and can decrease the proportional gain when the measured flowrate approaches the target flowrate to provide finer control and reduce overshoot.

This adaptive proportional gain adjustment can improve the responsiveness of the PID controller across different operating conditions.

From both the step 3212 and the step 3214, the method 3200 can proceed to a step 3216. At the step 3216, the controller can update the feedforward term if steady state has been achieved. The controller can determine that steady state has been achieved when the flowrate error remains below the dead band threshold for a specified steady state time. In some aspects, the specified steady state time can be approximately 1000 milliseconds, though other values are also contemplated. When steady state is achieved, the controller can update the feedforward term based on the current pump duty cycle, storing the updated feedforward term in non-volatile memory for use in subsequent dispensing operations. This adaptive feedforward update can allow the controller to learn the appropriate pump duty cycle for achieving the target flowrate based on actual system performance.

In some aspects, a feedforward term learning rate parameter (e.g., approximately 70%) can control the rate at which the feedforward term is adjusted based on observed performance. The learning rate parameter can define the proportion of the current pump duty value that is incorporated into the updated feedforward term, with the remaining proportion being retained from the previous feedforward term value.

Figure 40:
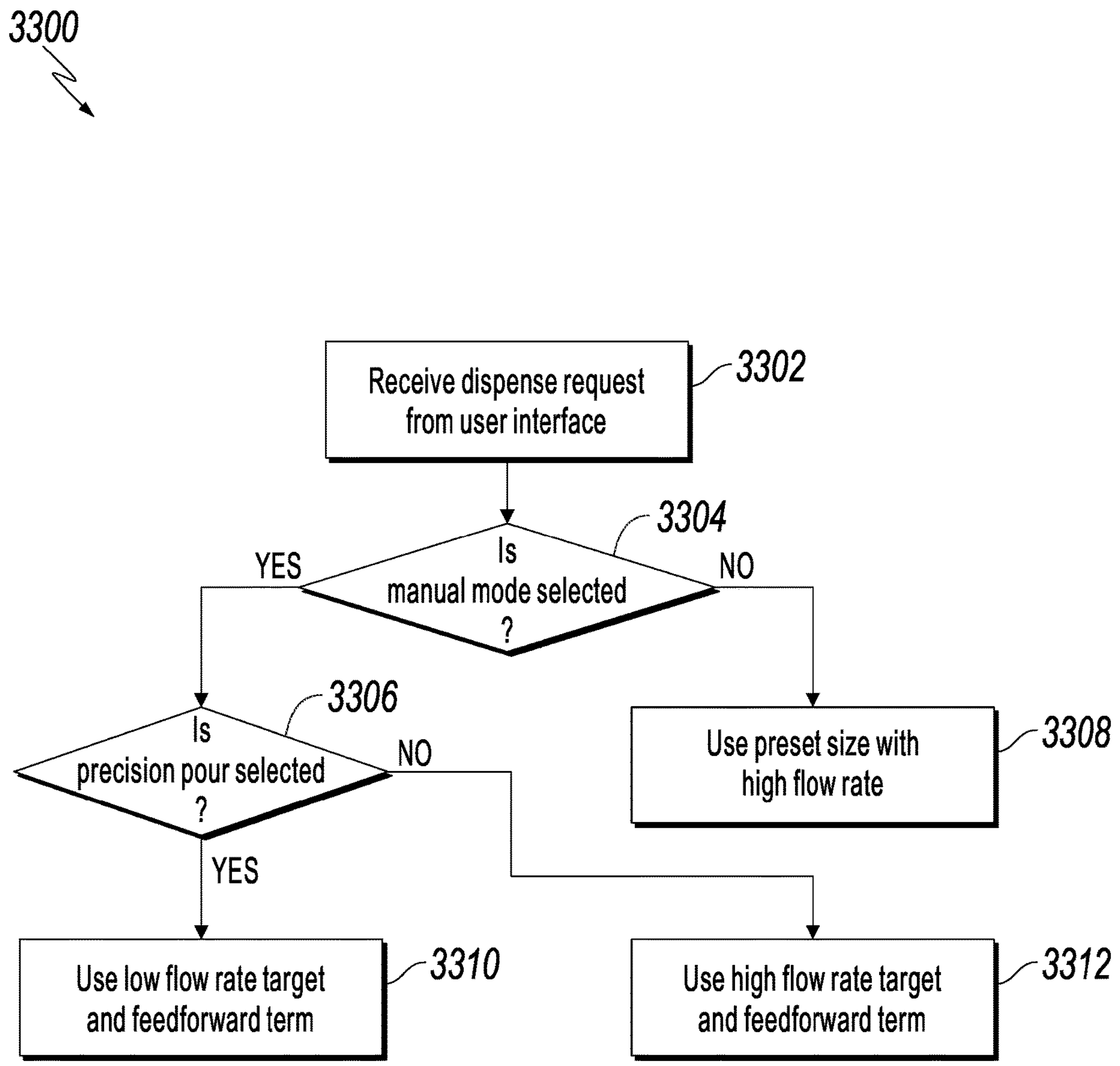
FIG. 40 is a flowchart illustrating an exemplary method for handling dispense requests with manual mode and precision pour options according to the systems and methods described herein.

Referring to FIG. 40, a method 3300 of handling dispense requests with manual mode and precision pour options in a beverage system is illustrated. The method 3300 can be implemented by the controller of any of the beverage devices described herein, for example, the controller 120 described with respect to FIG. 1. The method 3300 can determine appropriate target flowrates and feedforward terms based on user-selected dispensing modes. The method 3300 is described in greater detail below with reference made to the system 2500 of FIG. 25.

The controller can be configured to store and use different feedforward terms for high flowrate dispensing and low flowrate dispensing modes. Each feedforward term can be separately learned and updated based on the operating conditions encountered during the respective dispensing mode. In some aspects, the controller can store a high flowrate feedforward term in non-volatile memory for use during high flowrate dispensing operations and can store a low flowrate feedforward term in non-volatile memory for use during low flowrate dispensing operations. The high flowrate feedforward term can be set to an initial value such as 70% duty cycle, and the low flowrate feedforward term can be set to an initial value such as 40% duty cycle, though other initial values are also contemplated.

At a step 3302, the controller can receive a dispense request from the user interface. The dispense request can characterize a user input indicating that the user wishes to dispense filtered fluid from the beverage system. The dispense request can be received responsive to the user pressing a dispense button on the user interface or interacting with another control element configured to initiate dispensing.

At a step 3304, the controller can determine whether manual mode is selected. Manual mode can allow the user to dispense fluid continuously while a dispense button is engaged rather than dispensing a predetermined volume. The controller can determine whether manual mode is selected based on a manual flag variable that is set by the user interface responsive to user input. If manual mode is not selected at the step 3304, the method 3300 can proceed to a step 3308.

At the step 3308, the controller can use a preset size with high flowrate for the dispensing operation. When the user selects a preset dispense size such as 8 ounces, 16 ounces, or 1 liter, the controller can be configured to use the high flowrate target and the high flowrate feedforward term for the dispensing operation. In some aspects, the high flowrate target can be approximately 2600 milliliters per minute, though other target values are also contemplated. Using the high flowrate for preset size dispensing can reduce the time required to dispense the selected volume.

If manual mode is selected at the step 3304, the method 3300 can proceed to a step 3306. At the step 3306, the controller can determine whether precision pour is selected. The controller can be configured to implement a precision pour mode with a lower target flowrate for more accurate dispensing of preset volumes. Precision pour mode can provide finer control over the dispensed volume by reducing the flowrate, which can allow the controller to stop dispensing more precisely when the target volume is reached. The controller can determine whether precision pour is selected based on a dispense speed control flag that is set by the user interface responsive to user input. In some aspects, the dispense speed control flag can be set to a value of zero to indicate precision pour mode and can be set to a value of one to indicate high flowrate mode.

If precision pour is selected at the step 3306, the method 3300 can proceed to a step 3310. At the step 3310, the controller can use a low flowrate target and the low flowrate feedforward term for the dispensing operation. In some aspects, the low flowrate target can be approximately 1500 milliliters per minute, though other target values are also contemplated. The low flowrate feedforward term can provide an initial pump duty cycle that is appropriate for achieving the lower target flowrate. Using the low flowrate target and feedforward term during precision pour mode can enable more accurate dispensing by providing finer control over the flow of fluid through the beverage system.

If precision pour is not selected at the step 3306, the method 3300 can proceed to a step 3312. At the step 3312, the controller can use a high flowrate target and the high flowrate feedforward term for the dispensing operation. When the user selects manual mode without precision pour, the controller can use the high flowrate settings to provide faster fluid delivery during the manual dispensing operation.

In some aspects, the controller can be configured to update the feedforward term for the selected dispensing mode at the end of each dispense cycle when steady state conditions are achieved. The controller can update the high flowrate feedforward term when dispensing in high flowrate mode and can update the low flowrate feedforward term when dispensing in low flowrate mode. This separate updating of feedforward terms for each mode can allow the controller to learn appropriate pump duty cycles for both high flowrate and low flowrate operating conditions independently.

In some aspects, the controller can be configured to implement a fallback mechanism when the flowrate does not reach near the target flowrate throughout a dispense cycle. In these conditions, the controller can update the pump feedforward term to 100% duty cycle to maximize pump output for subsequent dispensing operations. This fallback mechanism can address situations where filter clogging, increased fluid viscosity, or other factors have reduced flowrate below acceptable levels. In some aspects, the fallback mechanism can be disabled when the beverage system is operating in precision pour mode, as the lower target flowrate in precision pour mode may not require maximum pump output to achieve acceptable performance.

Figure 41:
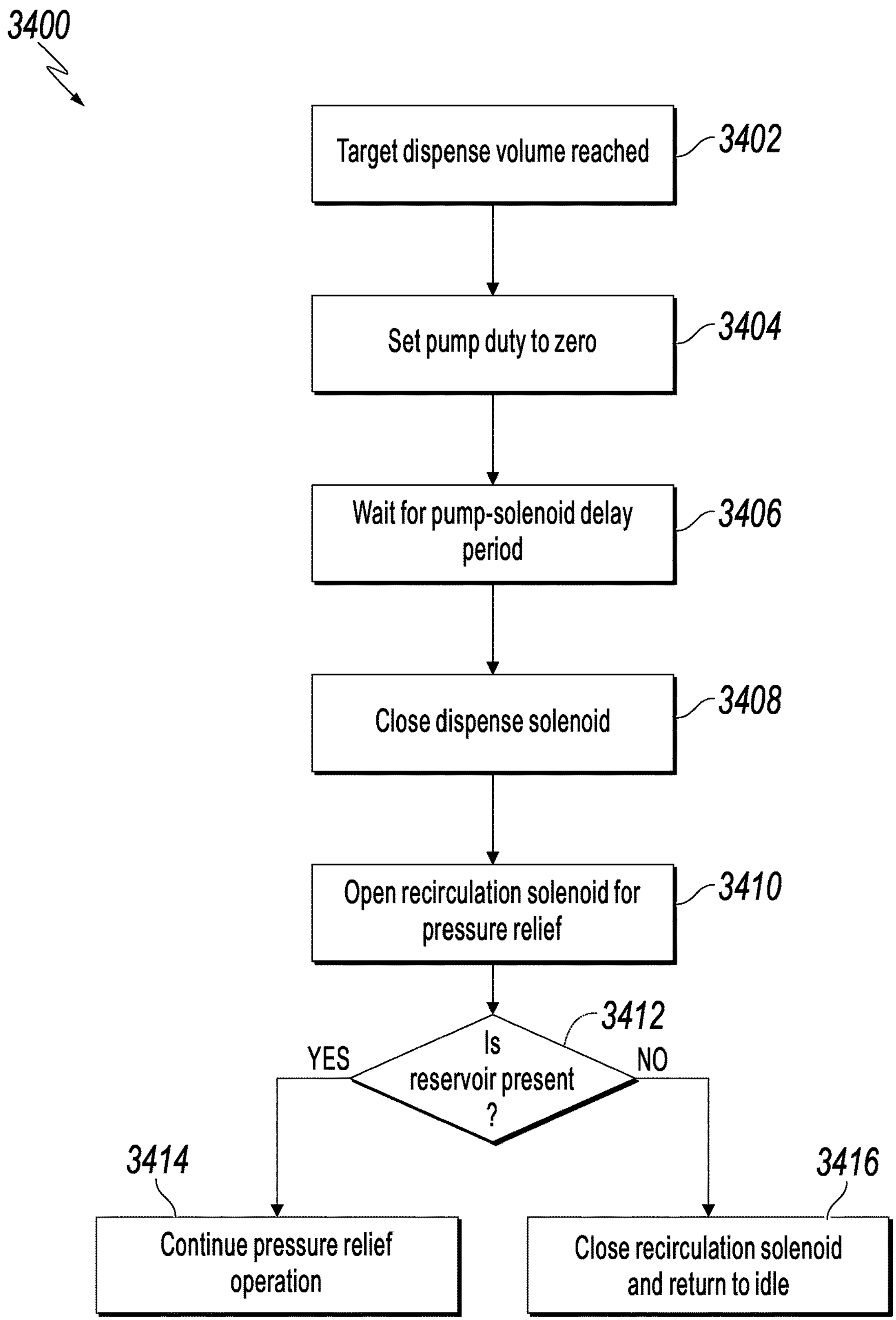
FIG. 41 is a flowchart illustrating an exemplary method for performing pressure relief after dispensing a beverage according to the systems and methods described herein.

Referring to FIG. 41, a method 3400 of pressure relief after dispensing in a beverage system is illustrated. The method 3400 can be implemented by the controller of any of the beverage devices described herein, for example, the controller 120 described with respect to FIG. 1. The method 3400 can relieve pressure within the fluid pathway after a dispensing operation completes, preventing pressure buildup that could cause leaks or affect subsequent dispensing operations. The method 3400 is described in greater detail below with reference made to the system 2500 of FIG. 25.

As described above, the flow of fluid from the reservoir, through the filter unit, to the dispensing outlet defines a first fluid flow path. The beverage system can further include a solenoid valve provided along a second fluid flow path from the filter unit to the reservoir. The controller can be configured to control the solenoid valve to move from a closed position to an open position after dispensing of the filtered beverage to relieve pressure within the first fluid flow path.

At a step 3402, the target dispense volume is reached. The controller can determine that the target dispense volume has been reached based on flow meter pulse counts multiplied by the flow meter coefficient, as described above with respect to the pump control method 3300.

At a step 3404, the controller can set the pump duty to zero. Setting the pump duty to zero can stop the pump from driving additional fluid through the beverage system. The controller can be configured to implement a delay between pump activation and solenoid valve activation to prevent pressure build-up in the system.

At a step 3406, the controller can wait for a pump-solenoid delay period. The pump-solenoid delay period can define a time interval between stopping the pump and closing the dispense solenoid. In some aspects, the pump-solenoid delay period can be configured as a system parameter stored in memory. This delay can allow residual fluid in the fluid pathway to drain through the dispensing outlet before the dispense solenoid closes, reducing pressure buildup within the first fluid flow path. In some aspects, the controller can implement an end-of-dispense delay (e.g., approximately 8000 milliseconds) following the completion of a dispensing operation during which the controller performs post-dispense operations such as pressure relief. The controller can also implement a recirculation solenoid close time (e.g., approximately 20 seconds) defining a duration for which the recirculation valve remains open during pressure relief operations.

At a step 3408, the controller can close the dispense solenoid. Closing the dispense solenoid can terminate the flow of fluid through the dispensing outlet, completing the dispensing portion of the operation.

At a step 3410, the controller can open the recirculation solenoid for pressure relief. The controller can be configured to open the recirculation valve after the pump is shut off to dispense residual water and relieve pressure in the fluid pathway back to the reservoir. Opening the recirculation solenoid can establish the second fluid flow path from the filter unit to the reservoir, allowing any residual pressure within the first fluid flow path to be relieved through the recirculation path rather than remaining trapped in the filter module or fluid lines.

At a step 3412, the controller can determine whether the reservoir is present. The controller can monitor an attach/detach condition of the fluid supply reservoir via a reservoir microswitch or other sensor configured to detect reservoir presence. If the reservoir is present, the method 3400 can proceed to a step 3414.

At the step 3414, the controller can continue the pressure relief operation. The controller can maintain the recirculation solenoid in the open position to allow continued pressure relief through the second fluid flow path back to the reservoir. The pressure relief operation can continue for a configurable duration or until the controller determines that pressure has been sufficiently relieved.

If the reservoir is not present at the step 3412, the method 3400 can proceed to a step 3416. At the step 3416, the controller can close the recirculation solenoid and return to idle. The controller can be configured to automatically close the recirculation solenoid upon detecting reservoir detachment during a pressure relief event to prevent spraying of recirculated fluid from the recirculation valve or open ports at the interface between the fluid supply reservoir and the device. When the reservoir is reattached, the controller can reinitiate the pressure relief process by reopening the recirculation solenoid.

While the beverage systems described above are generally described as including a fluid reservoir or raw water tank, it is also appreciated that, in some aspects, the beverage systems described herein may be configured to receive unfiltered fluid from an external fluid supply source in place of or in addition to the reservoir/raw water tank. For example, in some aspects, the beverage systems described herein may be connected to an external fluid supply via external plumbing, a direct water line connection, or similar fluid supply infrastructure. In such configurations, the beverage systems described herein may omit the reservoir/raw water tank or may include both the reservoir/raw water tank and a connection to the external fluid supply source, allowing users to select between fluid sources as desired.

Certain illustrative implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting illustrative implementations and that the scope of the present invention is defined solely by the claims. The features illustrated or described in connection with one illustrative implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon. It should be further understood that the illustrated shapes of the aforementioned implementations depicted in the accompanying drawings are exemplary and can be modified based on factors such as durability, performance, ornamentality, aesthetic appeal, and/or the like.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. For example, in some aspects, the terms "about" or "approximately" may indicate a tolerance of plus or minus 10% of the stated value, such as when referring to flowrates, dimensional measurements, or time durations.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

The invention claimed is:

1. A beverage system for filtering fluid comprising:

a filter unit;

a dispensing outlet;

a pump configured to pump the fluid from a fluid source in fluid communication with the beverage system, through the filter unit, to the dispensing outlet;

at least one flow meter configured to measure a flowrate of the fluid being pumped through the beverage system; and a controller including at least one processor and a memory storing instructions which, when executed by the at least one processor cause the at least one processor to perform operations comprising:

receiving a request to dispense a filtered beverage, operating the pump at a first duty to pump the fluid from the fluid source, through the filter unit, to the dispensing outlet, receiving, via the at least one flow meter, the flowrate of the fluid being pumped through the beverage system, comparing the flowrate to a predetermined flowrate, and operating the pump at a second duty, greater than the first duty, responsive to determining that the flowrate is less than the predetermined flowrate.

2. The beverage system of claim 1, wherein the memory is configured to store historical data characterizing previous dispensing operations, wherein the first duty is determined based on a function of one or more duties of the pump during one or more of the previous dispensing operations.

3. The beverage system of claim 2, wherein the previous dispensing operations include one or more filtered beverage dispensing operations or one or more rinse cycle dispensing operations.

4. The beverage system of claim 2, wherein the first duty is determined based on an average of one or more duties of the pump during one or more of the previous dispensing operations.

5. The beverage system of claim 2, wherein the first duty is determined based on a ratio of one or more duties of the pump during one or more of the previous dispensing operations.

6. The beverage system of claim 2, wherein the first duty is determined based on a duty of the pump during an immediately preceding dispensing operation.

7. The beverage system of claim 1, wherein the predetermined flowrate is about 0.5 to 3 liters per minute.

8. The beverage system of claim 1, wherein the at least one processor is configured to perform operations further comprising:

repeating the steps of receiving the flowrate of the fluid and comparing the flowrate to the predetermined flowrate; and iteratively increasing or decreasing the duty of the pump until the flowrate is within a predetermined threshold of the predetermined flowrate.

9. The beverage system of claim 8, wherein the predetermined threshold is defined by a range of between about 75 milliliters per minute below the predetermined flowrate to about 75 milliliters per minute above the predetermined flowrate.

10. The beverage system of claim 1, wherein the at least one processor is configured to modify the duty of the pump such that the flowrate does not exceed the predetermined flowrate.

11. The beverage system of claim 1, wherein the filter unit comprises a filter cartridge including a paper filter medium configured to remove contaminants from the fluid flowing therethrough, and wherein where the predetermined flowrate is a flowrate in which a contact time between the fluid and with the paper filter medium is between 2 and 15 seconds.

12. The beverage system of claim 1, further comprising a user interface, wherein the at least one processor is configured to perform operations further comprising:

providing a clog warning to the user interface responsive to determining that the flowrate is below a second predetermined flowrate.

13. The beverage system of claim 1, further comprising:

a first flow path defined between the fluid source, the filter unit, and the dispensing outlet;

a second flow path defined between the fluid source and the filter unit, the second flow path including a solenoid valve, wherein the at least one processor is configured to perform operations further comprising:

controlling the solenoid valve to move from a closed position to an open position after dispensing of the filtered beverage to relieve pressure within the first flow path.

14. A beverage system for filtering fluid comprising:

a filter unit;

a dispensing outlet;

a pump configured to pump the fluid from a fluid source, through the filter unit, to the dispensing outlet;

at least one flow meter configured to measure a flowrate of the fluid being pumped through the beverage system; and a controller including at least one processor and a memory storing instructions which, when executed by the at least one processor cause the at least one processor to perform operations comprising:

receiving a request to dispense a filtered beverage, operating the pump at a feedforward duty to pump the fluid from the reservoir, through the filter unit, to the dispensing outlet, receiving, via the at least one flow meter, the flowrate of the fluid being pumped through the beverage system, calculating a flowrate error based on a difference between the flowrate and a target flowrate, adjusting the duty of the pump based on the flowrate error, and updating the feedforward duty responsive to determining that the flowrate error is below a threshold for a steady state time period.

15. The beverage system of claim 14, wherein the at least one processor is configured to perform operations further comprising:

maintaining operation of the pump at the adjusted duty responsive to determining that the flowrate error is within a dead band threshold.

16. The beverage system of claim 15, wherein the dead band threshold is defined by a range of between about 75 milliliters per minute below the target flowrate to about 75 milliliters per minute above the target flowrate.

17. The beverage system of claim 14, wherein the feed-forward duty is stored in non-volatile memory and persists across power cycles of the beverage system.

18. The beverage system of claim 17, wherein the feed-forward duty is determined based on a ratio of one or more duties of the pump during one or more of the previous dispensing operations.

19. The beverage system of claim 14, wherein the at least one processor is configured to perform operations further comprising:

waiting for a predetermined time before calculating the flowrate error after initiating pump operation.

20. The beverage system of claim 14, wherein the at least one processor is configured to perform the steps of receiving the flowrate, calculating a flowrate error, adjusting the duty of the pump, and updating the feedforward duty at a predetermined execution frequency.

* * * * *